(12) United States Patent
George

(10) Patent No.: US 6,841,724 B2
(45) Date of Patent: Jan. 11, 2005

(54) METHOD AND SYSTEM OF STUDYING MUSIC THEORY

(76) Inventor: Michael P. George, 1107 E. South Temple, #5, Salt Lake City, UT (US) 84102

( * ) Notice: Subject to any disclaimer, the term of this patent is extended or adjusted under 35 U.S.C. 154(b) by 0 days.

(21) Appl. No.: 10/155,420

(22) Filed: May 23, 2002

(65) Prior Publication Data

US 2002/0178896 A1 Dec. 5, 2002

Related U.S. Application Data

(60) Provisional application No. 60/293,998, filed on May 30, 2001.

(51) Int. Cl.⁷ .............................................. G09B 15/02
(52) U.S. Cl. ......................... 84/477 R; 84/474; 84/480
(58) Field of Search .......................... 84/477 R, 470 R, 84/473, 474, 478, 479 R, 410, 470–471

(56) References Cited

U.S. PATENT DOCUMENTS

| | | | |
|---|---|---|---|
| 148,097 A | | 3/1874 | Tillman |
| 2,221,143 A | | 11/1940 | Lang |
| 3,481,241 A | | 12/1969 | Gaillard |
| 3,698,277 A | * | 10/1972 | Barra ........................ 84/483.1 |
| 3,727,511 A | * | 4/1973 | Piper ......................... 84/471 R |
| 4,037,518 A | | 7/1977 | Lorenzen |
| 4,464,971 A | * | 8/1984 | Dean ......................... 84/471 R |
| 4,671,159 A | | 6/1987 | Stark |
| 5,113,739 A | | 5/1992 | Thomson |
| 5,370,539 A | | 12/1994 | Dillard |
| 5,415,071 A | | 5/1995 | Davies |
| 5,709,552 A | | 1/1998 | LeGrange |
| 5,741,990 A | | 4/1998 | Davies |
| 6,031,172 A | | 2/2000 | Papadopoulos |

* cited by examiner

Primary Examiner—Kimberly Lockett
(74) Attorney, Agent, or Firm—Thorpe North & Western LLP

(57) ABSTRACT

A method and system of teaching and/or studying music theory and for aiding the practice of musical instruments according to the integration of the color spectrum with notes of the circle of fifths and rearrangement of those notes into the musical chromatic scale. This rearrangement is accomplished by rotating either set of notes (spaced at whole-tone intervals) in the circle of fifths by 180 degrees. The musical chromatic scale arrangement of colors is then applied to various instruments. Diagrams representing the various note/color patterns as they appear on the various color-coded instruments are also provided. Scale and/or chord charts or diagrams for various instruments are also provided. The inventive color code is also applied to tablature, as well as to inventive forms of music notation.

21 Claims, 39 Drawing Sheets

| NUMBER | COLOR | SHAPE | | NOTE |
|---|---|---|---|---|
| 12 | RED |  | □ | C |
| 1 | RED-ORANGE |  | ○ | G |
| 2 | ORANGE |  | □ | D |
| 3 | YELLOW-ORANGE |  | ○ | A |
| 4 | YELLOW |  | □ | E |
| 5 | YELLOW-GREEN |  | ○ | B |
| 6 | GREEN |  | □ | G♭ |
| 7 | BLUE-GREEN |  | ○ | D♭ |
| 8 | BLUE |  | □ | A♭ |
| 9 | BLUE-VIOLET |  | ○ | E♭ |
| 10 | VIOLET |  | □ | B♭ |
| 11 | RED-VIOLET |  | ○ | F |
*Table 1*
*Legend for relating numbers to colors*

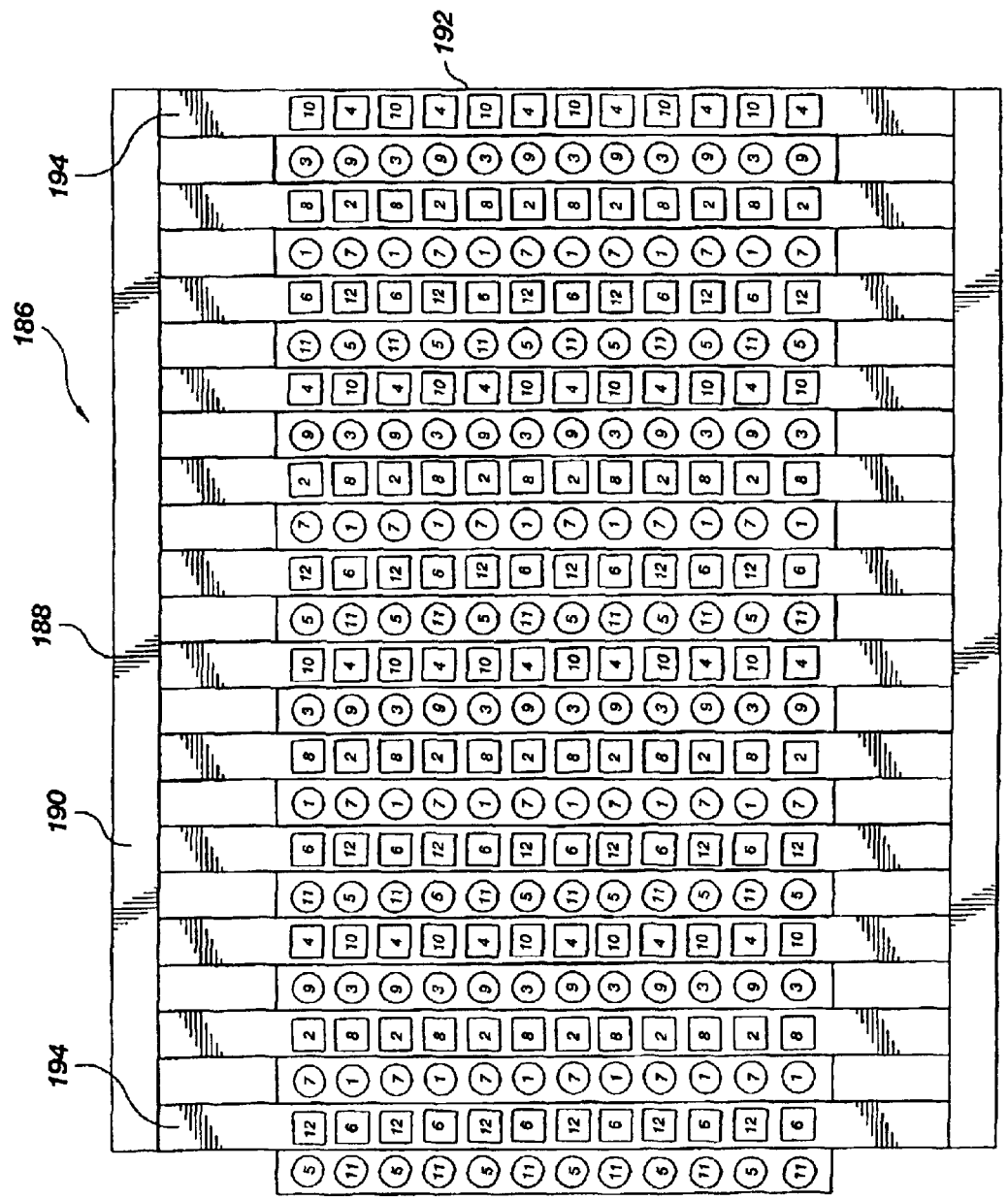

NOTE SHAPES and RESTS

| REST | | NOTE | | NOTE | |
|---|---|---|---|---|---|
| | = | | = | 🔲 | BREVE REST. |
| | = | 𝄻 | = | 🔲 12 | WHOLE NOTE (or SEMIBREVE) REST. |
| | = | 𝅗𝅥 | = | 🔲 12 | HALF NOTE (or MINIM) REST. |
| 𝄽 or | = | 𝅘𝅥 | = | 🔲 12 | QUARTER NOTE (or CROTCHET) REST. |
| 𝄾 | = | 𝅘𝅥𝅮 | = | 🔲 12 | EIGHTH NOTE (or QUAVER) REST. |
| 𝄿 | = | 𝅘𝅥𝅯 | = | 🔲 12 | SIXTEENTH NOTE (or SEMIQUAVER) REST. |
| 𝅀 | = | 𝅘𝅥𝅰 | = | 🔲 12 | THIRTY-SECOND NOTE (or DEMI-SEMIQUAVER) REST. |
| 𝅁 | = | 𝅘𝅥𝅱 | = | 🔲 12 | SIXTY-FOURTH NOTE (or SEMI-DEMI-SEMIQUAVER) REST. |

*Fig. 18*

METHOD AND SYSTEM OF STUDYING MUSIC THEORY

This application claims the benefit of U.S. Provisional Application No. 60/293,998 filed on May 30, 2001.

COPYRIGHT NOTICE

© Copyright 2001, Michael P. George. All rights reserved.

A portion of the disclosure of this patent document contains material that is subject to copyright protection. The copyright owner has no objection to the facsimile reproduction by anyone of the patent document or the patent disclosure, as it appears in the USPTO patent file or records, but otherwise reserves all copyright rights whatsoever.

FIELD OF THE INVENTION

The present invention relates to teaching aids for the study of music theory and the playing of musical instruments. More specifically, the invention is a method and system of illustrating and utilizing the integration of color and music theory.

BACKGROUND

It is desirable to simplify the teaching of music theory and playing of instruments. The standard system of music notation includes staffs with notes located along lines or between lines. Generally, sharp or flat symbols are required within the staff to indicate the key in which the music is played. Prior art places particular emphasis on, or displays a preoccupation with the white keys or "natural" notes of a keyboard. This reflects a general attitude in the music field that the white keys of a keyboard are more easily comprehended. The naming of the white keys as "natural" is a reflection of this attitude. Consequently, even musicians who use other instruments, such as the guitar, are wary of songs or pieces of music in keys containing several sharps or flats. This wariness is unfounded and unreasonable because, in the case of the guitar, there are no black keys.

This approach may be attributed, to a great extent, to the way in which standard music notation is arranged. On the musical staves, the lines and the accompanying spaces are assigned the "natural" notes or keys. The sharped or flatted notes are not assigned their very own lines or spaces on the staves, but are found in the "natural" notes' positions, along with a "♯" (sharp) or "♭" (flat) symbol. This makes reading music notation tedious and not enjoyable for many. For example, the key of B-major contains five sharps. Therefore, the sight of the key signature of a particular piece of music written in the key of B is daunting to many people. As a result, the black keys (or "sharp" and "flat" notes) are widely regarded as "bad" notes to be avoided, if possible. Therefore, the key of B is utilized less often (especially by beginning students) than the key of C, which has no sharps, although the same rules of music theory apply to both keys (and all others).

Another challenge encountered by music students is that the present approach of using various labeling systems to identify notes is not altogether intuitive. Music theory has been described as "math without numbers." If, for example, the note commonly referred to as "D" is instead called "1" at all times, the communication of general note relations would be very difficult. Using this example, the specific note, "1" (i.e., "D"), would be the second note of the C-major scale, while being the sixth note of the F-major scale, and the fifth note to G-major, etc.

Because assigning numbers to specific notes is somewhat incompatible with using numbers to outline general note relations, each specific note is instead designated by a letter name. The use of alphabetical symbols accounts for the phrase, "math without numbers," when describing music theory. However, letters do not generally have mathematical properties. As a result, their use in studying music theory can lead to great confusion for a student.

SUMMARY OF THE INVENTION

One embodiment of the present invention relates to a method for aiding in understanding music theory. The method includes the step of integrating a color spectrum and a musical chromatic scale by assigning successive colors of a color wheel to successive musical notes in a circle of fifths to create note-color assignments. Another step is rearranging the musical notes in the circle of fifths into the musical chromatic scale while maintaining the note-color assignments. A further step is studying musical theory through the disclosed relationships of the note-color assignments for colored musical notes.

BRIEF DESCRIPTION OF THE DRAWINGS

Table 1 is a key relating numbers to colors and note shapes in the attached drawings;

FIG. 13A is an expanded diagram of the array of colors/note shapes as seen in FIG. 12C, representing an infinitely repeating pattern;

FIG. 18 shows a legend that illustrates how the inventive color code translates to rhythmic notation;

Similar reference characters consistently denote corresponding features throughout the attached drawings.

DETAILED DESCRIPTION

Figure 1A:
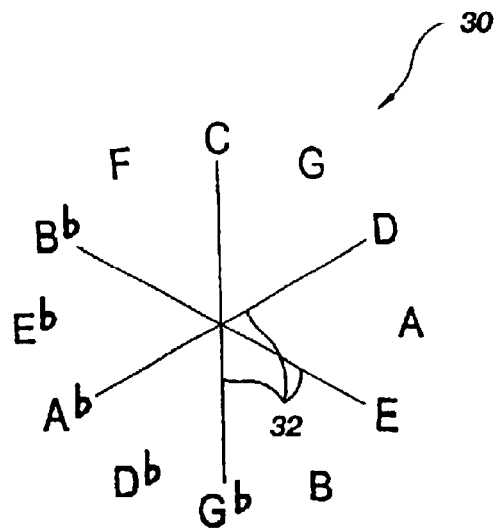
FIG. 1A is an arrangement of the musical scale by successive fifths, i.e., "the circle of fifths," which is fundamental to the inventive method and system of studying music theory according to the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention relates to a method and system of illustrating and utilizing the integration of the color spectrum with the musical chromatic scale in a manner that is helpful to the student of musical theory and practice of musical instruments.

One embodiment of the invention has a disk parallel, concentric, and rotatable with relation to a stationary background. The rotating disk rotates about an axis that is perpendicular to the stationary background. The primary and secondary colors, arranged in their spectral order, are evenly spaced in relation to the rotatable disk. The tertiary, or "pseudo primary and pseudo secondary," colors are positioned on the stationary background and are evenly spaced in spectral order in relation to the rotatable disk, as well.

Each of the twelve colors may be shaped in accordance with the shape of its corresponding assigned keyboard key, although the colors may take the shape of circles, squares, letters, numbers, etc. Both the rotating and stationary disks can be aligned to display a spectral order of colors, representing or illustrating the notes in the circle-of-fifths arrangement. By rotating the disk 180 degrees, the invention displays the musical chromatic scale order of notes/colors. This embodiment of the invention further has faceplates which include triangles of major thirds, squares for relative minors, and lines connecting each color/note to its relative subdominant and dominant colors/keys, to be placed concentrically among the disks.

Previously known devices or methods and systems necessitate the impractical use of much time and energy to manipulate and decipher nonmusical devices. The inventive system, in contrast, allows for hands-on practice with actual musical instruments.

Prior known systems help show what notes are included in a particular scale, chord, or series of notes, but the method of the present invention additionally illustrates why the notes are included and how the notes relate to each other—facilitating a greater understanding of music theory and, therefore, enabling one to improve in such things as transposition, playing the various scale modes, learning to play various instruments, etc.

Another embodiment of the invention is a rotatable device similar to that described above. It includes a disk concentric, parallel, and rotatable with relation to, a stationary disk. The rotating disk rotates about an axis that is perpendicular to the stationary background.

All of the colored shapes representing notes are attached to the stationary disk in a circular formation with relation to the rotatable disk. The colors/notes may be attached by magnets so as to allow their easy rearrangement. Again, each of the twelve colors may be shaped in accordance with the shape of its corresponding assigned keyboard key. In addition, the colors may take the shape of circles, squares, letters, numbers, etc.

The rotatable disk is capable of holding various faceplates that bear graphic data or markings, including the following examples of the numerous options: the set of Roman numerals commonly used to illustrate intervals between notes (I, II, III, IV, etc.), the phrases used in the system of solmization (DO, RE, ME, FA, etc.), the numbers used in the system of atonal music (0–11), triangles of major thirds, squares for relative minors, lines connecting each color/note shape to its relative subdominant and dominant keys, lines outlining various scales, lines outlining various chords, etc.

The colors/note shapes of this embodiment of the invention can be rearranged into the order of the circle-of-fifths/ color wheel. Additional faceplates bearing graphic data or markings depicting relations between color/notes in this arrangement are also provided.

Another embodiment of the invention includes two disks placed in parallel, concentric, and rotatable relation with one another. The notes/colors may be attached to the inner disk by magnets while transparent overlays/faceplates bearing graphic data or markings are attached to the inner disk and/or outer disk.

The invention provides for other embodiments that use the musical chromatic scale order of colors for arrangement on various instruments such as the keyboard, guitar, and other instruments.

Another embodiment of the invention includes the chromatic scale circle of colors/notes that can be unwound and straightened to illustrate how the circular form of the color/ note arrangement relates to its linear format.

The invention also illustrates the teaching of the color and music theory wherein the repeating musical chromatic scale colors are arrayed in parallelogram-shaped charts with transparent overlays capable of holding markings that further illustrate relationships between notes/colors. The parallelogram is also transferred to multiple parallel plates, moveable relative to each other by two parallel transverse plates.

Another embodiment of the invention includes a magnetic study board with colored objects representing keys or notes that can be moved around the board and arranged in any desired order.

The invention provides for diagrams or charts that illustrate the colors/notes included in, and/or the finger positioning for, various scales, chords, chord inversions, chord positions, and various other note positions on the fret board of a guitar and on other instruments.

The invention provides alternative forms of tablature that incorporate the inventive color code.

Another embodiment of the invention includes a system of music notation based on standard music notation that integrates the inventive color code to aid in designating pitch, while utilizing rhythmic notation and the familiar musical staves.

The invention also provides a system of music notation that integrates the inventive color code with rhythmic notation while replacing the standard five-line staves with multicolored, six-lined staves.

Referring to FIG. 1A, there is presented the circle of fifths, designated 30, which is the arrangement of notes in the chromatic scale by successive fifths, i.e., every fifth note or dominant of each consecutive major scale. Diameter lines 32 are related to six notes spaced at whole tone intervals: C, D, and E, and the notes in the circle found opposite them—$G^\flat$, $A^\flat$, and $B^\flat$ (a.k.a. $F^\sharp$, $G^\sharp$, and $A^\sharp$), respectively.

Each key in the circle of fifths consists of elements or portions of the keys immediately adjacent to it on either side. For instance, the C-major scale is: C D EF G A BC (The spacing between the letters is meant to mimic the intervals in the major-scale formula: W W ½ W W W ½ where "W" means "whole step" and "½" means "half step"). The G major scale reads as follows: G A BC D E F$^\sharp$G. Lastly, the D-major scale reads: D E F$^\sharp$G A B C$^\sharp$D. The key of G, therefore, is made up of equal parts of C and D—the keys that precede and follow it in the circle of fifths. It incorporates the latter half (or the second tetrachord) of the C-major scale (G A BC), and the first part (or first tetrachord) of the D-major scale (D E F$^\sharp$G)—see FIG. 6D.

Although the arrangement of the keys or notes in the circle of fifths may seem random and unrelated to the chromatic scale (a musical scale consisting entirely of half steps—as on a keyboard), it has been discovered by the present inventor that this is not the case. To rearrange the circle of fifths into the order of the chromatic scale, one must switch three of the keys or notes (spaced at whole-tone, or "every-second," intervals) with the three keys directly opposite in the circle, resulting in the total movement of six keys spaced at whole tone intervals. This could be done with either set of six keys spaced at wholestep intervals, provided that one of the two sets remains stationary.

For purposes of illustration, it is helpful to choose the notes or keys C, D, and E to be switched with $G^\flat$, $A^\flat$, and $B^\flat$, respectively. (In this example, and in many of the examples used throughout, the "black," or sharp/flat, notes or keys are referred to by their "flat" names for simplicity.) Lines 32 have been drawn to show the final position of each key. For example, it can be seen that, in the chromatic scale (see FIG. 1B), C should follow B and precede $D^\flat$; likewise, $G^\flat$ should follow F and precede G, in the chromatic scale. To summarize, by switching places with each other, C and $G^\flat$ would fall into their chromatic-scale positions.

Figure 1B:
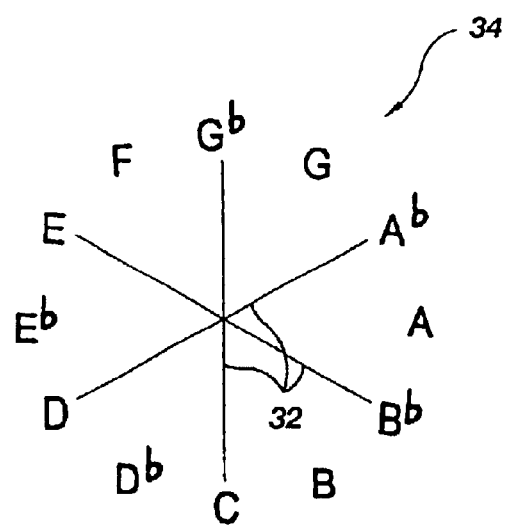
FIG. 1B illustrates, using alphabetical symbols, the rearrangement of the circle of fifths of FIG. 1A into the chromatic-scale order of notes.

Referring to FIG. 1B, there is illustrated the chromatic scale, i.e., the arrangement of the twelve keys or notes in the circle of fifths by chromatic intervals, designated 34. This arrangement is the result of, as mentioned, the switching of every other key with its opposite. (Again, this could be done as well by switching F, G, and A with B, $D^{47}$, and $E^\flat$, respectively, provided the remaining keys or notes remain in their original positions.) Upon further inspection, this transposition action of switching opposite notes is actually the result of rotating one set of notes (spaced at whole-step intervals) 180 degrees to its opposite position, which is clearly illustrated in FIGS. 5A, 5B, and 5C, below.

Although this analysis shows how the chromatic scale and the circle of fifths relate, it still remains difficult to comprehend because one is dealing with letters, i.e., alphabetical symbols that are unrelated to any actual instrument and that neither contain inherent mathematical properties, nor properly convey musical properties. It would, then, be desirable to develop an alternative approach to simplify the understanding of the aforementioned relationship.

Figure 2A:
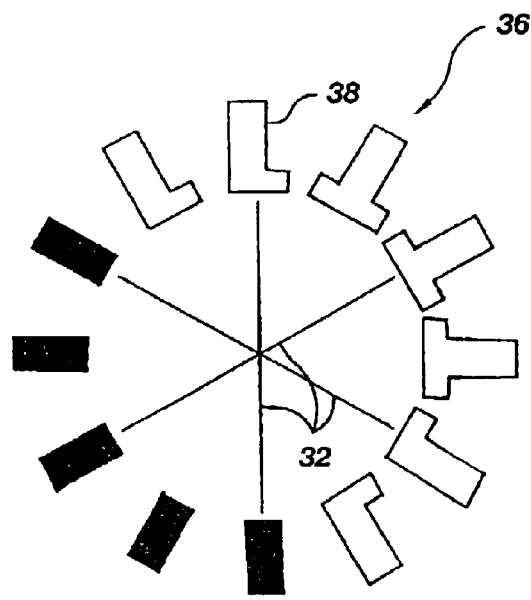
FIG. 2A is an arrangement as in FIG. 1A wherein the letter symbols of the notes are replaced with the shapes of their related keyboard keys.
Figure 2B:
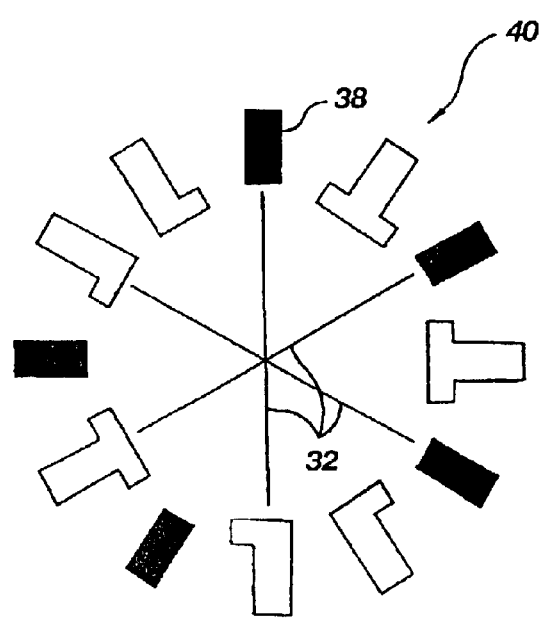
FIG. 2B illustrates a rearrangement of the shapes of the related keyboard keys as in FIG. 2A into the order of the chromatic scale.

Referring to FIGS. 2A and 2B, illustrated are the circle of fifths and the chromatic scale, respectively, and how they relate, in an alternative presentation. Because it is abstract to label keys with their alphabetical names, in the diagrams of the circle of fifths 36 and the chromatic scale 40, the letter symbols have been replaced with the standard (yet stylized) shapes of their corresponding keyboard keys. For example, the key of C is not labeled as "C", but by the keyboard shape of the white key, C. Likewise, instead of "$G^\flat$," the key of $G^\flat$ is labeled by the keyboard shape of the black note, $G^\flat$. These key shapes are designated 38.

Now, the application of the above described translation of notes can be seen more easily. Yet, it remains difficult to distinguish which keys are at whole-step intervals, respectively, since both sets of six keys contain white and black keys. In other words (to use the analogy of a clock, which contains twelve integers), the remaining question is, "Which keys are part of the 'evens' set and which belong to the set of 'odds'?"

Figure 3A:
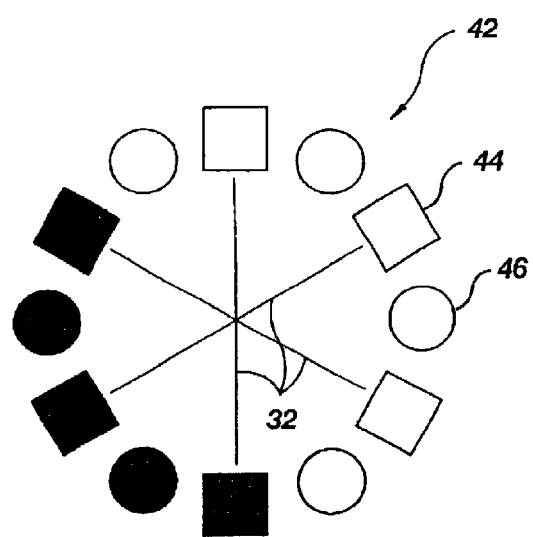
FIG. 3A is an arrangement as in FIG. 2A, wherein each note in one of the two sets of six, evenly-spaced keys is shaped as a square, while each note in the other set of six, evenly spaced keys is shaped as a circle.
Figure 3B:
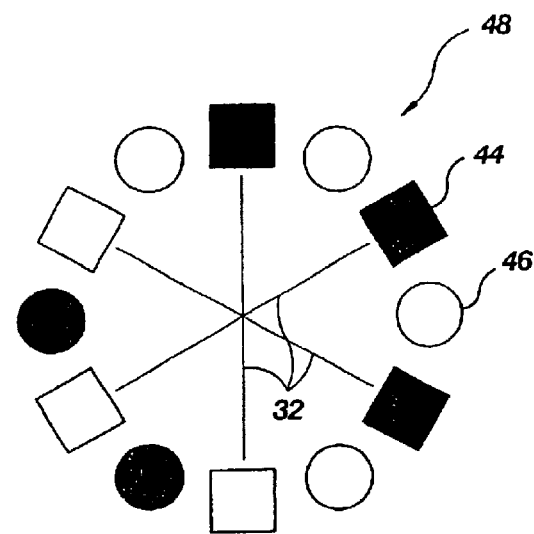
FIG. 3B illustrates a rearrangement of the black and white shapes representing keyboard keys as in FIG. 3A into the order of the chromatic scale.

Referring to FIGS. 3A and 3B, there is shown still another approach to illustrating the relationship between the circle of fifths and the chromatic scale, respectively. Like the diagrams of FIGS. 2A and 2B, in these figures, the alphabetical labels of the keys have been replaced by alternative note shapes with groupings of black and white that resemble the keyboard key shapes shown in FIG. 2A and 2B. However, to solve the problem raised immediately above, i.e., the difficulty of distinguishing between the "evens" set and the set of "odds", each key or note in the "evens" set 44 is shaped as a square, while each key or note in the "odds" set 46 is shaped as a circle—as seen in the diagrams of the circle of fifths 42, and the chromatic scale 48. (This could, of course, be designed the opposite way, with each note of the "evens" set being shaped as a circle and each note of the "odds" set shaped as a square.) By incorporating the shapes of squares and circles, one may discern which white keyboard keys are evenly spaced with which black keyboard keys.

Although this incorporation of the two-shape system for illustrating intervals between notes clarifies further the relationship between the circle of fifths and the chromatic scale, it is still difficult to discern or fully understand the result of the key translation presented above. To restate, though one can more easily see which keys are at whole-step and half-step intervals from one another with the aid of the circles and squares, the uneven intervals between black and white note shapes can cause some confusion.

Figure 4A:
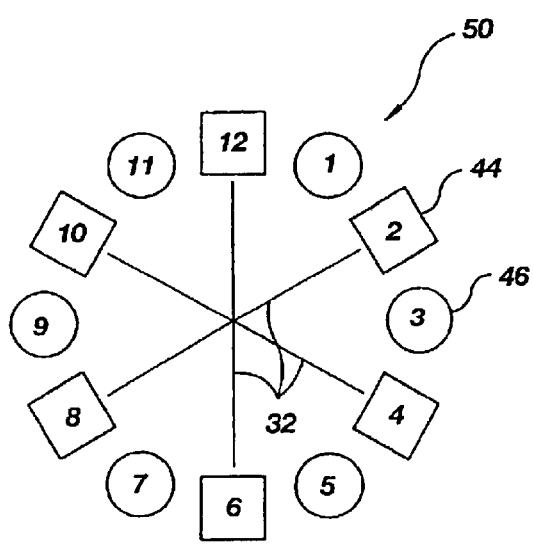
FIG. 4A is an arrangement as in FIG. 3A, wherein each square note shape is color-coded with a primary or secondary color, while each circular note shape is color-coded with a tertiary color.
Figure 4B:
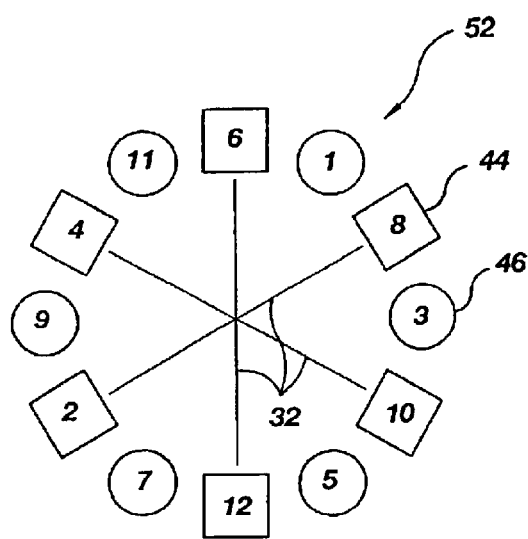
FIG. 4B illustrates a rearrangement of the note shapes and colors as in FIG. 4A by switching complementary-colored note shapes in either of the two sets, resulting in the order of notes/colors in the musical chromatic scale.

Referring to FIGS. 4A and 4B, a diagram 50 having "evens" keys 44 shaped as squares and "odds" keys 46 shaped as circles, depicts the circle of fifths, while a diagram 52 having "evens" keys 44 shaped as squares and "odds" keys 46 shaped as circles depicts the musical chromatic scale, respectively, in yet another way. Unlike the diagrams of FIGS. 3A and 3B, where each note of the "evens" set is simply represented as a black or white square and each note of the "odds" set is simply represented as a black or white circle, each key is now assigned its own color, as well. Applying the "color wheel" is preferable because each color in the color wheel is made up of equal parts of the colors immediately adjacent on either side. This is the case with the keys in the circle of fifths, where each key being made up of equal parts of the keys it immediately precedes and follows. Please refer to the descriptions accompanying FIGS. 1A and 6D.

On the color wheel, the primary colors and secondary colors are spaced at whole-step intervals, and, likewise, the tertiary colors are so spaced. Because of this, the "evens" set of notes 44 (the squares) is color-coded with the primaries and secondaries, while the "odds" set of notes 46 (the circles) is color-coded with the tertiaries. Now, having incorporated the color wheel, it is feasible to employ the vocabulary associated with the color wheel to ♭ describe the process of rotation that rearranges the circle of fifths into the chromatic scale, and vice versa. Instead of awkwardly saying, "A key or note is switched with the note opposite," one can simply say, "The complementary keys switch."

In this context, the word "chromatic" refers to musical intervals—not a degree of color alteration. It is also important to note that the color wheel used is the common, 12-part wheel in which the primary colors are positioned in the clockwise order of: red, yellow, and blue—with the remaining colors being positioned accordingly. The invention also applies to the use of the mirror image of the preferred color wheel described above.

Referring to FIG. 4A, C/red is found in its circle-of-fifths/color wheel position, or "natural environment", i.e., surrounded by notes found in the key of C, or the keys/colors of which it contains equal parts. However, once C/red is switched with its complementary note/color, $G^\flat$/green (as seen in FIG. 4B), it is then found in $G^\flat$/green's "natural environment" (or circle-of-fifths/color wheel position), while $G^\flat$/green is relocated to C/red's "natural environment" (or circle-of-fifths/color wheel position).

This same concept is operable for all notes/colors. Now, when the notes are in the chromatic-scale arrangement, the student can clearly see where each note was in the circle-of-fifths/color wheel arrangement. This is most useful, because, when playing an instrument, a musician must work with the chromatic-scale arrangement to create chords and note relationships or progressions from the circle-of-fifths arrangement. This way of illustrating how the two relate enables the student to fully comprehend and apply the concepts of music theory and increase his or her skills.

The rules of the color wheel, i.e., the relationships between complementary colors, primaries, secondaries and the six tertiaries (further dividable into two sets of three, etc.), translate to the rules of music key relationships. This seamless translation is believed to be due to the fact that both the color wheel and the circle of fifths stem from the electromagnetic spectrum and are based around the number twelve. Similar mathematical principals (such as division by two, three, four, etc.) appear to apply to both systems. The intervals illuminated by the colors conveniently illustrate the harmonic and intervallic relations considered or used within the realm of music theory. For example, when constructing a C-major chord from the C-major scale, the $1^{st}$, $3^{rd}$, and $5^{th}$ notes are used (i.e., C, E, and G).

If a C-major chord is desired, according to the present method, red would be chosen (which is C), along with the major third, E/yellow (which is the next primary found two whole steps away in the clockwise direction). To complete the chord, red-orange (which is G), the fifth of C—or the color that immediately follows red in the circle of fifths—is selected.

Using this method, one could study in further detail how the colors represent harmonic relationships between notes. For example, G/red-orange is a pitch that, in the circle of fifths/color wheel, is found between C/red and E/yellow. G/red-orange is harmonically close to both. However, G/red-orange is harmonically closer to C/red. This formula is operative for any chosen tonic (or keynote), which is the first and harmonically fundamental tone of a particular scale.

Although, in this embodiment, C is colored red, the use of any note colored as red with succeeding notes in the order of colors described above is within the scope of the invention. As illustrated, the primary and secondary colors are shaped as squares and the tertiary colors are shaped as circles, but these color-shape assignments could simply be reversed. In other words, it is conceivable to have each primary- and secondary-color take the shape of a circle while each tertiary color takes the shape of a square.

The inventive instructional method and system further illuminates how the colors and notes or keys relate. For example, looking at the set of primaries and secondaries, moving in a clockwise direction, red is followed by two warm colors: orange and yellow. According to the inventive method, these colors may be labeled as: 1a, 2a, and 3a, respectively. Continuing in a clockwise direction (and still looking only at the set of primaries and secondaries), green is followed by the cool colors of blue and purple. These cool colors may be designated as: 1b, 2b, and 3b, respectively.

Consequently, the "evens" set is subdivided into three warm-colored keys and three cool-colored keys. According to the inventive method, the use of terms, such as "warm" and "cool", are meant to illuminate intervallic relations of colors/notes and not to invoke a sense of any particular mood, emotion, etc.

One can see that the primaries comprise 1a, 3a, and 2b. Therefore, the primaries triangle of major thirds includes the 1 and 3 of the warm colors and the 2 of the cool colors. In the same manner, the secondaries triangle of major thirds includes the 1 and 3 of the cool colors and the 2 of the warm colors. The remaining six notes/tertiary colors can be similarly subdivided into sets of what may be designated as "pseudo warms and cools" and "pseudo primaries and secondaries."

Although, by definition, a tertiary color is a combination of both a primary and a secondary color, designations may be used according the present inventive method that refer to purple-red/F, red-orange/G, and orange-yellow/A, as "pseudos: red, orange, and yellow", with optional labels: ①a, ②a, and ③a, respectively. Likewise, yellow-green/B, green-blue/D♭, and blue-purple/E♭ may be called "pseudos: green, blue, and purple" and labeled with the optional designations: ①b, ②b, and ③b, respectively. As in the sets of primaries and secondaries, ①a, ③a, and ②b form a triangle of thirds ("pseudo primaries"), while ①b, ③b, and ②a form another such triangle ("pseudo secondaries").

Also, in the circle-of-fifths/color wheel arrangement, 1a, 2a, and 3a are preceded by ①a, ②a, and ③a, respectively, while 1b, 2b, and 3b are preceded by ①b, ②b, and ③b, respectively. However, in the chromaticscale arrangement, 1a, 2a, and 3a are preceded by ①b, ②b, and ③b, respectively, while 1b, 2b, and 3b are preceded by ①a, ②a, and ③a, respectively. What these above-defined relationships entail comes to light upon further, in-depth considerations as follow below. (It is important to note that these number/letter labels (i.e., 1a, ③b, 2a, etc.) are intended only to aid the beginning student who needs extra help with grasping the intervals between each note/color. For the student who already understands the color/note shape arrangement(s), the presence of these labels can make reading text cumbersome. These labels are, therefore, used sparingly in the following descriptions of figures.)

Figure 5A:
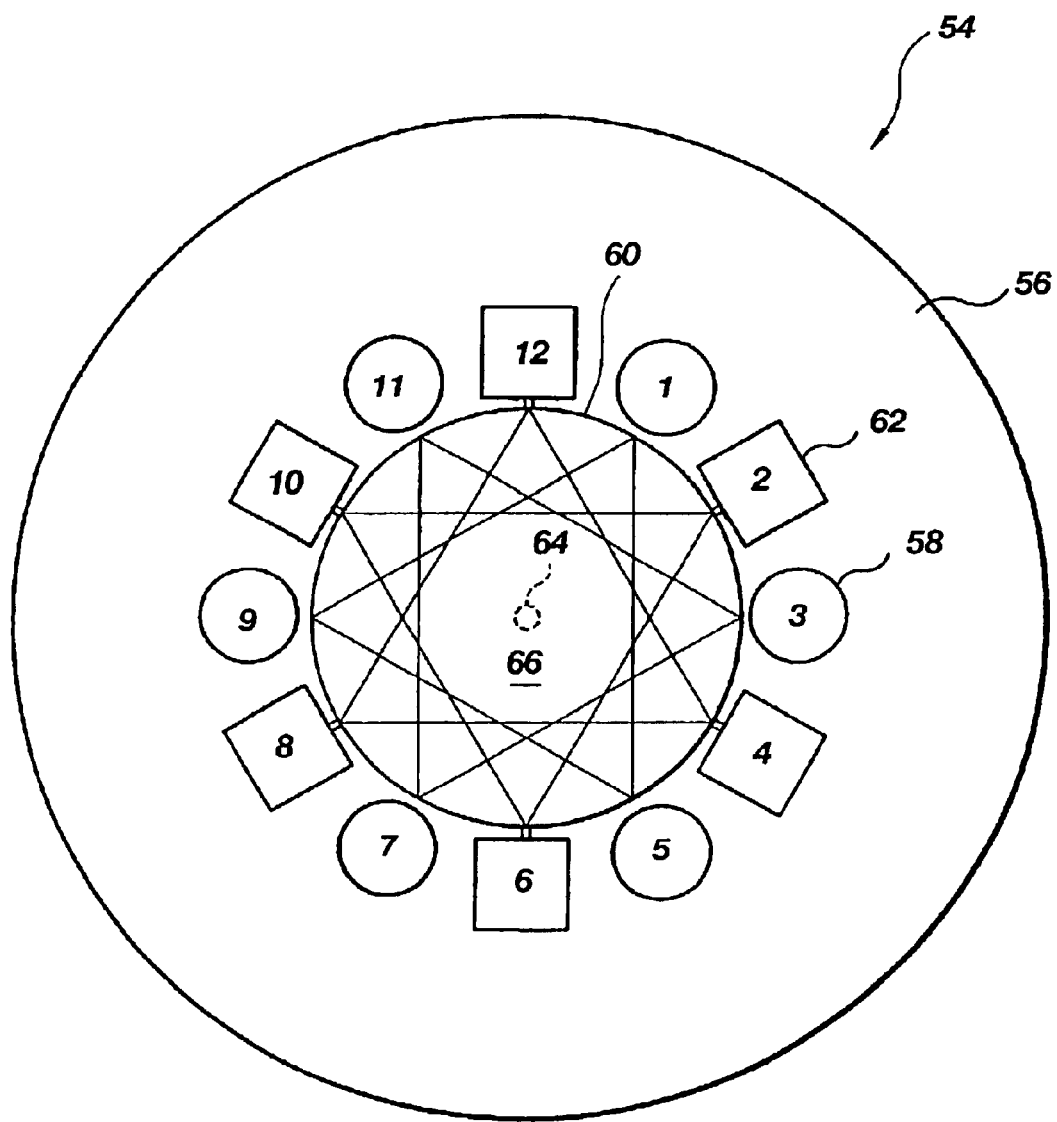
FIG. 5A is a plan view of a rotatable tool or diagram having a rotatable disk with a triangles overlay and a stationary background. The colored shapes representing notes positioned on the rotatable disk and the stationary background are in the circle-of-fifths arrangement as in FIG. 4A.

Referring to FIG. 5A, a movable diagram illustrates the ideas touched upon in the description of FIGS. 4A and 4B. In this depiction, the diagram 54 includes a stationary base 56 holding stationary tertiary-colored note shapes 58, with a wheel 60 having primary- and secondary-colored note shapes 62, that is rotatable on an axis 64. In this depiction, the diagram 54 is in the circle-of-fifths arrangement. A triangles plate 66 has been positioned on the rotatable diagram to show the connections between the primaries, secondaries, and "pseudo primary and secondary" tertiaries (see the description relating to FIGS. 4A and 4B).

Figure 5B:
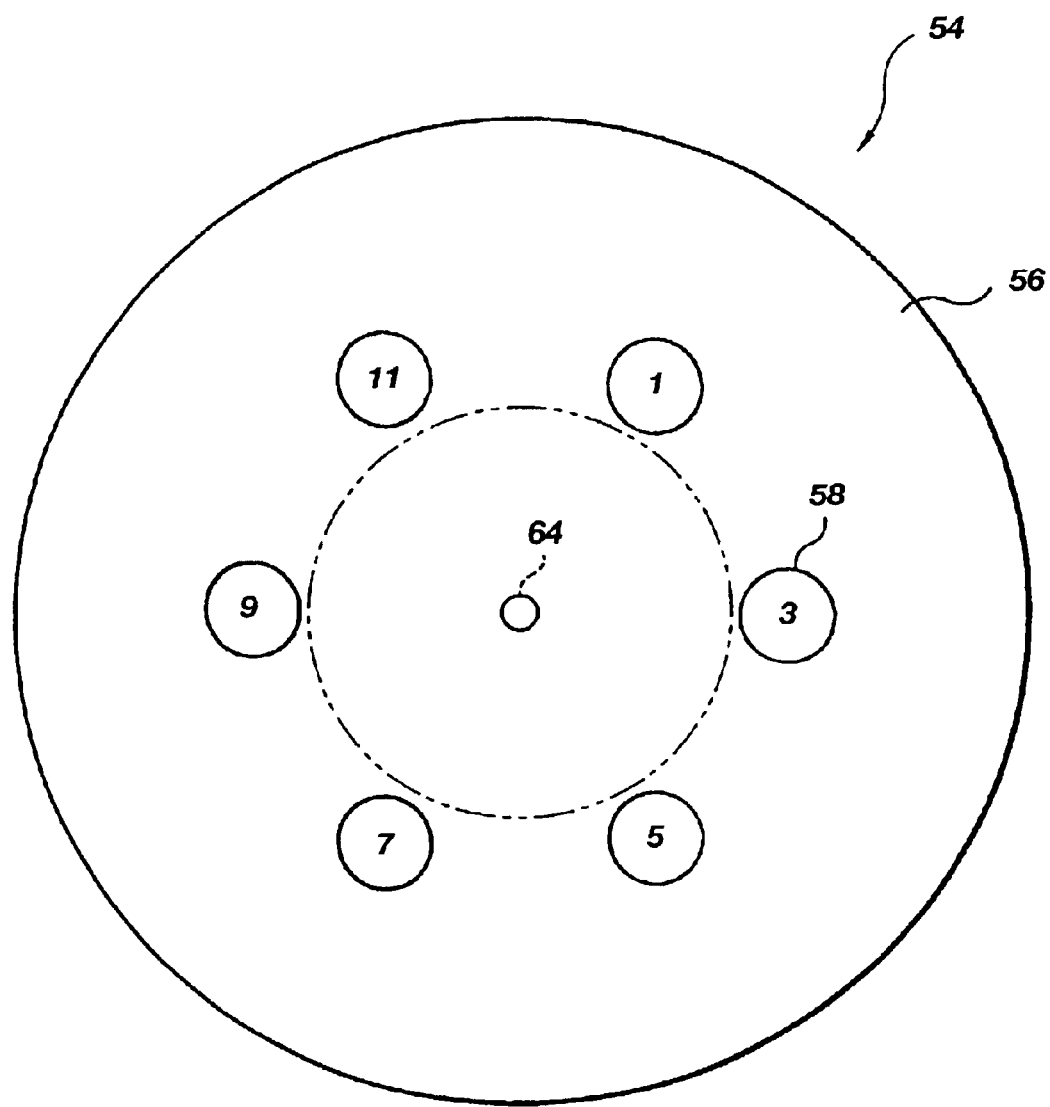
FIG. 5B is a plan view of the rotatable diagram of FIG. 5A with the rotatable portion removed.

Referring to FIG. 5B, there is shown a plan view 54 of the diagram of FIG. 5A, above, with the rotatable portion 60 removed. The colors/note shapes attached to the rotating disk 62 (the primaries and secondaries) are removed in this view, as well. Therefore, only those colored note shapes 58 attached to the stationary back 56 of the diagram (the tertiaries) are shown. (When using the device, the rotatable disk 60 is not actually separated or removed during rotation. However, in this plan view of the diagram, it has been removed simply as a means of illustration.) The diagram of FIGS. 5A, 5B, and 5C could have as easily been designed the opposite way, i.e., rotating the tertiary-colored note shapes and keeping the primary- and secondary-colored note shapes stationary (see FIGS. 7A–7C).

The "triangles" (or "major thirds") plate 66, the "squares" (or "minors") plate 68 (see FIG. 5C, below), and the "generations" plate (with lines connecting all of the colors/notes to their relative subdominant and dominant colors/keys) may have magnetic backing. Other removable adhesive systems can be used to allow different faceplates to be easily positioned, removed, or replaced.

Figure 5C:
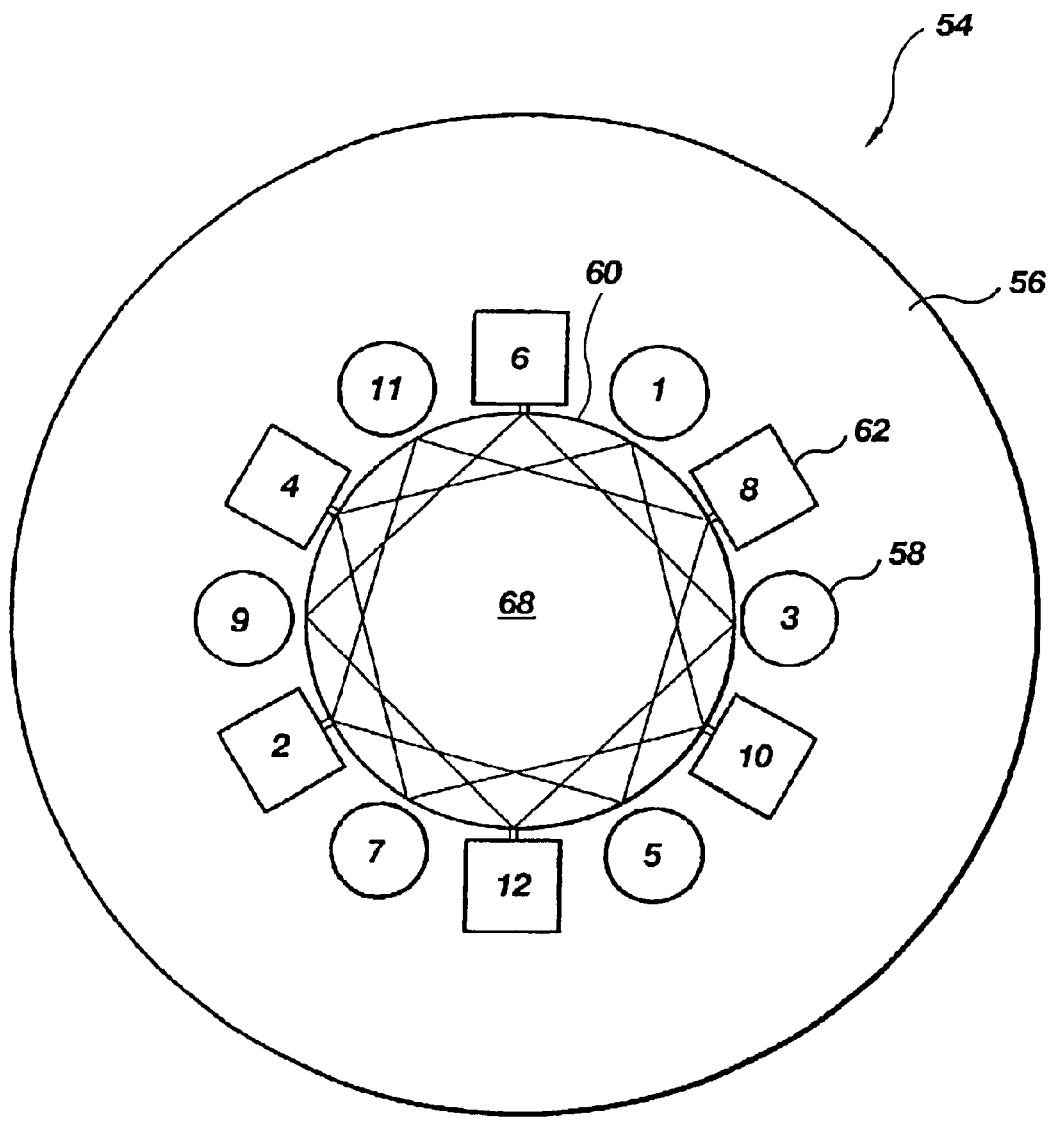
FIG. 5C is plan view of the rotatable diagram of FIG. 5A after rotation, showing the rearrangement of colors/note shapes into the musical chromatic scale order, with a disk overlay of squares illustrating relations of relative minor keys.

Referring to FIG. 5C, the same diagram as above is shown. The wheel 60, having primary- and secondary-colored note shapes 62, has been rotated to show the musical chromatic scale order. Here, the "squares" plate 68 (mentioned in the description of FIG. 5B, above) is in place to show the three sets of relative minors. For instance, following a counterclockwise direction, a student can see that red/C/1a's relative minor is orange-yellow/A/③a, whose relative minor is green/G♭/1b, whose relative minor is blue-purple/E♭/③b, whose relative minor is red/C/1a, ad infinitum. This procedure is operable in the same manner for all notes/colors. One can see that the 1's and the ③'s form a "minors square." Likewise, the 2's and the ①'s form a square, as do the 3's and the ②'s.

Figure 6A:
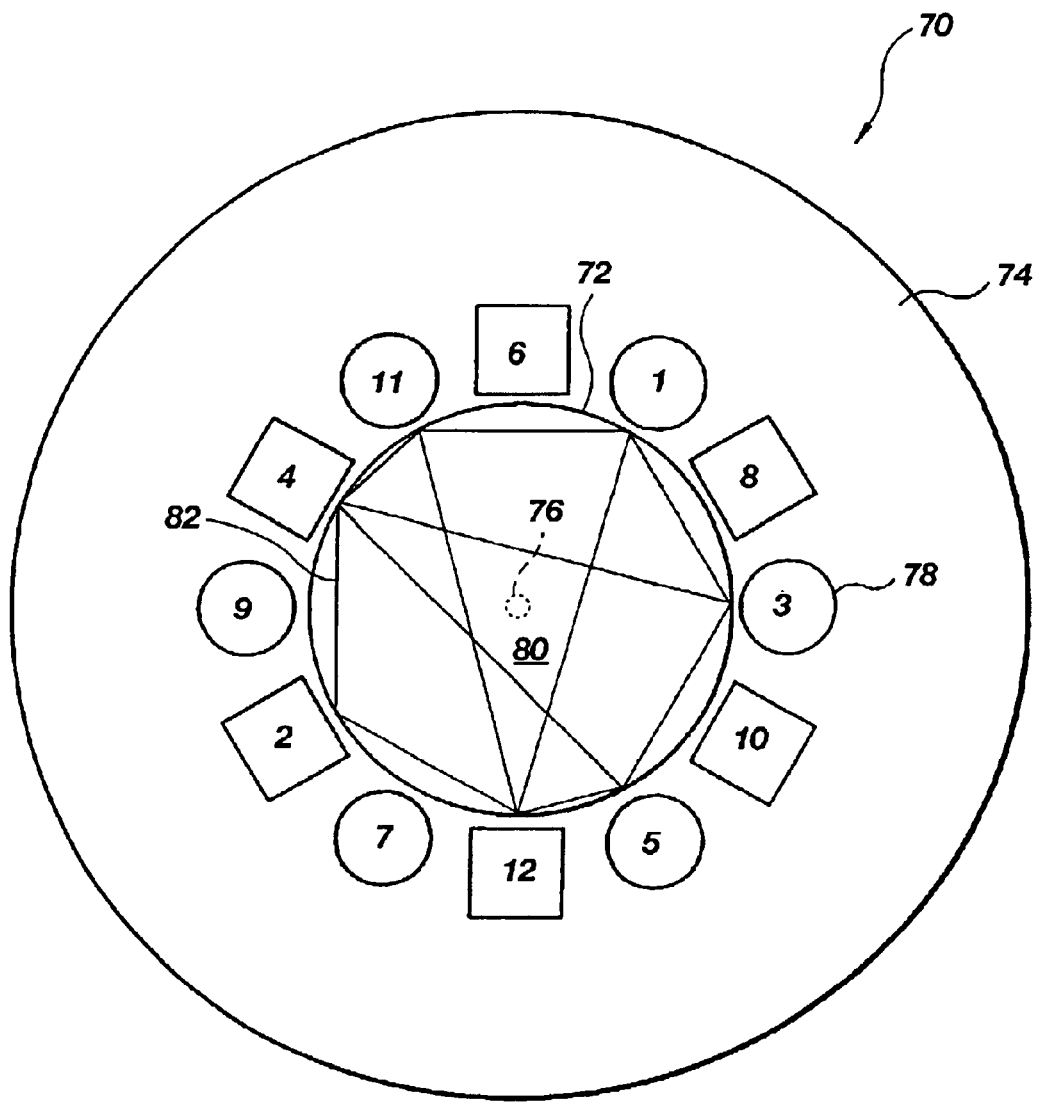
FIG. 6A depicts a device similar to that in FIGS. 5A–5C. All of the colored shapes representing notes are positioned on the stationary background in the musical chromatic scale order, while the rotatable disk holds a faceplate that bears traced lines illuminating harmonic, melodic, and intervallic relations between notes.
Figure 6B:
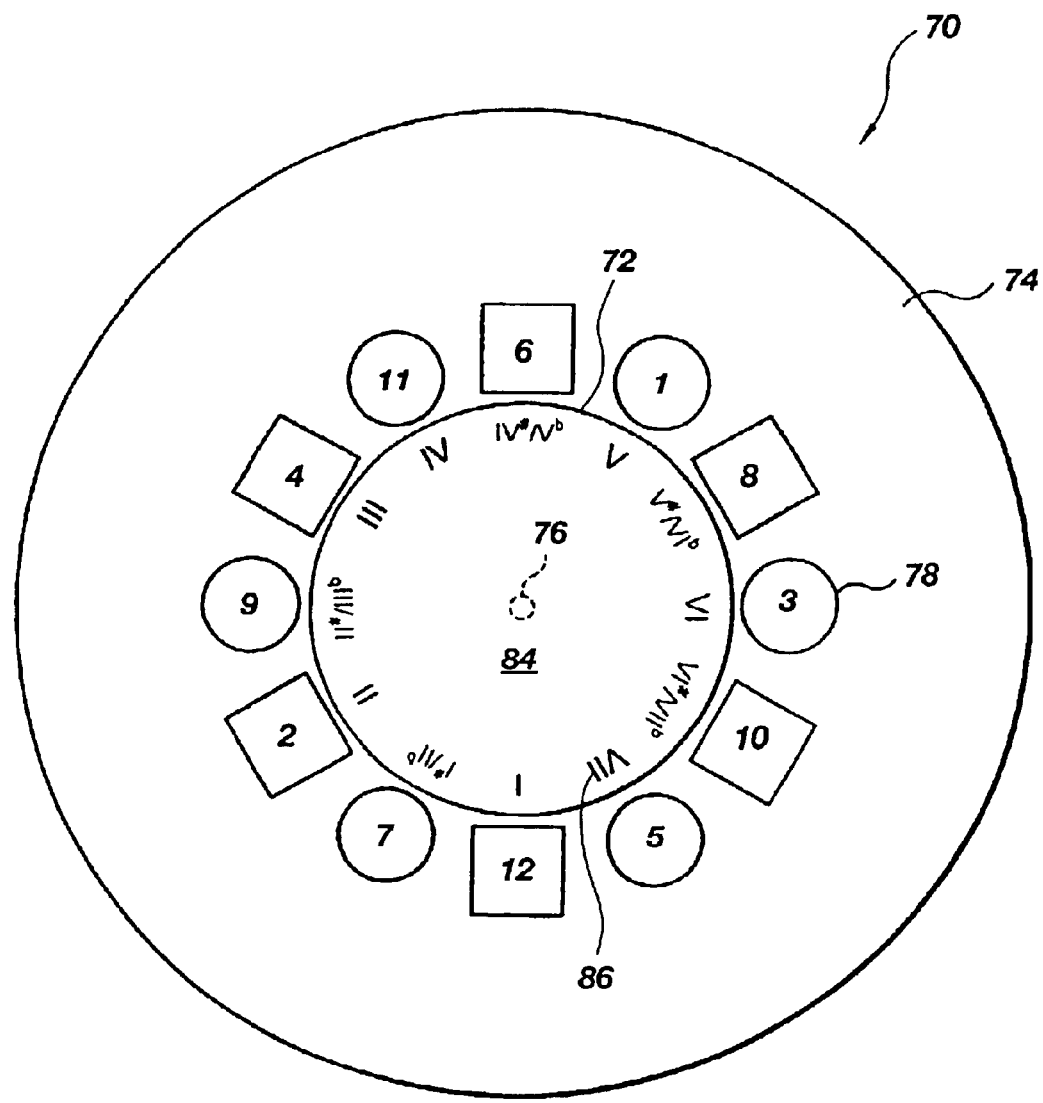
FIG. 6B depicts the device of FIG. 6A, but with a faceplate in position that bears the set of commonly-used Roman numerals to illustrate note intervals.
Figure 6C:
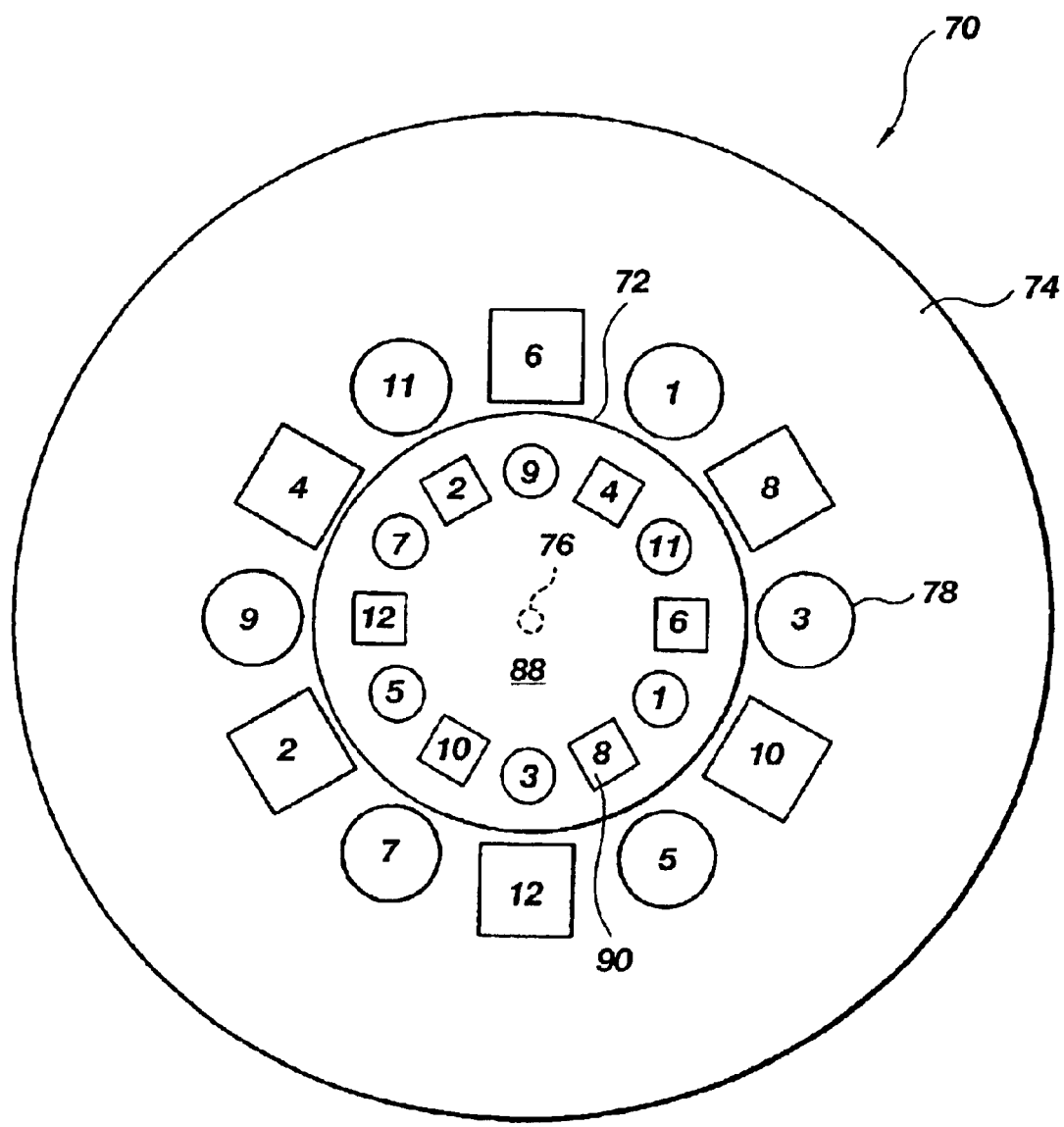
FIG. 6C shows the device of FIG. 6A, with a faceplate that bears a smaller chromatic scale circle of colors/notes—each color/note on the stationary background being aligned with the color/note on the rotating disk that represents its respective relative minor.

Referring to FIGS. 6A–6C, there is depicted a diagram 70 similar to the diagram 54 in FIGS. 5A–5C. Like that of FIGS. 5A–5C, this diagram includes a rotatable wheel 72 placed concentric to a stationary base 74, with the wheel 72 rotatable on an axis 76. All of the colored shapes representing notes 78 are positioned (e.g. by magnets) on the stationary background 74 in the musical chromatic scale order, while the rotatable disk 72 holds a faceplate 80 that bears traced lines 82 illuminating harmonic, melodic, and intervallic relations between notes.

The faceplate lines illuminate the intervals used to construct, in this example, a C/red-major scale. As the lines indicate, a whole step is made from C/red to the second note of the scale, D/orange. Another whole step is made to arrive at the major-third of the scale, E/yellow. The next line traced is smaller than the previous two, indicating that the next interval in this ascending scale is a half step, to C/red's fourth or subdominant, F/purple-red. Another whole step is taken to C/red's fifth or dominant, G/red-orange. Yet another whole step is taken to A/orange-yellow, which is C/red's sixth note and relative minor. Another whole step is then taken to C/red's major seventh, B/yellow-green. A half step is then taken to return to the tonic, C/red.

Additional lines have been traced between certain notes to further illustrate the special significance and relationships the notes/colors have to one another. Lines have been drawn from C/red to its subdominant, (F/purple-red), and dominant, (G/red-orange). Similar lines have been traced between C/red's major third, E/yellow, and C/red's sixth and major-seventh notes (A/orange-yellow and B/yellow-green, respectively). This clearly illustrates that the sixth and major seventh of a given major scale are, respectively, the subdominant and dominant of the major third.

In actuality, similar lines could also have been drawn between the second note/color of the scale, D/orange, and its respective subdominant and dominant, G/red-orange and A/orange-yellow. One can see, therefore, that the fourth, fifth, sixth, and major-seventh of a major scale are the colors/notes that surround the tonic, second, and major-third in a circle-of-fifths formation.

In other words, when playing a major scale, a whole step is made from the tonic to the second note, followed by another whole step to the third note of the scale. The subsequent order of half- and whole-steps in the major scale results in all of the complements of the first, second, and third notes/colors being skipped. Being able to see how the colors—and, therefore, their corresponding notes—relate harmonically and intervallically, makes study of music theory and practice of musical instruments much easier.

One could look into further detail at the note/color relations. Using this example, A/orange-yellow—the subdominant of C/red's major third, E/yellow—is the major third of C/red's subdominant, F/purple-red. Likewise, the major-seventh note in this example, B/yellow-green—the dominant of C/red's major third, E/yellow—is the major third of C/red's dominant, G/red-orange. By rotating the disk 72, these lines illustrate the same intervals and relationships between notes/colors in any of the keys. Similar faceplates can be used that bear lines illuminating harmonic relationships and intervals involved in other scales, chords, etc.

Referring to FIG. 6B, the same diagram 70 of FIG. 6A is shown, but with an alternate faceplate 84 in position that bears the set of commonly-used Roman numerals 86 to illustrate note intervals. In the Roman numeral system, any numeral and note can be paired. For example, any note can be the tonic—that is, be labeled as numeral "I," or "one." In this example, the numeral "I" is aligned with C/red. As a result, the remaining Roman numerals are accordingly paired with the remaining notes/colors—outlining, again, a C/red scale.

The Roman numeral formula used to create a major scale is: I, II, III, IV, V, VI, VII, VIII (I). Therefore, by looking at these numerals' corresponding colors/note shapes in this example, one can pick out the C/red-major scale: C/red, D/orange, E/yellow, F/purple-red, G/red-orange, A/orange-yellow, B/yellow-green, and C/red.

The Roman numeral system of designating intervals is used as a convenient way of identifying general note relations applicable to any and all keys. The same concept applies when using general terms such as "tonic," "subdominant," "dominant," etc. General note relations, therefore, can be communicated without implying any particular notes or keys.

As mentioned, music theory has been described as "math without numbers." If each note was always assigned the same number, then commonly used systems of designating general note relations—such as the Roman numeral system—would be very confusing. Therefore, the use of alphabetical letters has become standard when referring to specific notes and their relations, while numbers have come to be used as a way of referring to general note relations.

Because people have formed such a strong association between letters and language, the use of letters within the mathematical realm of music theory can complicate matters. For instance, using the key of C as an example again, it is not readily apparent that "E" is the major third of "C." Nor is it an intuitive assumption that "G" is the fifth, or dominant, of "C." As a result, the use of numbers has become the standard way of clarifying the intervals and relationships between lettered notes.

In looking at the diagram 70 of FIG. 6B, the faceplate 84 of Roman numerals 86 helps illustrate the general note relations and intervals between the notes. As mentioned, the rotating disk 72 can be rotated to any position so that the numeral "I" would align with any note/color and outline the note relations in any particular key. Because the rules or formulas governing how the colors/note shapes relate are the same as those governing how their corresponding musical tones relate, the student who understands the formulas of color/note shape relations of the inventive method for one key, will also understand the same note/color relations for the other keys.

The incorporation of numerals 86 would be especially useful if the chromatic scale circle in this diagram consisted of only the alphabetical letter names for the various notes. That is because, as mentioned, many people do not have a tendency to visualize the harmonic intervals between alphabetical letters. With the aid of numbers that are more suitable for conveying intervals, a student can more easily comprehend how the notes relate when labeled only by letters.

To restate, with use of the inventive color code, the general formulas illustrated by the Roman numerals are already apparent. The specific colors/note shapes correspond to specific musical notes or tones while the intervallic and harmonic relations between the colors/note shapes illustrate the various general relations. In other words, the inventive color code illustrates the general and specific note relations at the same time. This enables the student to see multiple scales, modes, chords, and other note relations simultaneously and much more easily, making the inventive method comprehensive and very user-friendly.

Referring to FIG. 6C, the same diagram 70 of FIG. 6A is shown, now with a faceplate 88 that bears a smaller chromatic scale circle of colors/notes 90. Each color/note 78 on the stationary background 74 has been aligned with the color/note 90 on the rotating disk 72 that represents its respective relative minor.

The faceplates, 80, 84, and 88, shown in position on the diagram 70 of FIGS. 6A, 6B, and 6C are representative of the various faceplates that can be used. As mentioned, numerous diagrams or charts may be used that employ the musical chromatic scale order of colors to further illuminate or illustrate relationships between notes. Some examples are: replacing the Roman numeral system of identifying note formulas with solmization (Do, Di, Re, Ri, Me, Fa, etc.) or substituting the atonal music number system (0–11), tracing lines between notes/colors that represent intervals involved in the construction of various chords or scales, tracing lines around groups of notes, etc.

Figure 6D:
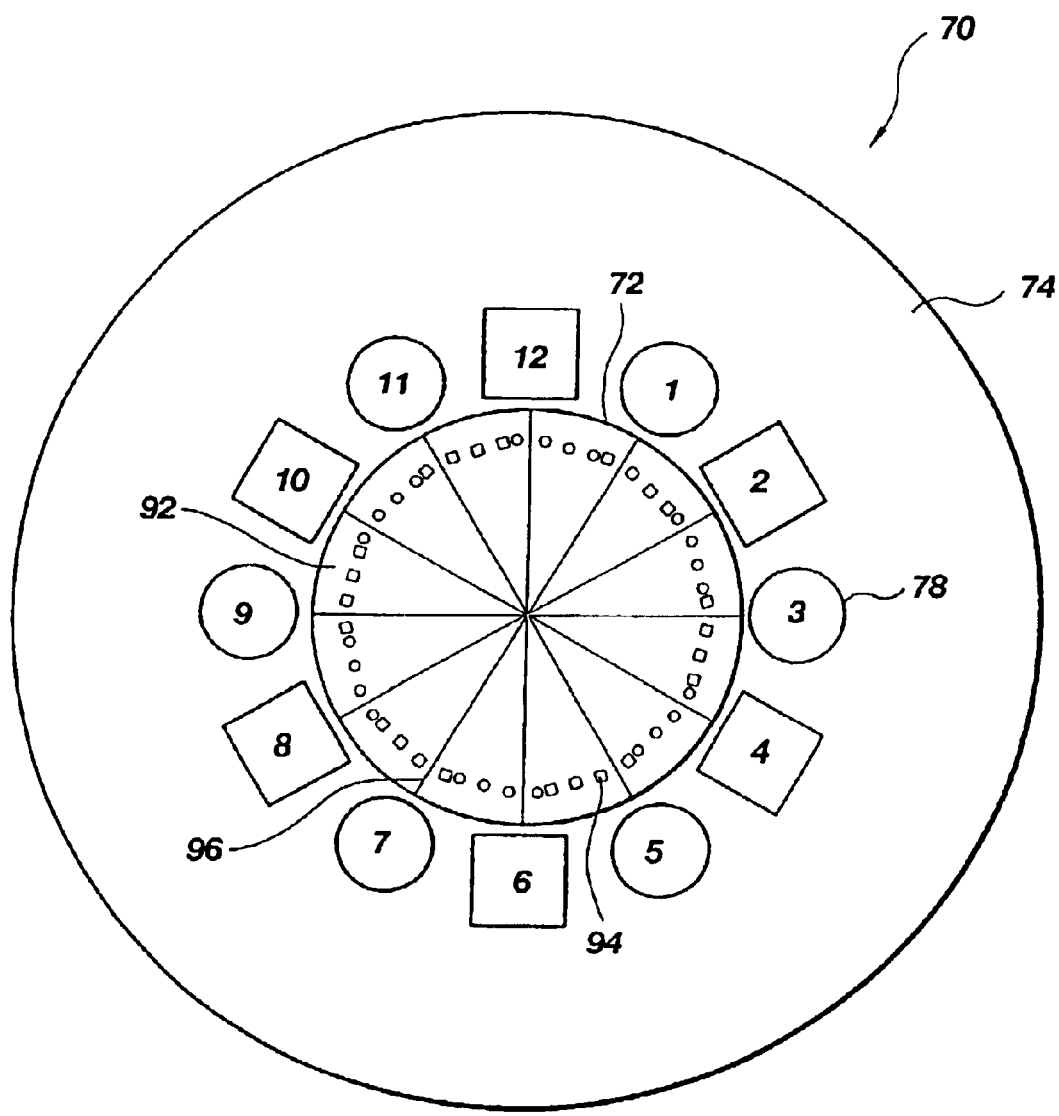
FIG. 6D illustrates the device of FIG. 6A, with the colors/note shapes in the circle-of-fifths/color wheel arrangement and a faceplate that bears colors/notes divided into tetrachords forming all of the successive major scales.

Referring to FIG. 6D, there is depicted the diagram 70 as seen in FIGS. 6A–6C, but with the colored shapes representing notes 78 having been rearranged into the order of the circle of fifths/color wheel. Because the colored shapes 78 are attached to the stationary background 74 by magnets or removable adhesives, this rearrangement is done easily. The rotatable disk 72 holds a faceplate 92 that bears a circular formation of colors/notes 94. The colors/notes 94 on the faceplate 92 are arranged in an order that represents all of the major scales. The intervals between the colors/notes mimic the harmonic intervals between tones in each major scale. Lines 96 on the faceplate divide the colors/notes 94 into tetrachords.

Referring to the example used in the description of FIG. 1A, it is shown that the C-major scale is: C D EF G A BC (or red, orange, yellow, purple-red, red-orange, orange-yellow, yellow-green, and red—also see FIG. 6A). The G-major scale is: G A BC D E F♯G (or red-orange, orange-yellow, yellow-green, red, orange, yellow, green, and red-orange). Lastly, the D-major scale is: D E F♯G A B C♯D (or orange, yellow, green, red-orange, orange-yellow, yellow-green, green-blue, and orange). The key of G/red-orange, therefore, is made up of equal parts of C/red and D/orange—the keys that precede and follow it in the circle of fifths. It incorporates the latter half (or the second tetrachord) of the C-major scale (G A BC—red-orange, orange-yellow, yellow-green, and red) and the first part (or first tetrachord) of the D-major scale (D E F♯G—orange, yellow, green, and red-orange).

Figure 7A:
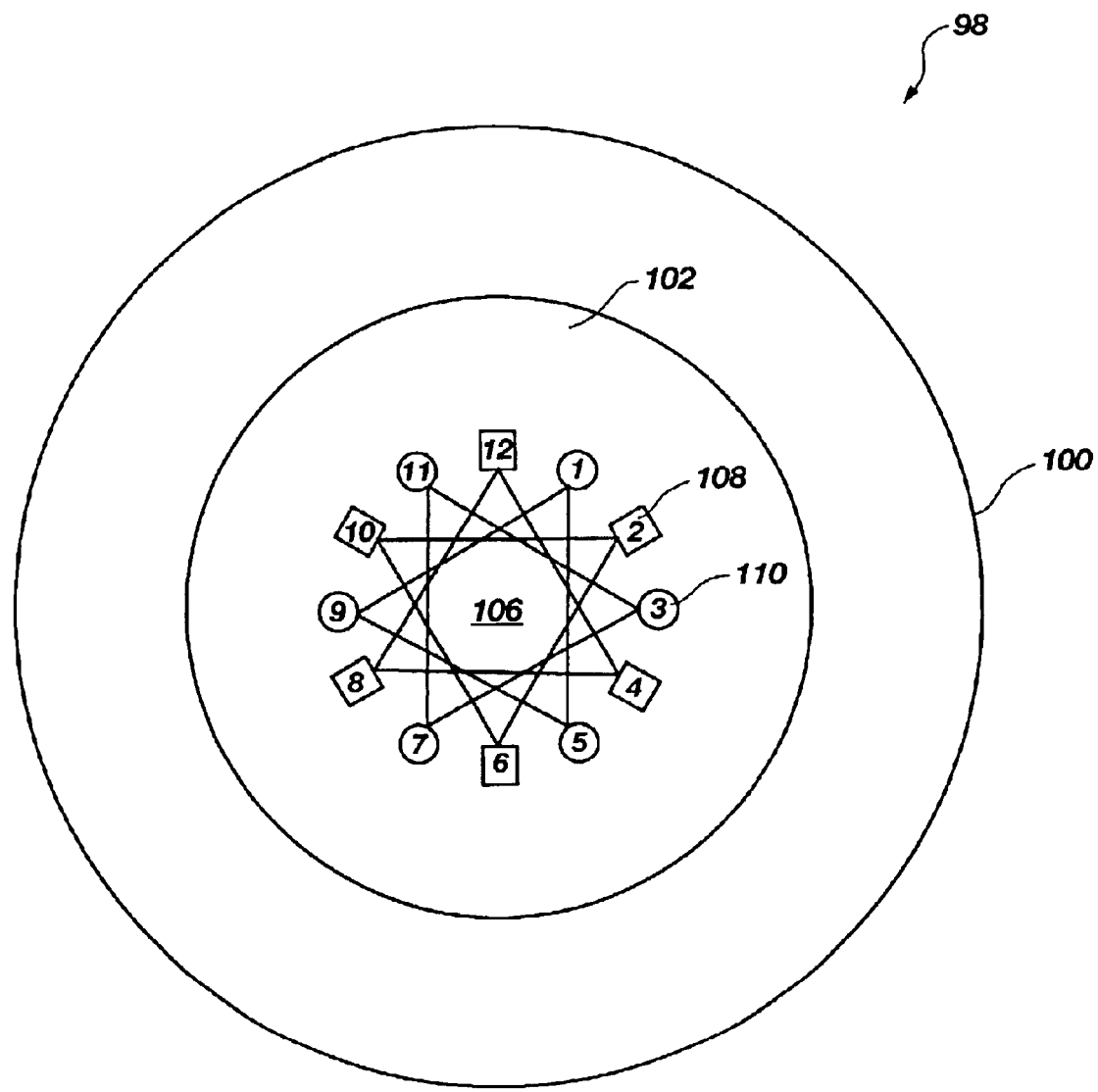
FIG. 7A depicts a plan view of a device that combines elements of the devices depicted in FIGS. 5A–6D.
Figure 7B:
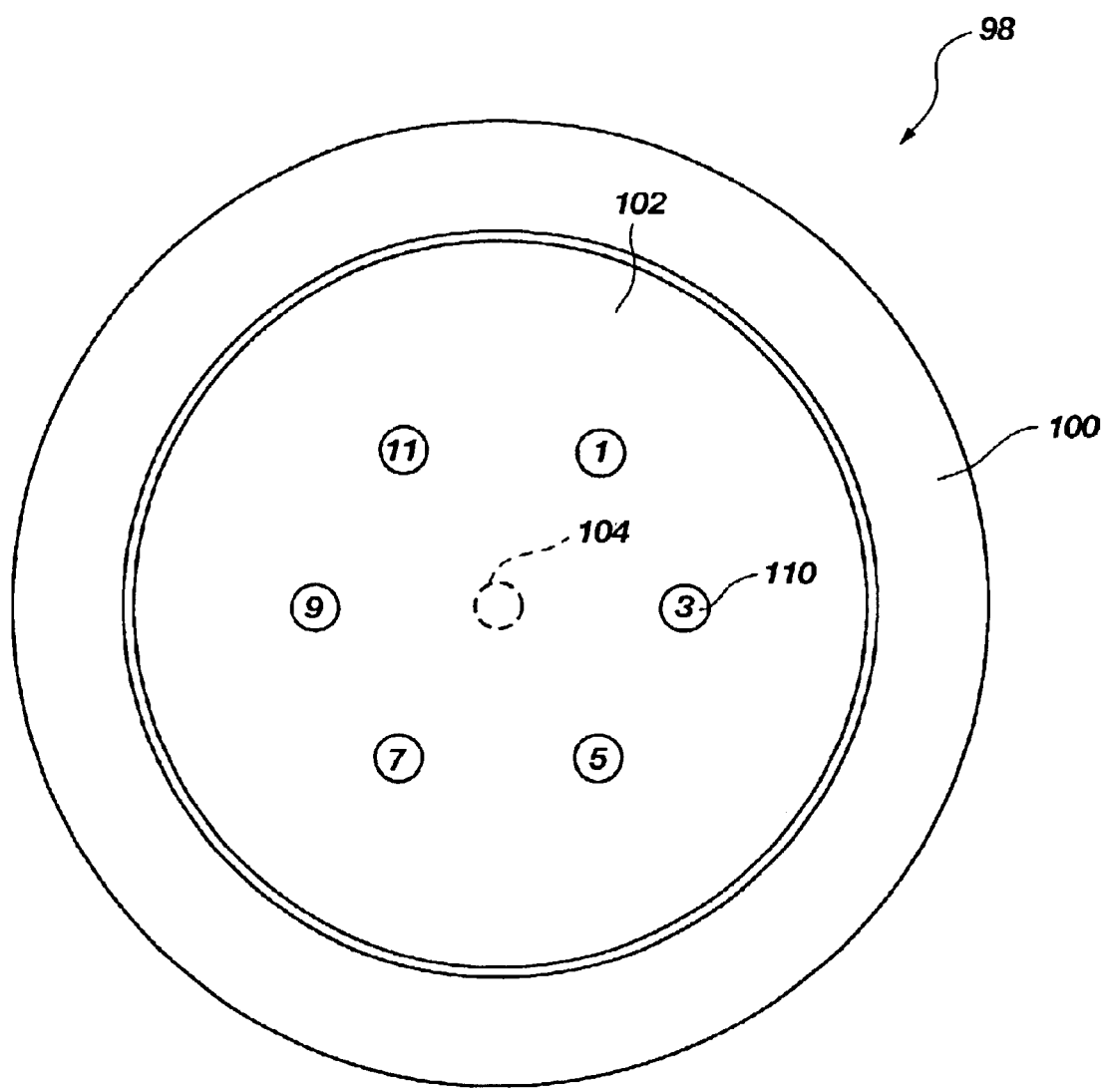
FIG. 7B depicts the device of 7A with the faceplate(s) removed.
Figure 7C:
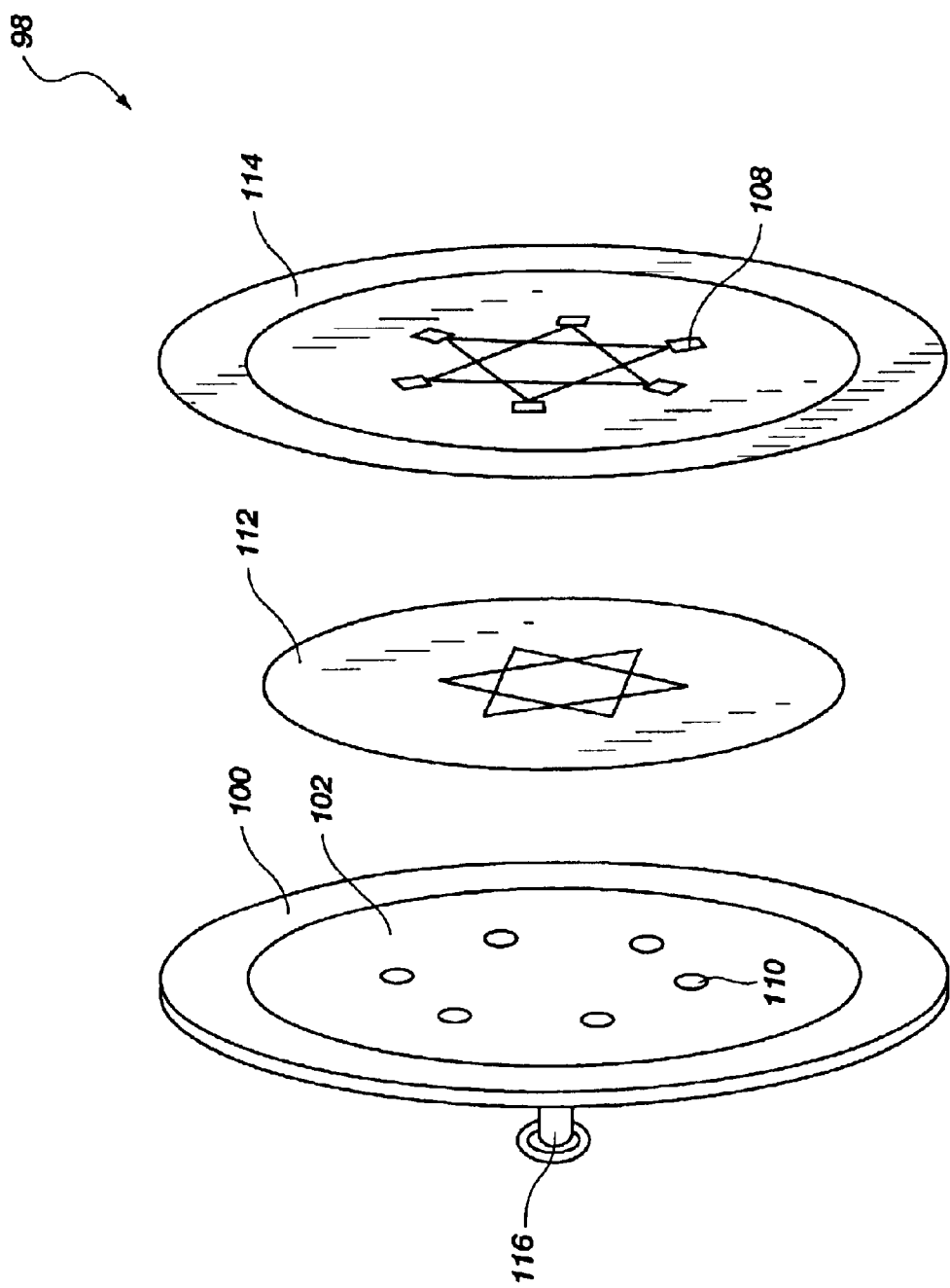
FIG. 7C shows a side view of the device in FIG. 7A with optional faceplates detached.

Referring to FIGS. 7A, 7B, and 7C, a diagram 98 illustrates a rotating device that incorporates elements of those devices depicted in FIGS. 5A–6D. FIG. 7A shows a plan view of the device, while FIG. 7B shows a plan view of the device with the faceplate(s) removed. FIG. 7C shows an angled view of the device along with optional, detached faceplates.

In FIG. 7A, the diagram 98 is illustrated with an outer rotating disk 100 and an inner rotating disk 102. The disks are both rotatable on an axis 104 and are placed in concentric, parallel relation to one another. Connected to the outer disk 100 and, therefore, over the inner disk 102, is a transparent overlay or faceplate 106 holding the primary- and secondary-colored note shapes 108. In this view, all of the primary- and secondary-colored note shapes 108, as well as the tertiary-colored note shapes 110, are seen in a circular formation.

Referring to FIG. 7B, the diagram 98 is shown with the faceplate 106 having been removed, along with the notes/colors 108 it was holding. In this view, one is able to see more clearly how the inner disk 102 and outer disk 100 are positioned with relation to one another. As mentioned both disks are concentric and rotatable on an axis 104. As a result, one is able to move the inner disk 102 along with the colors/notes shapes, markings, and/or optional faceplate(s) it holds in relation to a stationary outer disk 100 and the faceplate(s) it holds, or, conversely, move the outer disk 100 and the faceplate(s) it holds in relation to a stationary inner disk 102 and the graphic data or markings it holds.

In this embodiment of the present invention, each color/note shape may be connected to the inner disk by a magnet so they are capable of being rearranged and/or removed easily. A student can, therefore, use this device as he or she would use the device depicted in FIGS. 6A–6D. By connecting all of the colors/note shapes to the surface of the inner disk 102, he or she can simply connect faceplate(s) to the outer disk 100 that bear information illuminating note/color relations.

Because each color/note shape is connected to the inner disk by magnets, each can be removed. As a result, a student can use this device as he or she would use the device depicted in FIGS. 5A–5C. For instance, the student can remove all of the primary- and secondary-colored note shapes from the surface of the inner disk—leaving all of the tertiary-colored note shapes in place. Then, by applying a faceplate to the outer disk that bears primary- and secondary-colored note shapes, he or she is able to illustrate the rotation of colors/note shapes that rearranges the circle of fifths/color wheel in the musical chromatic scale arrangement, and vice versa.

An advantage of using this device to illustrate the above rotation is that both the inner and outer disks are capable of being rotated in relation to the other. Therefore, using the above example, the student can rotate the outer disk holding the faceplate bearing the primary and secondary colors, or rotate the inner disk holding the tertiary colors.

Another advantage that this embodiment of the invention offers is the ability to illustrate note/color relations as the devices shown in FIGS. 5A–5C and 6A–6D, but without having the line of the inner disk's periphery visible. For instance, referring to the diagram 70 of FIG. 6B, on can see that, because the rotating disk 72 is simply placed in complete view on the surface of the stationary background 74, its periphery or edges form a line separating the Roman numerals 86 from the colors/note shapes 78. Though the effect is subtle and may go unnoticed by many people, some may prefer having no visual "obstruction" between the markings or symbols on the faceplate and other markings on the disks.

Each faceplate that may be connected to the outer disk 100 of the diagram 98 of FIGS. 7A, 7B, and 7C, is opaque around the edges so as to cover the space between the periphery of the inner disk 102 and the inner edge of the outer disk 100 (as seen in FIG. 7B). The center portion of each faceplate 106 is transparent so that one can see both the markings it bears as well as the markings on the surface of the inner disk 102.

Transparent faceplates may also be connected around the edges of the inner disk 102, as well. Referring to FIG. 7C, the diagram 98 of FIGS. 7A and 7B is shown in an exploded perspective view. As in FIG. 7B, only the tertiarycolored note shapes 110 are connected to the surface of the inner disk 102. A faceplate or overlay 112 bearing two triangles facing opposition directions is above the inner disk 102, ready to be placed into position onto the inner disk. The triangles are to be lined up so as to connect all of the "pseudo primaries" and "pseudo secondaries" (see FIG. 5A). Another faceplate or overlay 114 is lined up with the outer disk 100, ready to be placed into position onto the outer disk. This faceplate 114 holds the primary- and secondary-colored note shapes with similar triangles connecting all of the primaries and all of the secondaries. The handle 116 can be seen from behind the disks.

Once each faceplate in this example is connected with its respective disk, the disks can be rotated to display how, for instance, the relative positioning of the triangles of major thirds change when rotated from a circle-of-fifths/color wheel arrangement to a chromatic scale arrangement.

FIGS. 7A, 7B, and 7C, depict a device that is capable of illustrating the same information as the devices shown in FIGS. 5A–6D. This alternate embodiment is provided for those who wish to combine or consolidate the capabilities of the devices shown in FIGS. 5A–5C and FIGS. 6A–6D.

Figure 8A:
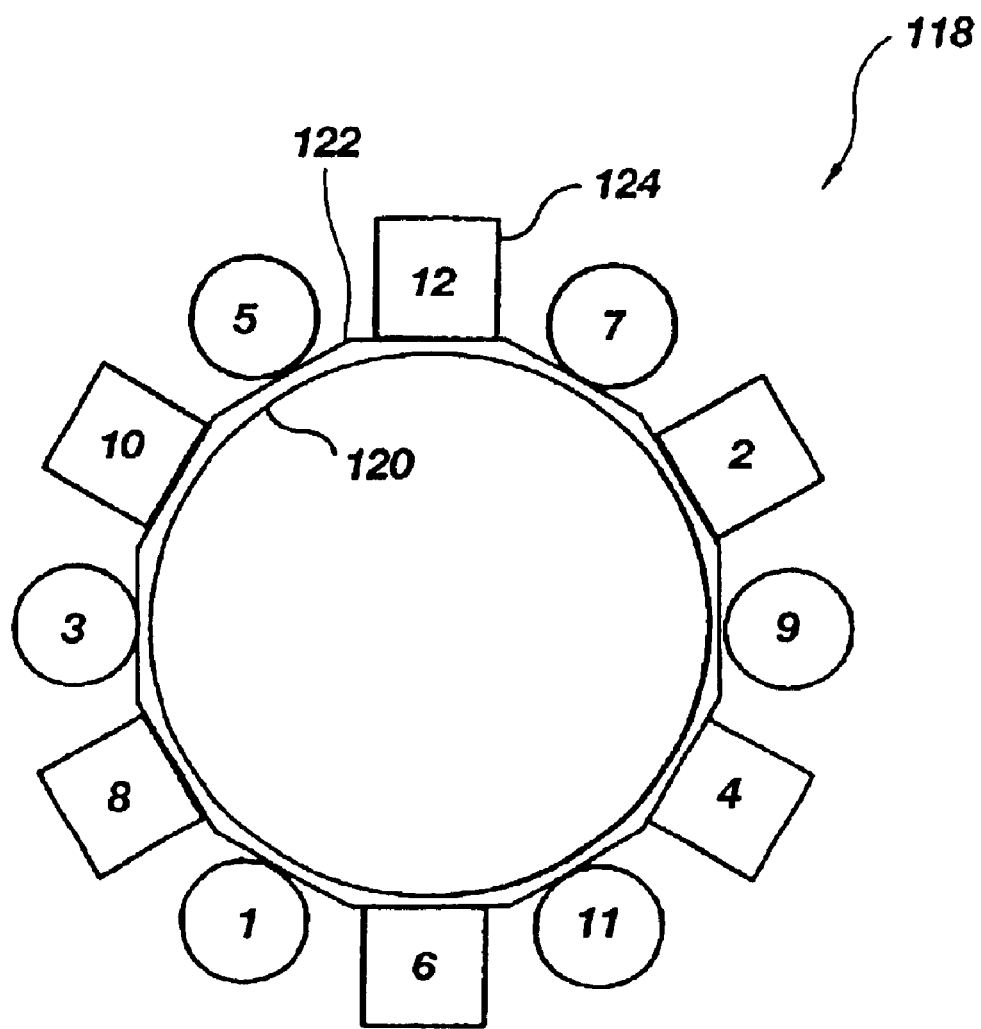
FIG. 8A shows the diagram of colors/notes as in FIG. 6C, before breaking the chromatic scale circle.
Figure 8B:
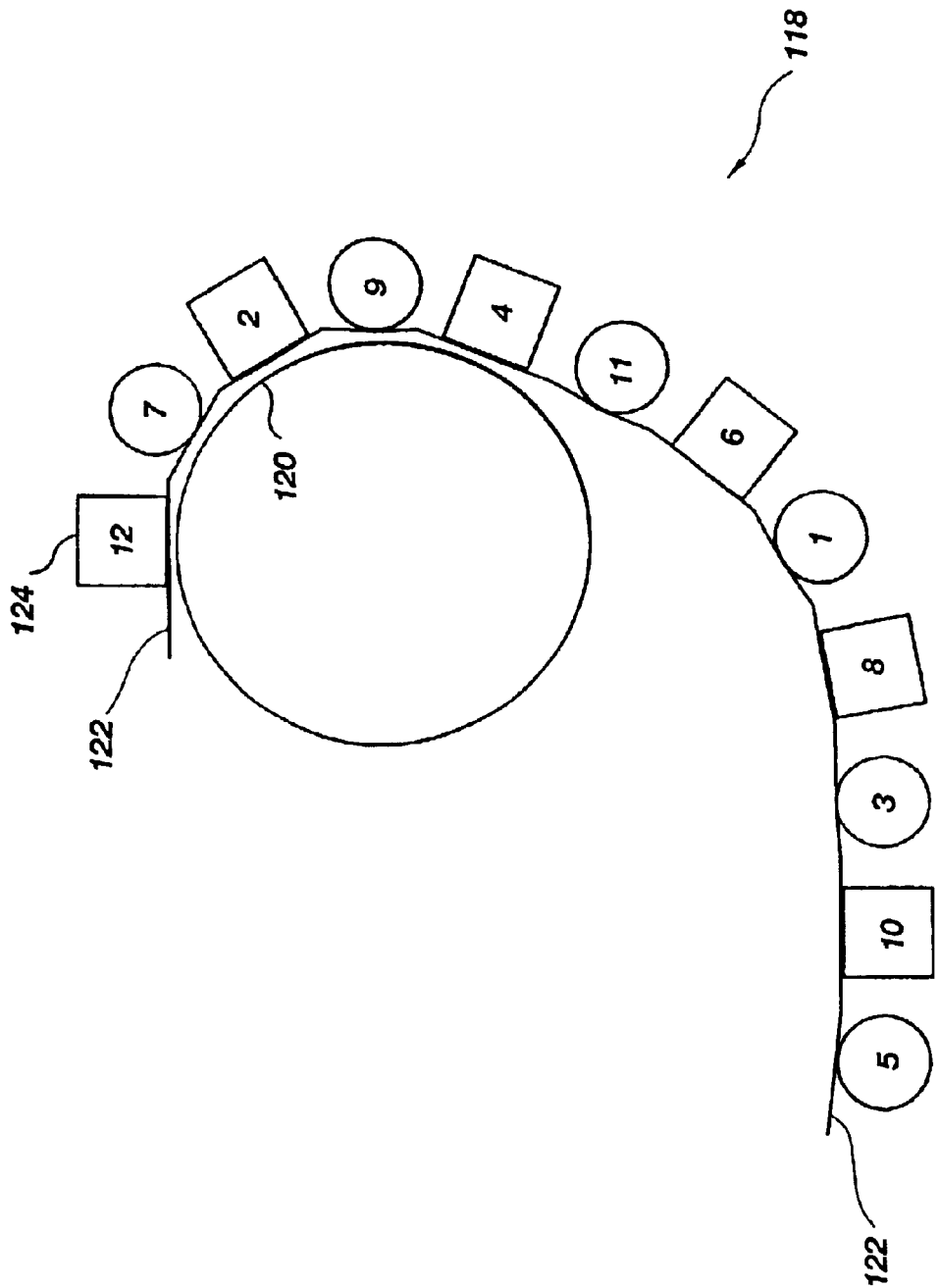
FIG. 8B shows the diagram of colored note shapes of FIG. 8A, in the process of being unwound from a circular formation.
Figure 8C:
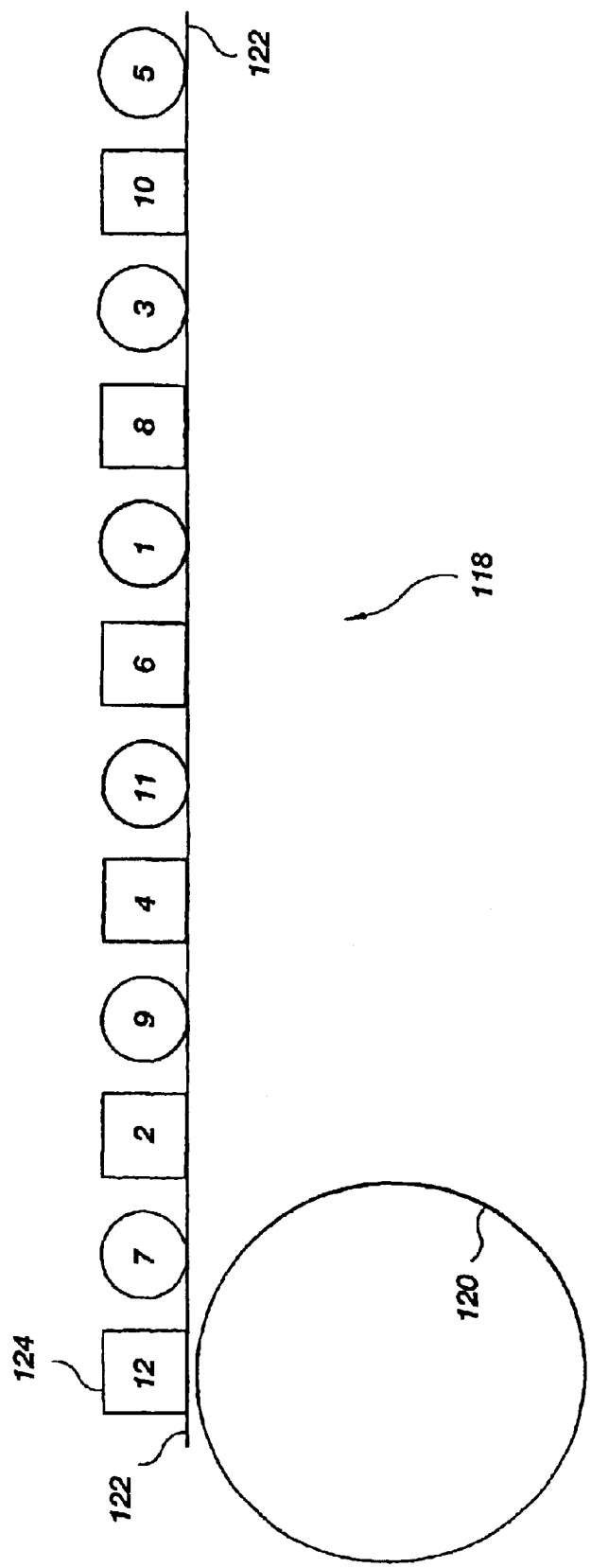
FIG. 8C depicts the diagram of colored note shapes of FIG. 8A, unwound to a linear arrangement.

Referring to FIGS. 8A–8C, there is illustrated a diagram that makes clear how the inventive circular chromatic scale color arrangement relates to its linear form. Even after seeing the diagram in FIGS. 5A–5C rearrange the circle-of-fifths order of colors/notes into the chromatic-scale order of colors/notes and then, even after studying note relations as illustrated in the diagrams of FIGS. 6A–6C and FIGS. 7A–7C, some students may still have difficulty in perceiving how such note relations apply to an actual instrument such as a keyboard, for example. Although the diagram in FIG. 4B shows the colors/"keys" in the order of the musical chromatic scale, a keyboard is not wrapped in a circular formation, but is in a linear form.

The diagrams of FIGS. 8A–8C are helpful in illustrating how the circle of fifths-chromatic scale circle relates to the actual chromatic scale in its linear format. When in the circular form, it is easy to see how the scale is an endlessly repeating pattern, both in a clockwise or counterclockwise direction. However, because a keyboard is in the linear form, the circle must be severed at some point and represented in a linear form.

FIGS. 8A–8C illustrate the process of unwrapping the chromatic-scale circle of colors/notes. FIG. 8A is a view of the diagram 118 (similar to the diagram 52 of FIG. 4B) before the circle 120 is broken at the point 122 between notes B/yellow-green and C/red 124. (Of course, the circle could be broken between any notes to illustrate the same concept, but, in this example, the point 122 between B and C 124 has been chosen.) FIG. 8B depicts the diagram 118 in the process of unwrapping. FIG. 8C is a view of the diagram 118 with the chromatic scale of colors/notes completely unwrapped and straightened into a linear format. Because C/red 124, for example, is preceded by B/yellow-green in the circular form, and B is followed by C, the twelve-note scale is repeated in the clockwise order, moving to the right, and in a counterclockwise order, moving to the left when in the linear form.

This shows why the keyboard is a repeating pattern. It is, essentially, a circular pattern. This diagram 118 additionally allows the student to follow and grasp how the triangle (major-third), square (minor), complementary, and other relations change in appearance when moving from a circular to a linear formation.

Figure 9:
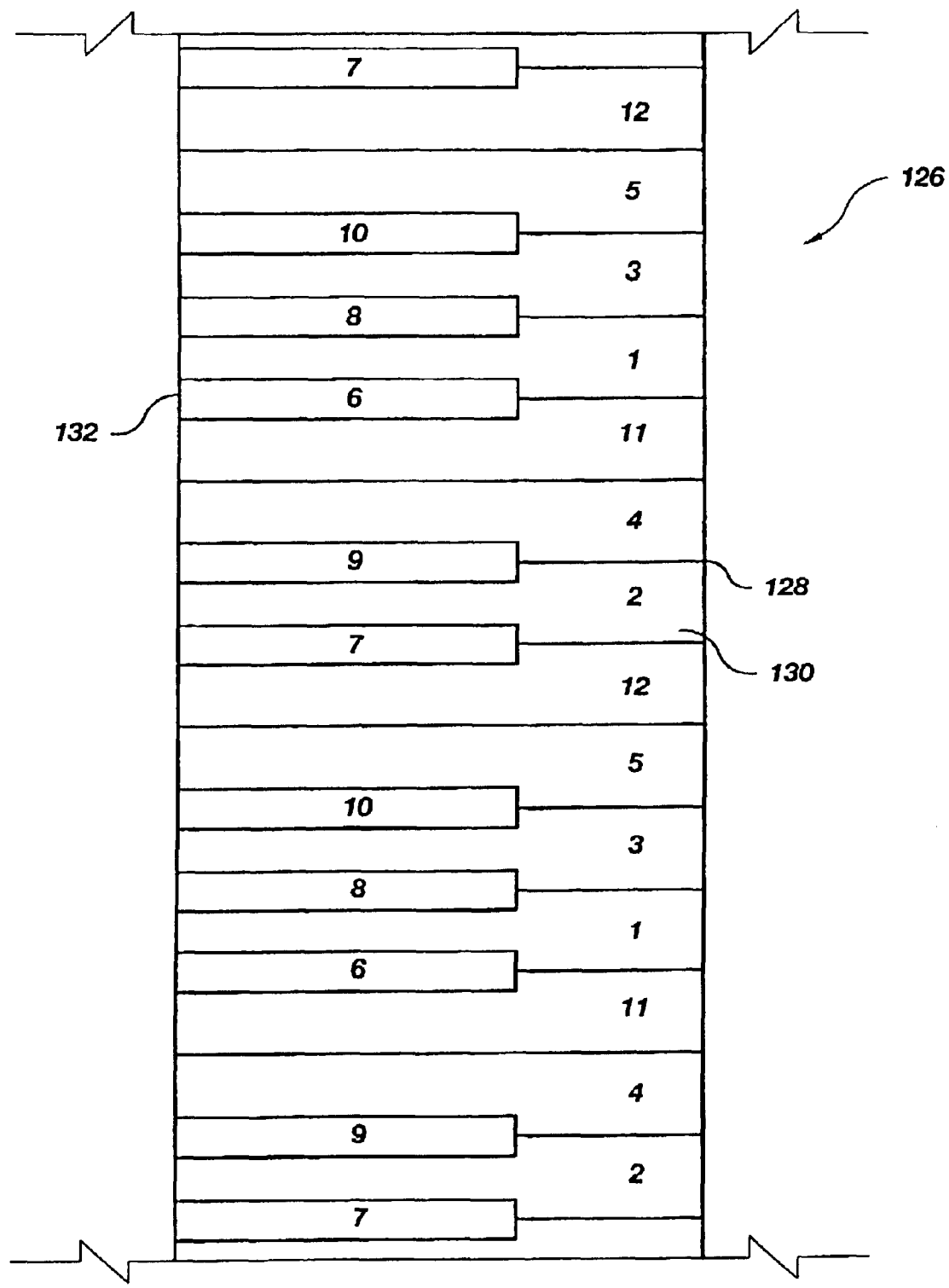
FIG. 9 is a view of a portion of a color-coded keyboard showing more than two octaves of keys colored according to the inventive musical chromatic-scale color scheme.

Referring to FIG. 9, a portion of a color-coded keyboard with two octaves of colored notes is depicted. The keyboard 126 is depicted by a two-octave portion 128 having angled (or "white") key shapes 130 and rectangular (or "black") key shapes 132. Looking at B (or C♭)/yellow-green and then at D♭/green-blue to its right (i.e., in clockwise direction), for example, one can see green/G♭'s "parent" and "child," or subdominant and dominant, respectively. (This use of the terms "parent" and "child" is the analogy of generations, which is an optional way of describing general note relations—useful when referring to successive keys from the circle-of-fifths formation. For example, the key in the circle of fifths following B is G♭ (also known as F♯), so G♭ is B's "child" and B is G♭'s "parent." Likewise, D♭ is G♭'s "child," while G♭ is D♭'s "parent," etc.)

Green/G♭ is in red/C's "natural environment," or circle-of-fifths/color wheel position. Now, green/G♭'s "parent" and "child" (B and D♭, respectively) are surrounded by its related thirds/secondaries, purple/B♭ and orange/D, respectively. In the same sense, red/C's "parent" and "child" (F and G, respectively) are surrounded by its own related thirds/primaries, yellow/E and blue/A♭, respectively. (As mentioned, these same general note/color relations apply to any and all keys/colors.)

Figure 10A:
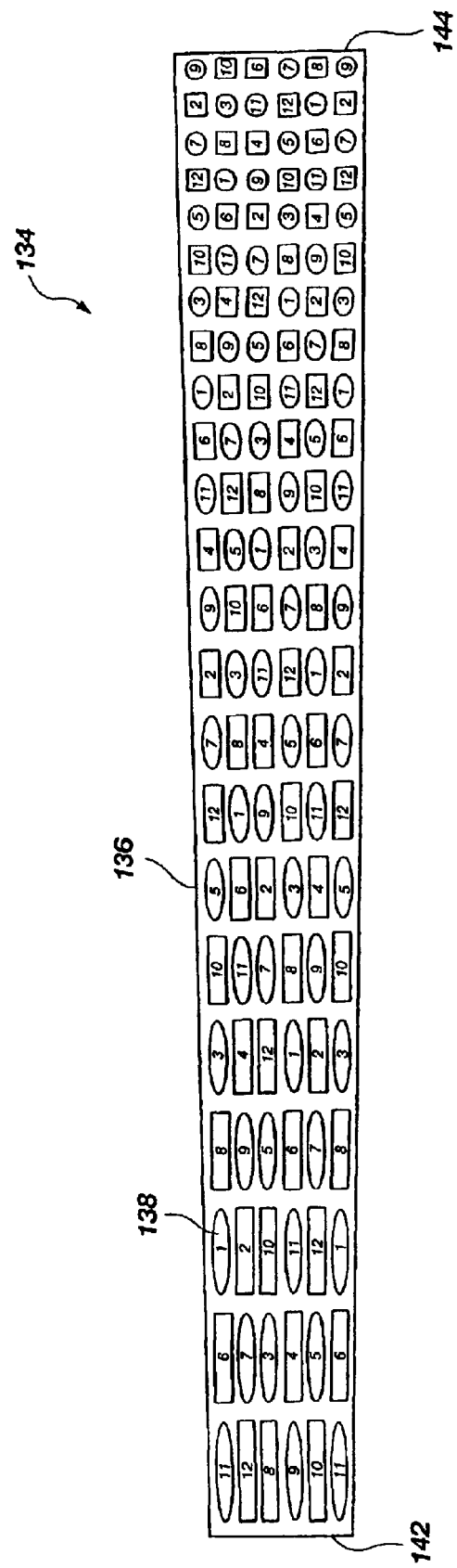
FIG. 10A is a scaled-down version of a guitar fingerboard diagram according to the present invention that corresponds to the frets and strings of a six-string guitar.

Referring to FIG. 10A, there is illustrated a scaled-down version of a guitar diagram. The guitar diagram 134 is presented in a scaled-down version 136 having colors/note shapes 138 and having a lower end 142 and an upper end 144. Some background information is presented to explain its operation, as follows.

Observing a single string, one can see that, by pressing it at any given fret, a single tone will be produced. Pressing the same string on the next fret immediately above or below the previous one will produce a tone that is one chromatic interval higher or lower, respectively. Therefore, each string is simply a chromatic scale. It then follows that the fingerboard of stringed instrument having several adjacent, parallel strings, is simply several adjacent, parallel chromatic scales.

Based on this concept, each fingerboard note position is color-coded with its corresponding note shape and color. A pattern develops, due to the fact that, in common guitar tuning, the strings are tuned to intervals of fifths from each other (i.e., E A D G, then B E). With each open string pitch "positioned" directly above or below its dominant or subdominant, respectively, a repeating pattern in the note colors/shapes is easily perceived.

Figure 10B:
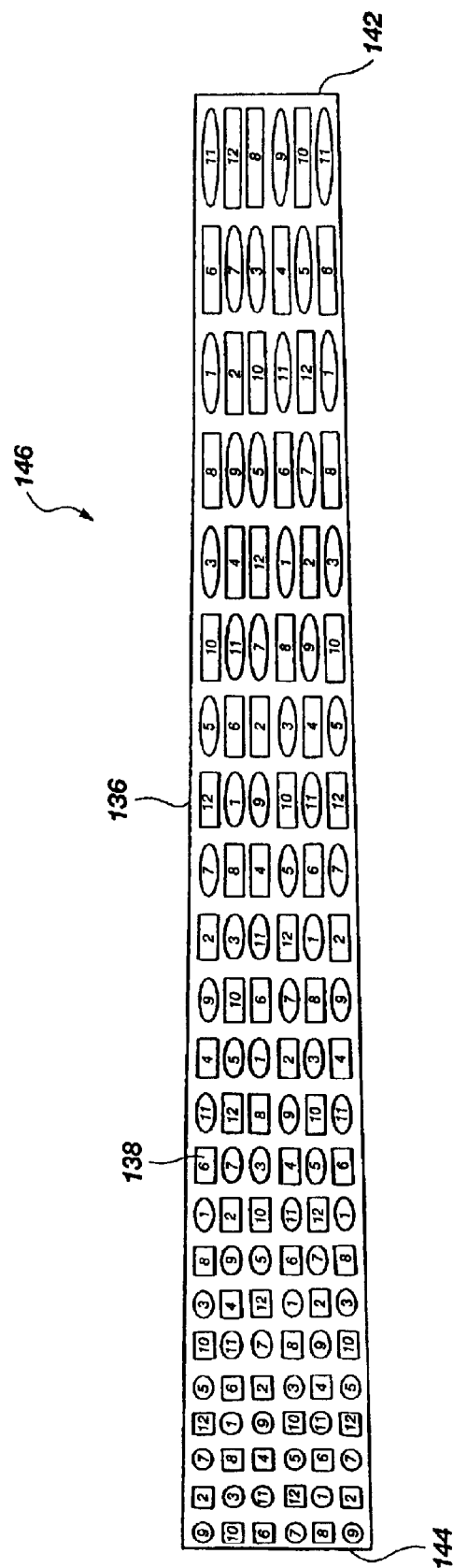
FIG. 10B is a depiction of a fingerboard diagram that is the mirror image of the one in FIG. 10A, which represents or illustrates how the inventive method and system of color coding applies to left-handed, as well as right-handed, instruments.

Referring to FIG. 10B, a depiction of a guitar fingerboard coding diagram 146 is shown that is the mirror image of the diagram 134 in FIG. 10A. All of the elements remain the same, however everything is simply reversed. This illustrates how the inventive method and system of color coding applies to left-handed, as well as right-handed, instruments.

Figure 11A:
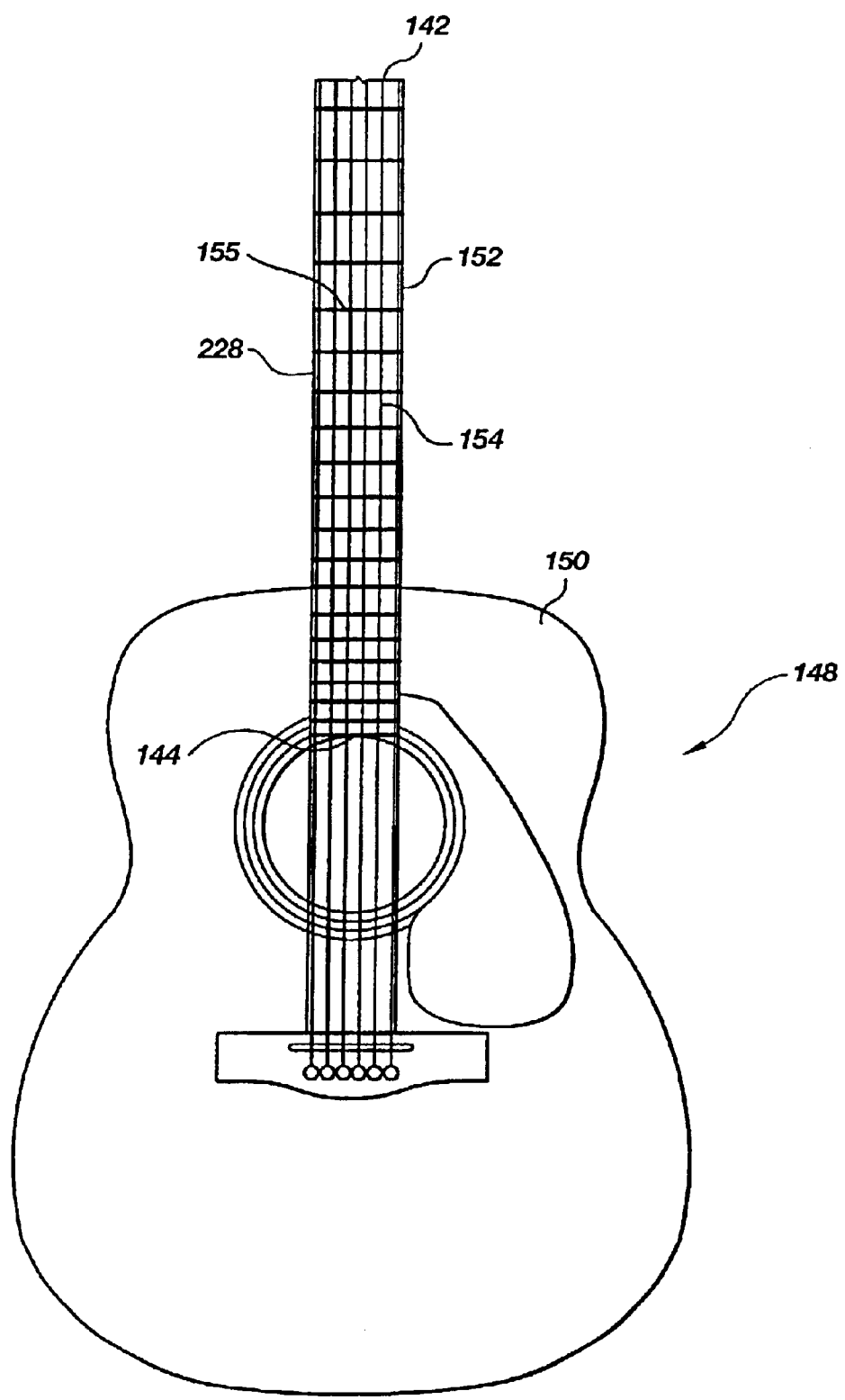
FIG. 11A is a depiction of a guitar useful with the color coding of the present invention.
Figure 11B:
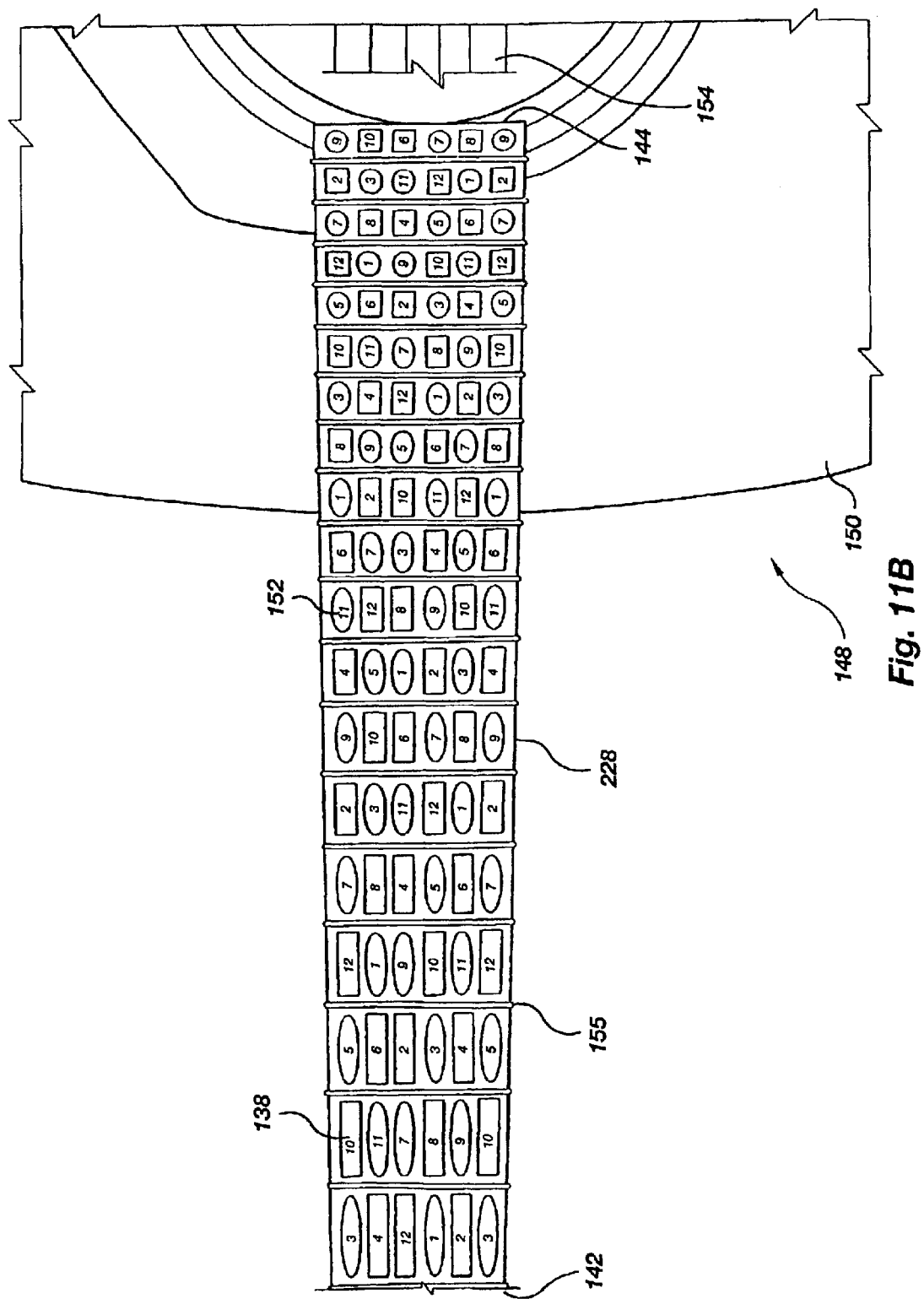
FIG. 11B is a detail view of the guitar fingerboard of FIG. 11A with the coding diagram of FIG. 10A applied.

Referring to FIGS. 11A and 11B, there is depicted a guitar along with its fingerboard illustrating an embodiment of the present invention. The guitar 148 features a guitar body 150 and a guitar fingerboard coding diagram with a bottom 142 and top 144 (see FIG. 10A) placed in position with relation to the fingerboard 152. The fingerboard or neck 152 supports strings 154, frets 155, and the inventive coding diagram 134 of shaped notes/colors 138. The color-coding of FIGS. 10A and 10B for each finger position may be applied to any right-handed or left-handed guitar 148, respectively. The number 228 designates a side of the fingerboard or neck addressed in the description of FIG. 13C.

Figure 11C:
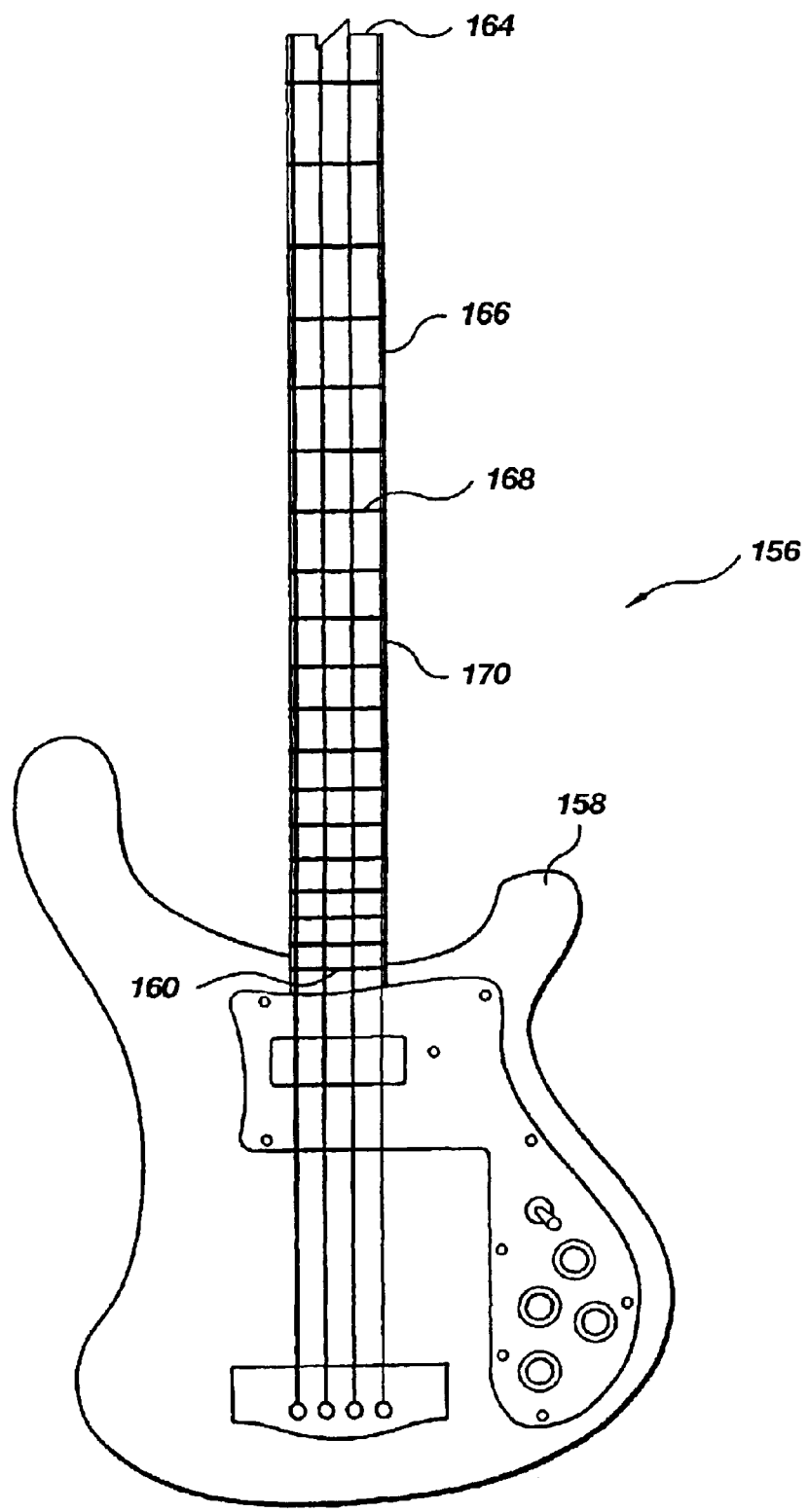
FIG. 11C is a depiction of a bass guitar useful with the colorcoding of the present invention.

Referring to FIG. 11C, there is depicted a bass guitar useful with the present invention. The bass guitar 156 comprises a body 158 and bass guitar diagram top 160 and bottom 164 placed in position with relation to the fingerboard 166 (see FIG. 12B below for a representation of the diagram). The fingerboard 166 supports frets 168 and strings 170. The color/note shape patterns of both the six-string guitar and the bass guitar are similar because the bass is simply a standard guitar minus the two upper strings and lowered by an octave.

This inventive color-coding system is applicable for any such stringed instrument, whatever the tuning. Some examples of instruments are: the violin, viola, cello, mandolin, banjo, ukulele, dobro, dulcimer, harp, viol, lute, stand-up bass, balalaika, sitar, etc. This embodiment of the inventive method can be applied to a variety of instruments because, as mentioned, such instruments with adjacent, parallel strings are simply adjacent, parallel chromatic scales.

The resulting color/note patterns of the various instruments' fingerboards look slightly different depending on the relative tuning of the strings (and therefore, the relative arrangement of chromatic scales), but the color/note relations remain consistent. Therefore, the present inventive method and system can be seen as extremely advantageous in that it provides a uniform way of illustrating how all instruments are played using the same, underlying music theory.

Note that, in FIGS. 12A–13C and 15B, the diagrams illustrate forms of a note/color arrangement from a right-handed player's perspective. Therefore, their accompanying descriptions pertain to the right-handed player's perspective, specifically. The same general rules or concepts apply for the left-handed player but everything is simply reversed.

Figure 12A:
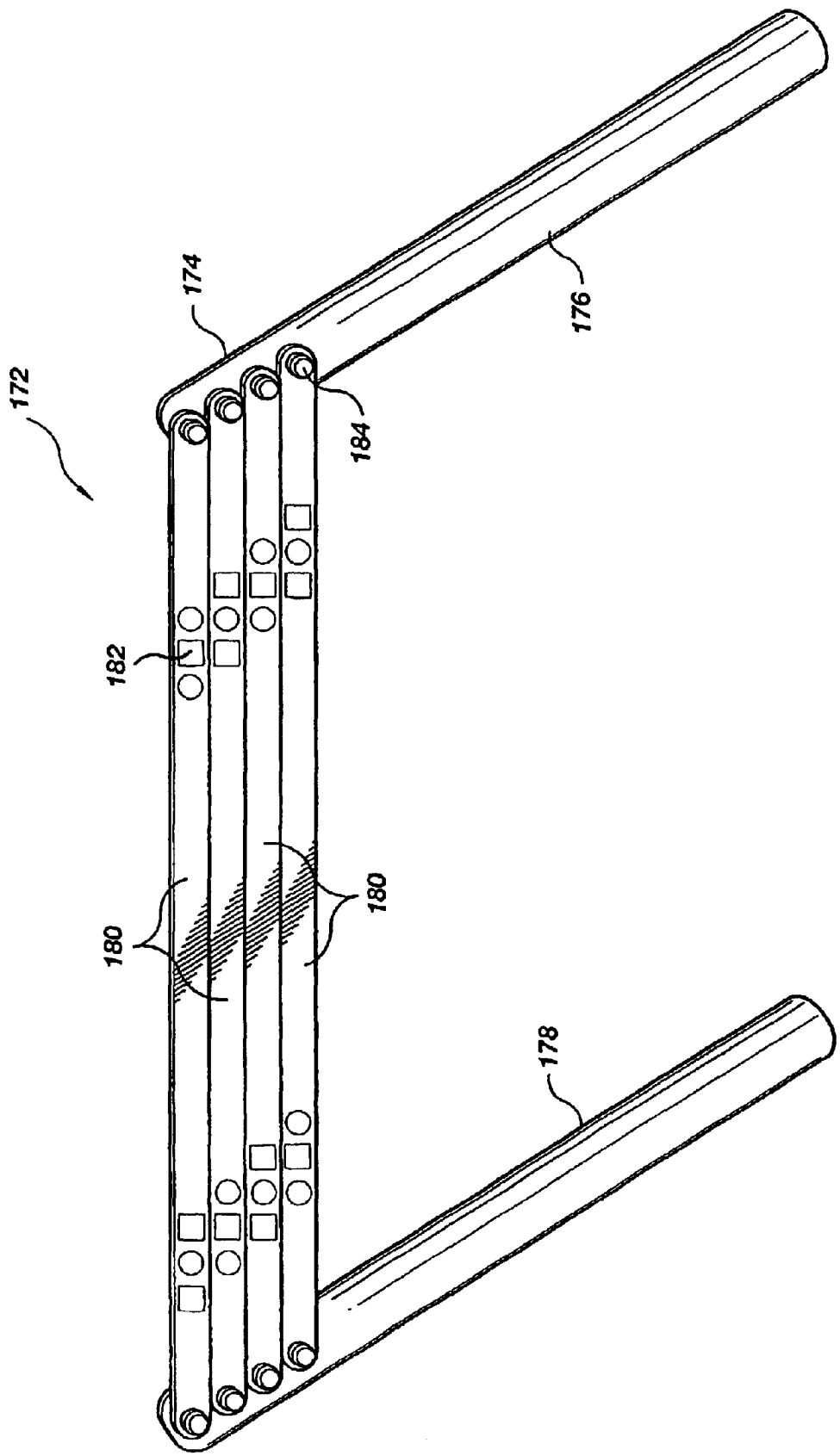
FIG. 12A is a tool or diagram shown having movable parallel columns supporting color-coded slats representing the "strings" of a bass guitar.
Figure 12B:
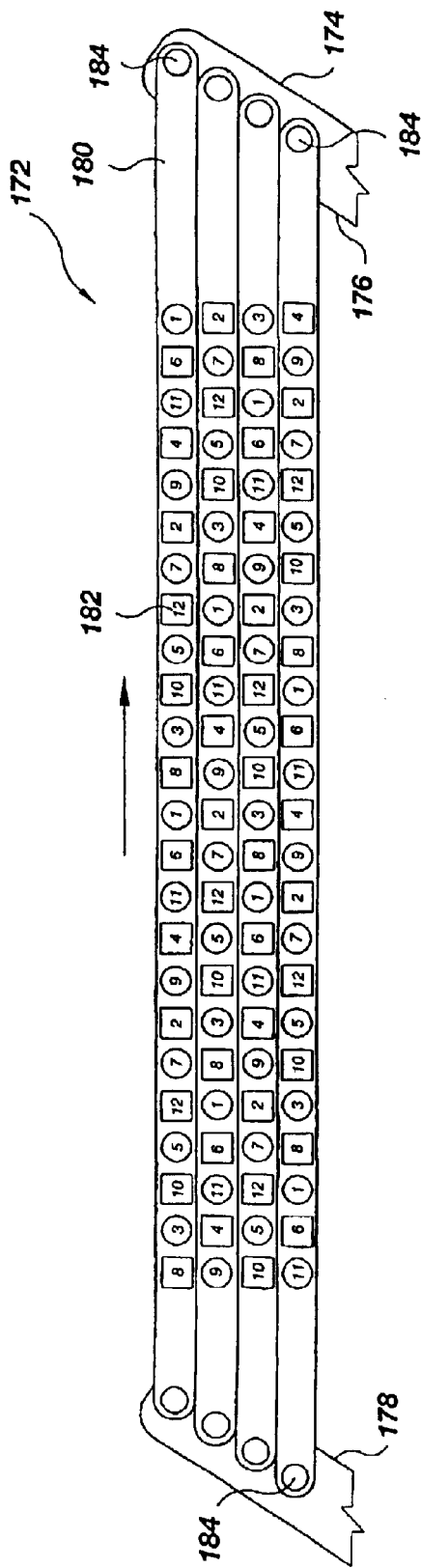
FIG. 12B is a close-up view of the tool or diagram of FIG. 12A with the colors in the configuration of a commonly-tuned bass guitar such as the one in FIG. 11C.
Figure 12C:
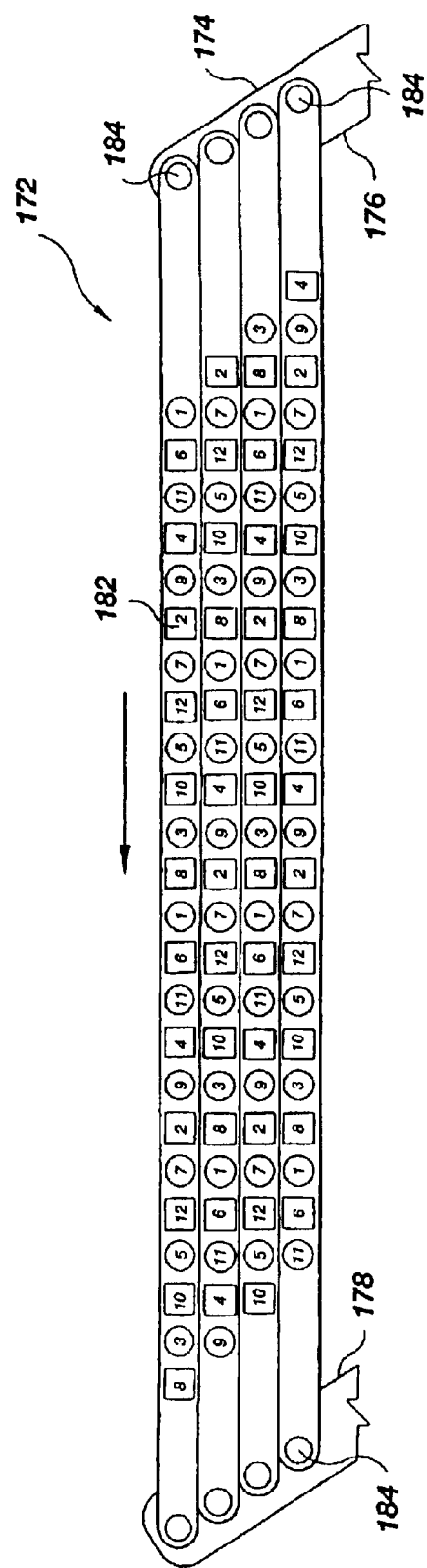
FIG. 12C is a view similar to that of FIG. 12B with handles of the diagram in the full left position stacking each color/note shape vertically above and below its complementary color/note shape.

Referring to FIGS. 12A, 12B, and 12C, there is illustrated a plan view of a device/diagram analogous to the neck or fingerboard of a bass guitar, a detail of the device/diagram in the "right" position bearing a series of shaped colors/notes, and a detail of the device/diagram in the "left" position bearing shaped colors/notes, respectively. This device helps the student dissect and comprehend the note relationships on a guitar and bass guitar.

In this diagram, the colors are represented in the shapes of squares and circles, rather than rectangles and ovals of various lengths. Looking back at FIG. 11B, the varying lengths of the frets illustrate the logarithmic nature of musical pitch. As one ascends the fingerboard, each space between frets becomes progressively shorter or smaller. Due to the nature of this device, and to simplify matters, each fret or fingerboard position is the same size or given an equal amount of space on the diagram.

Referring to FIG. 12A, although it can be seen that the color-coding of the fingerboard or neck of a bass guitar with strings tuned to the common intervals of fifths creates a pattern, it remains somewhat of a challenge for the uninitiated student to completely comprehend the scope and meaning of the pattern. As a result, the device/diagram illustrated in FIGS. 12A–12C has been developed as an additional aid.

The diagram 172 depicts a moveable device 174 comprised of a right handle 176 and left handle 178 separated by columns 180 supporting slats bearing shaped colors 182. The columns 180 are mounted on handles 176 and 178 in parallel, and spaced in relation to each other so as to allow limited movement from right to left of handles 176 and 178. The handles allow the user to move the columns representing "strings" and the slats of notes/colors relative to one another. The slats bearing the colors/note shapes are attached to their respective columns at each end 184. Each slat is capable of being reversed so as to illustrate the pattern of colors/note shapes on a left-handed bass guitar. Also available are clear plastic slats (not shown) that have the optional nomenclature for each colored note shape. These clear slats may be attached to their respective color-bearing slats at each end 184.

In the configuration of FIG. 12B, the device 174 is shown in the "full right" position. The resulting diagram represents the inventive pattern of colored note shapes for the coding of a bass guitar. The bass guitar is selected as a model for illustration of the inventive diagram because it is useful to illustrate how the diagram for the standard guitar is arranged, as well. The four "strings" are ideal because there is an anomaly in the standard guitar's tuning. The normal pattern is initiated. E is below its "parent" or subdominant, A, which is below its subdominant, D, which is below its subdominant, G, all being fifths apart. However, G is located below its major third, B, the note found one musical chromatic interval below G's subdominant, C. The usual pattern then resumes, i.e., B is positioned below its "parent" or subdominant, E. This slight shift in the pattern, between the G and the B string, is seen in FIGS. 10A and 10B, above.

Due to the mechanics of the diagram 172, the top two strings of the six-string guitar are omitted, and only the strings that are tuned to intervals of fifths are represented. This would not be necessary if the diagram were represented in a computer program, where the program could compensate for the anomaly of the guitar's tuning.

The diagram in FIG. 12C illustrates the use of the teaching device by moving the handles to the "full left" position where pattern shifts. Now each color/note shape is "stacked" vertically above and below its complementary color/note shape. For example, all the 1's are positioned in a vertical line, as are the ②'s, the 3's, etc. (refer to the description of FIGS. 4A and 4B above). Moving the device back into its "full right" position (as seen in FIG. 12B) allows the user to see these vertical "stacks" of complementary colors/note shapes all slant to approximately a 45-degree angle. The resulting pattern of colors/note shapes, as seen in FIG. 12B is like that of a checkerboard. All notes/colors that are evenly spaced with one another are located in a diagonal direction from each other. Similar devices or computer programs may be used to dissect and study the relative positioning and patterns of notes/colors for various instruments.

Figure 13B:
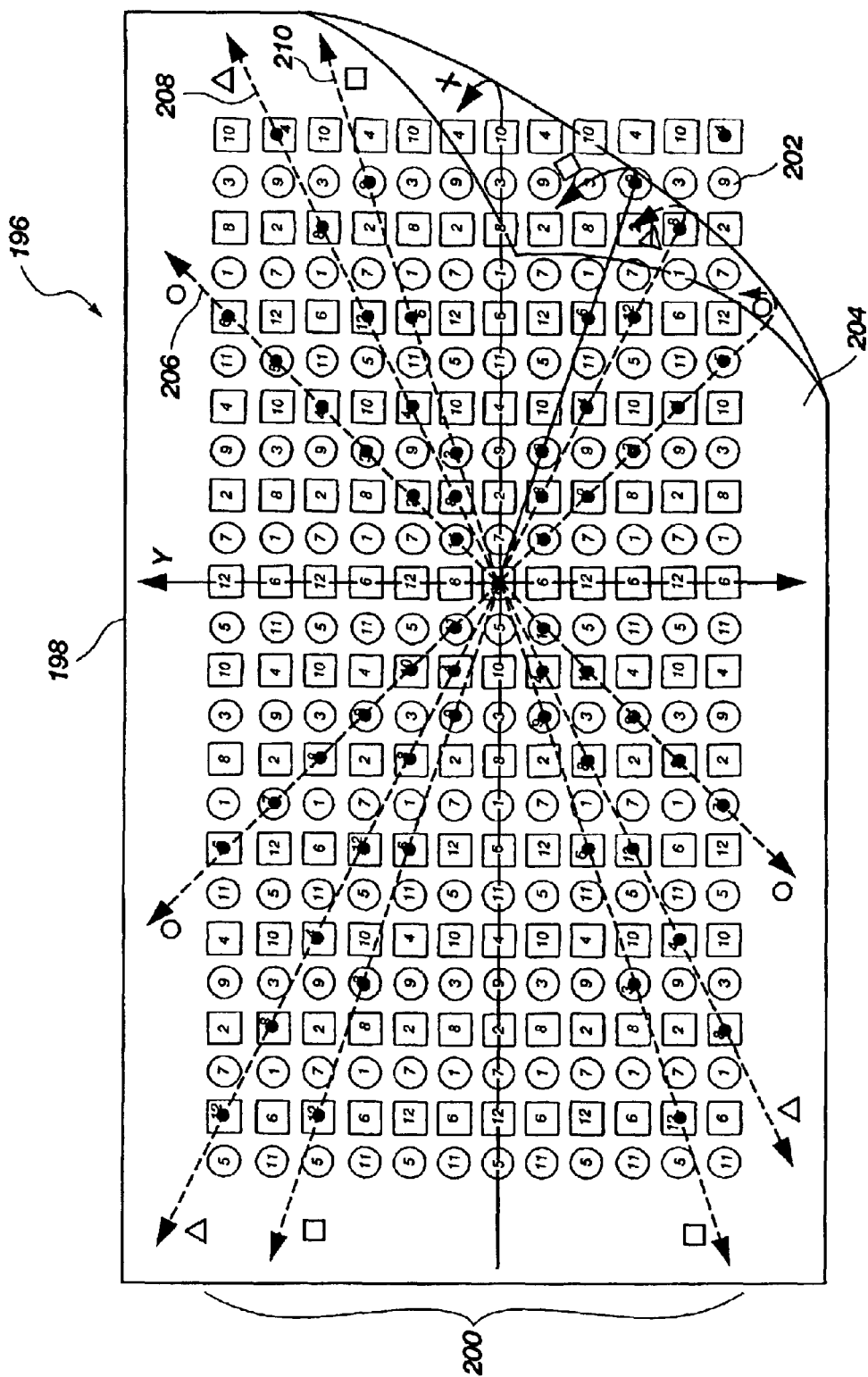
FIG. 13B is a diagram of the array of notes/colors as in FIG. 13A, having an overlay.
Figure 13C:
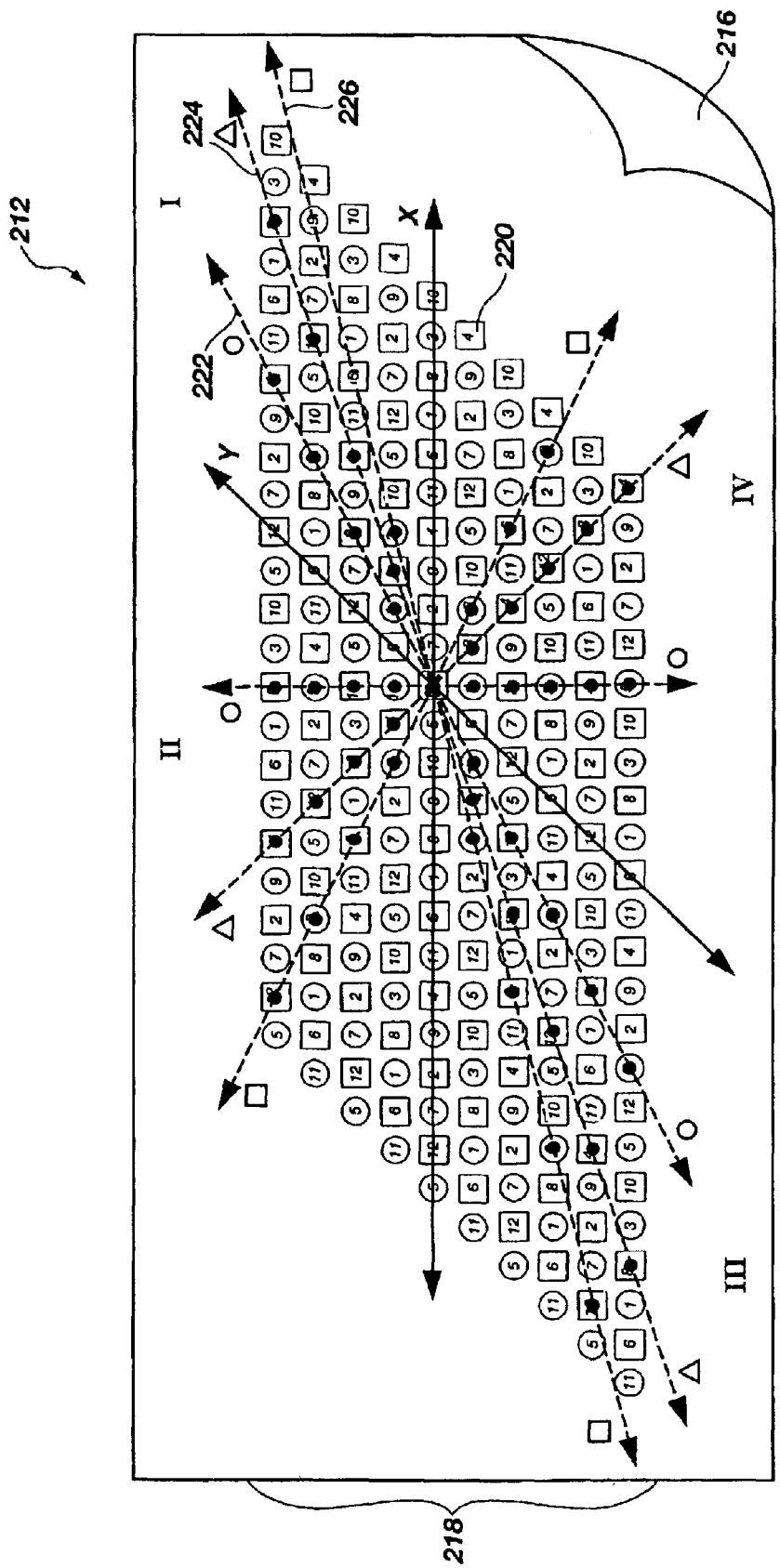
FIG. 13C is a diagram having an overlay as in FIG. 13B, modified to show the slanted y-axes of complementary colors/note shapes, as seen in FIG. 12B.

Referring to FIGS. 13A, 13B, and 13C, shown are extended or expanded versions of the diagrams of FIGS. 12B and 12C, above—in a parallelogram 186 with columns of vertically-stacked complementary colors/note shapes, in a parallelogram 196 with a transparent overlay 204, and in a parallelogram 212 with a transparent overlay 216 having an angled y-axis, respectively. Because these diagrams embody or represent infinitely repeating patterns, by "opening up the window" to each array, one can more easily discern note/color relations and their repetitive nature.

The diagram 186 of FIG. 13A comprises a device 188, having slat handles 190, with columns bearing colors/note shapes 192. The device 188 allows the user to move the handles 190. By sliding the longer columns 194, containing, again, the primary- and secondary-colored note shapes, one is able to mimic the movement in the diagram of FIGS. 5A–5C. For example, red/C now slides down or up into its own circle-of-fifths/color wheel position (surrounded by it subdominant and dominant), while, in the same motion, green/G♭, too, slides down or up into its circle-of-fifths/color wheel position.

The diagram 196 of FIG. 13B illustrates a detail 198 of the array of colors/notes as seen in FIG. 13A (also see FIG. 13C). It allows the student to discern the repeating patterns in this format, as opposed to the circular and linear forms illustrated and described above. In this form, the endlessly repeating patterns are seen in an array 200 of colors/note shapes 202 as vertical, horizontal and diagonal lines of direction. The overlay 204 on which the pattern lines are traced can be moved to any position. By simply choosing a color/note as the origin of the graph, and lining up the y-axis on the chosen vertical "stack" of complementary colors/note shapes containing the origin note and the x-axis on the horizontal chromatic scale of the origin note, one can see that the lines trace the directions of related colors/notes to that particular origin (or tonic).

Because the x- and y-axes are perpendicular, as in the usual mathematical or Cartesian graph, the resulting quadrants are of equal proportion. Therefore, the lines showing the patterns in each direction are symmetrical, over both the vertical y-axis and the horizontal x-axis.

Using, again, red/C as the example for the origin of the graph, the student can comprehend the logic of how and why the lines extend the way they do. Because red/C is located just above and below its complement, green/G♭, in the y-axis, then just to the left, up or down (at coordinates (−1,1) and (−1,−1)), is its "parent" or subdominant, purple-red/F. Just to the right of red/C, up or down (at coordinates (1,1) and (1,−1)), is its "child" or dominant, red-orange/G.

These patterns of related dominant and subdominant keys/colors continue ad infinitum in each of their directions, passing each key, in a clockwise direction to the right, and in a counterclockwise direction to the left. These lines 206 are labeled with the circle symbol to show that they indicate the successive progression of keys/colors in the circle of fifths/color wheel.

Immediately to the left of its subdominant (at coordinates (−2,1) and (−2,−1)), is red/C's related primary and major third, yellow/E. Just to the right of its dominant (at coordinates (2,1) and (2,−1)), is red/C's other related primary, blue/A♭. (The lines connecting these coordinates are at slightly smaller angles than those connecting the succession of "generations"—or related subdominants and dominants). These lines 208 are labeled with the triangle symbol to indicate that they are a progression of the major thirds (in this case, the primaries). These patterns are also infinite in each of their directions.

Immediately to the left of its major third, yellow/E (at coordinates (−3,1) and (−3,−1)), is a color/note in red/C's minors square: blue-purple/E♭ (see FIG. 5C). Likewise, just to the right of red/C's related third, blue/A♭ (at coordinates (3,1) and (3,−1)), is orange-yellow/A, another key in its minors square.

Again, these lines of repetition are infinite in each of their directions, and have angles of slightly fewer degrees than those of the "major thirds" lines. These lines 210 are labeled with the square symbol to indicate that they trace the progression of relative minors. One could continue looking at coordinates, such as (−4,1), (−4,−1), (4,1), (4,−1), (2,2), (−2,2), etc., to discern other relationships of colors/notes to, and their distance from, the chosen origin/tonic.

As previously mentioned, any given y-axis ("stack" of complementary colors) is perpendicular to any given x-axis (chromatic-scale arrangement) in this diagram, and, therefore, the four quadrants are of equal proportion. Hence, the lines passing through the quadrants are symmetrical in each direction.

The overlay 204 in this example bears the lines of a graph, as described. Other lines or markings can be made to illuminate relationships between notes/colors in this form, as well. Therefore, other overlays may be used, including those bearing markings that group notes/colors together in various scales, overlays bearing lines that illuminate all of the patterns of major thirds simultaneously, transparencies bearing no previously-traced markings, etc.

The diagram 212 of FIG. 13C depicts an array 218 having the same patterns as the array in FIG. 13B, but now with the slanted y-axes ("stacks" of complementary colors), as seen in FIG. 12B. The same note/color relations that are explained in the description of FIG. 13B exist, but now in an altered state. The overlay 216 is similarly adapted. In this form, the endlessly repeating patterns are altered, as seen in an array 218 of colors/notes 220 as vertical, horizontal and diagonal lines. The overlay 216 on which the pattern lines are traced can be moved to any position.

Complementary colors/notes are just above and to the right of, and just below and to the left of each other. This is because the taxis is no longer vertical, nor, therefore, perpendicular to the x-axis (which remains horizontal).

Because of this, the resulting graph is not that of the usual Cartesian coordinate system. For instance, the only x-coordinate in the y-axis that is zero is at the origin. In fact, in this graph, the equation of any given y-axis is x=y, instead of the equation x=0 for the y-axis of the usual Cartesian coordinate system. This means that the related notes/colorsin quadrants II and IV are closer to the given origin, resulting in angles of a higher degree. Likewise, the related notes/colors in quadrants I and III are farther from the given origin, resulting in angles of a lesser degree. In other words, using the example of red/C as the origin, the subdominant, purple-red/F, is now located (using the usual Cartesian coordinates) at coordinate (0,1) in quadrant II and at coordinate (−2,−1) in quadrant III, rather than at coordinates (−1,1) and (−1,−1) in quadrants II and III, respectively.

Lines 222 correspond to lines 206 of FIG. 13B and are labeled with the circle symbol to show that they indicate the successive progression of keys/colors in the circle of fifths/color wheel. Likewise, lines 224 correspond to lines 208 of FIG. 13B and are labeled with the triangle symbol to indicate that they trace the progression of major thirds (in this example, the primaries). These patterns are also infinite in each of their directions. Likewise, lines 226 correspond to lines 210 of FIG. 13B, and are labeled with the square symbol to indicate that they trace the progression of relative minors. The relative minor, orange-yellow/A, for example, is now located at coordinates (2,−1) in quadrant IV and (4,1) in quadrant I, rather than at coordinates (3,−1) and (3,1) in quadrants IV and I, respectively.

This same shift, as a result of the slanting of the y-axis, accordingly affects the coordinates of the other color/note relationships. The overlay 216 has been adapted to reflect these changes in quadrants but is useful in the same manner as that of FIG. 13B.

The overlay 216 in this example, again, bears the lines of a graph, as described. As mentioned with regard to the overlay 204 of FIG. 13B, other lines or markings can be made to illuminate relationships between notes/colors in this form, as well. Therefore, other overlays may be used, including those bearing markings that group notes/colors together in various scales, overlays bearing lines that illuminate all of the patterns of major thirds simultaneously, transparencies bearing no previously-traced markings, etc.

In the description of the figures immediately above, the Cartesian coordinate system is used as an aid in illustrating and dissecting note/color relations when arranged in a parallelogram. As a means of describing these inventive diagrams and illustrations, and in an effort to relate them to a system of study that is familiar, the Cartesian coordinate system is used because many people know of it.

It is important to note, however, that it is unnecessary to have previous knowledge of the Cartesian coordinate system or of such mathematical devices in order to study music theory according to the inventive method and system. Though it is helpful to have an understanding of positive and negative intervals, the color-coding of the present invention illustrates that the tones and/or keys in music theory consistently maintain properties and patterns with relation to one another.

For instance, in the inventive method and system, notes are represented by colored shapes such as squares and circles that imitate or illustrate "positive" and "negative" intervals. However, because their pattern stems from or is based upon a circular pattern, the concept of any "increase" or "decrease" does not really apply. In other words, because no color/note shape is ever "greater than" or "less than" any other, words such as "positive," and "negative," or "odd," and "even" are not entirely appropriate terminology. Therefore, when describing diagrams such as those in FIGS. 13B and 13C, terms may be used that are more applicable (and more a part of the layman's vocabulary), including: "right," "left," "up," "down," "clockwise," and "counter-clockwise." This, again, supports music theory being described as "math without numbers."

It is important to mention that the note/color arrays and relations may be illustrated in computer programs, where note/color movement and dissection may be more easily portrayed. Such programs may be used to illustrate the colors/note shapes—such as the colored squares and circles—in a 2-dimensional format (as squares and circles), or in a 3-dimensional format (as cubes and spheres, respectively).

It is also important to note that, with fingerboard instruments whose string tuning can be easily changed, some items of consideration must be addressed. Each particular coding pattern relates to a particular string tuning. In other words, using a guitar for an example, if a person's guitar fingerboard coding was that for the common tuning, and he or she tuned the guitar to "dropped D," the coding of the fingerboard would not correspond with the changed string tuning. (This would not be an issue with the coding of a keyboard.)

For many, this may never be an issue, because people tend to keep their instruments in their common tuning. However, to account for the change in string tuning, an alternate fingerboard coding could be applied. Nevertheless, having understood the color/note relations and patterns of one particular tuning, a person can then understand the patterns of an alternate tuning.

It would, therefore, be much easier to learn how to play various, and seemingly foreign or unrelated instruments. Because the same colors illuminating intervallic and harmonic relations between notes are used, one could simultaneously understand and study, for example, the guitar, violin, keyboard, cello, etc. In the end, one's comprehension of, and ability to expand within or improve upon, any such instrument increases.

The application of the inventive color code on various instruments can take alternate forms. For example, the coding can be applied by securing it to the instrument with Velcro, adhesive, or other connecting means. Instruments can be manufactured with the inventive color code already in place, e.g., keyboards with keys already colored, guitars with a color/note shape pattern already in place, violins with their fingerboards already bearing a pattern of colors/note shapes, etc. One instrument well suited to be manufactured already bearing the inventive color code may be the keyboard because it is simply a single, linear, repeating chromatic scale and its keys remain at a constant tuning with relation to one another.

Another approach to coding instruments involves manufacturing instruments with a design alteration that is virtually imperceptible. By "suspending" a fingerboard slightly above the neck of the instrument, enough space is allowed to insert/remove single cards bearing alternate note/color patterns that correspond with the various string tunings of the instrument. The side of the neck or fingerboard with the slit to insert/remove the card(s) is preferably the long side closest to, or facing, the player. For an example on an instrument for a right-handed player, see the side of the fingerboard designated as 228 in FIGS. 11A and 11B. With the surface of the fingerboard being transparent, the coding beneath can be seen. Small, unobtrusive stops may be employed to ensure that the inserted coding card stays in place. The neck surface supporting the inserted coding card may be the usual wood grain so that, if the coding is removed, the fingerboard resumes its familiar, or "natural," appearance.

Another, less cost-effective, approach involves manufacturing instruments with the inventive color coding created by a system of built-in lights or LEDs—red, yellow, and blue—combined at varying levels of brightness or intensity, resulting in the twelve-color palette.

Figure 14:
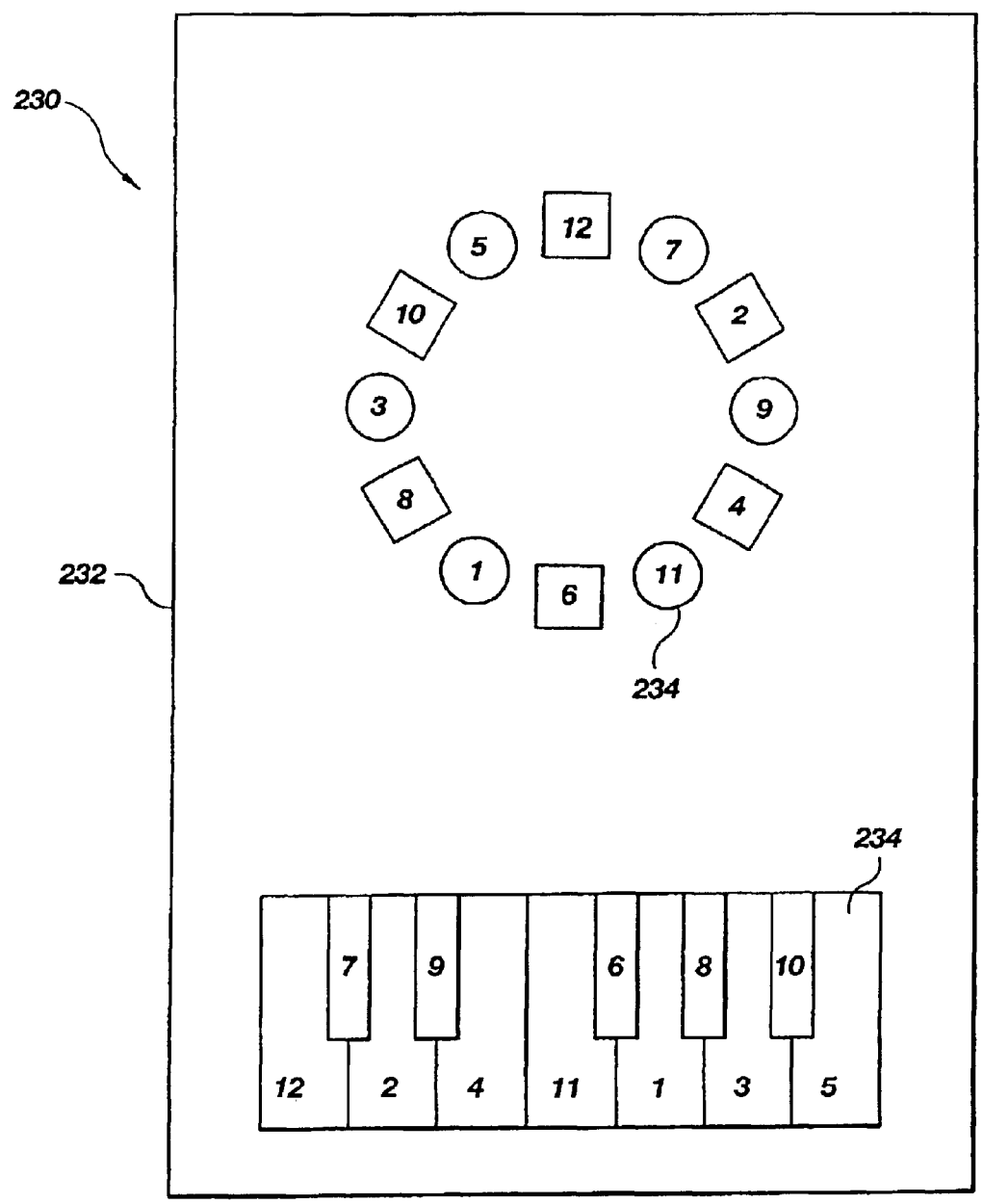
FIG. 14 is a magnetic study board that allows the user to move magnetic colored note shapes and arrange them in any desired order.

Referring to FIG. 14, there is shown a magnetic study system 230 comprising a board with a magnetic surface 232. Positioned on the magnetic surface is an erasable surface. Colored note shapes 234 with magnets attached to their backs can be moved around the board and arranged in any desired order. Placing the keys over the erasable surface allows the user to make notation around them.

Figure 15B:
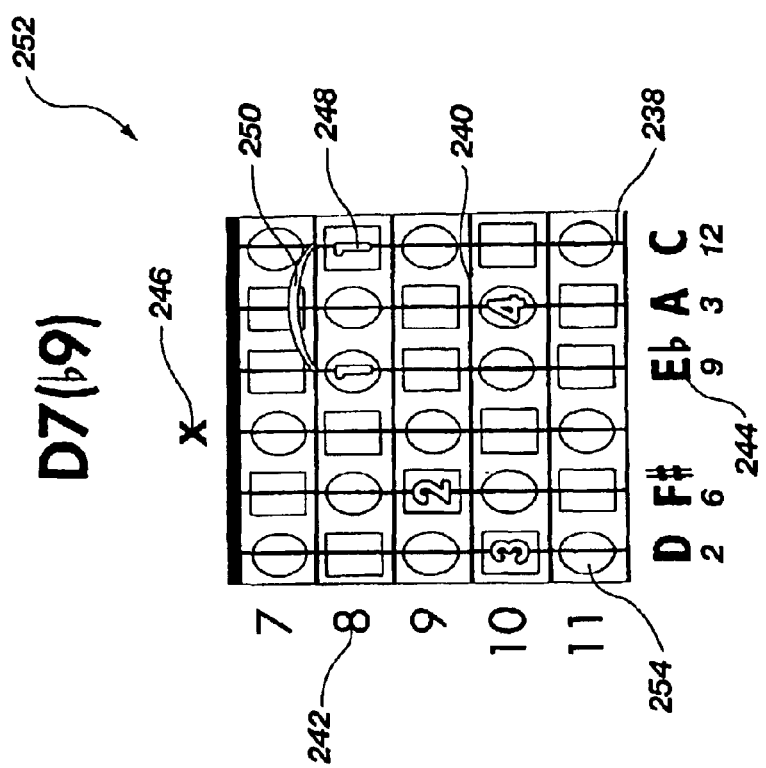
FIG. 15B is a diagram that, incorporating the inventive color method of note representation, illustrates a "D7(♭9)" chord on a guitar fret board—color-coded as in FIG. 11B.
Figure 15A:
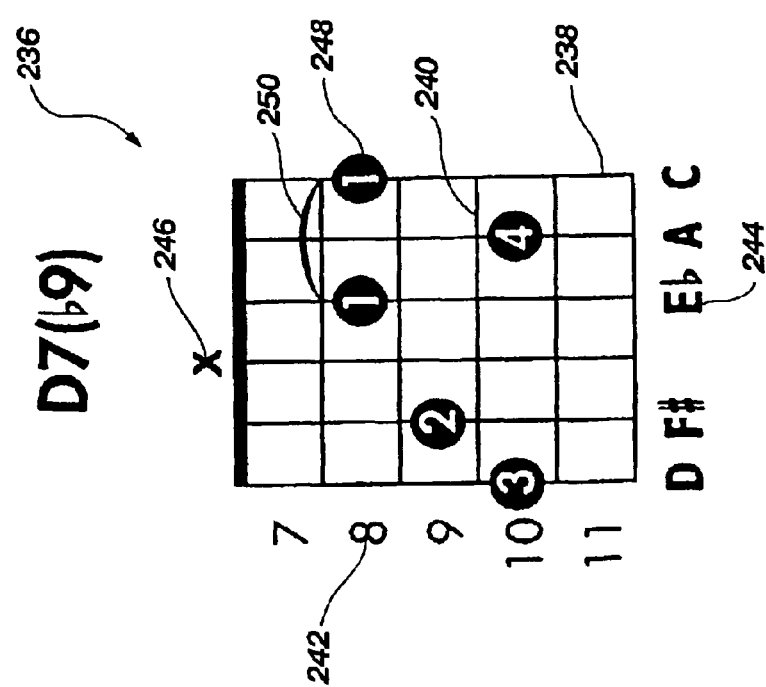
FIG. 15A is a diagram—drawn using the common black and white method—that illustrates a "D7(♭9)" chord on a guitar fret board, and is included as a frame of reference for the diagram of FIG. 15B.

FIGS. 15A and 15B each represent a chord played on the guitar using the standard black-and-white approach, and the color code of the inventive method, respectively. The chord diagram 236 of FIG. 15A shows an inversion or position of the "D7(♭9)" chord as it is played on a guitar. It is drawn using the common black-and-white method. This approach to illustrating a chord is common and representative of the numerous diagrams for the various chords.

Vertical lines representing strings 238 and horizontal lines representing frets 240 create a grid- or matrix-like surface on the section of fingerboard shown. The numbers 242 along the side of the diagram are aligned with, and designate, their corresponding frets 240. Beneath the diagram, the letter names 244 of the notes to be played in the chord are aligned with their corresponding strings 238. The "X" 246 at the top of the diagram is positioned, in this particular chord, above the fourth string to indicate that it is unplayed or muted. Numbers 248 are located at various points on the fingerboard matrix that represent finger positions and, therefore, the notes to be played in the chord. The slur 250 indicates that both E♭ and C are played with the first finger by "barring" or laying it flat and covering the marked notes.

Referring to FIG. 15B, shown is a diagram 252 that conveys the same information as, and even more information than, that of FIG. 15A. The diagram 252 of this figure incorporates the color method of note representation.

Again, a "D7(♭9)" chord on a guitar fret board is illustrated. Vertical lines representing strings 238 and horizontal lines representing frets 240 create a grid- or matrix-like surface on the section of fingerboard shown. The numbers 242 along the side of the diagram are aligned with, and designate, their corresponding frets 240. Beneath the diagram, the letter names 244 of the notes to be played in the chord are aligned with their corresponding strings 238. The "X" 246 at the top of the diagram is positioned, in this particular chord, above the fourth string to indicate that it is unplayed or muted. Numbers 248 are located at various points on the fingerboard matrix that represent finger positions and the notes to be played in the chord. The slur 250 indicates that E♭ and C are both played with the first finger by "barring" or laying it flat, covering the marked notes. The colored note shapes 254 of the inventive method are located on the fingerboard in their corresponding positions, as seen in FIG. 11B. The color-designating numbers for each note played in the chord are found below their respective letter names 244.

In this diagram 252, it is clear why the numbers 248 representing finger positions are arranged the way that they are. The number, "3," representing the third finger, falls on the sixth string at fret ten and indicates that the tonic of the chord, D/orange, to be played. The number, "2," representing the second finger, falls on the fifth string at fret nine and indicates that the major third of the chord, F♯/green, is to be played. The number, "4," representing the fourth finger, falls on the second string at fret ten indicating that the dominant of the chord, A/orange-yellow, is to be played. The number, "1," representing the first finger, falls on both the first and third strings at fret eight along with the accompanying slur 250 to indicate that both the seventh note of the chord, C/red, and the flatted-nine, E♭/blue-purple, are to be played.

Such chord diagrams could include variations. For instance, the letter name 244 of the chord tonic or root (in this case, "D") can be underlined to indicate that it is the "origin" of the chord (see FIG. 13C). The note shape 254 of the tonic in the matrix or graph (in this example, "D") might also receive extra highlighting or emphasis. A chord diagram may not always be presented with the chord name (in this example, "D7(♭9)") immediately above it. Being able to identify the tonic of a chord helps in establishing the particular noterelations involved in a chord. In other words, once the student "gets his/her bearings" and is able to discern what note is the root of the chord, he or she is able to understand how and why other notes of the chord are included and positioned.

One could also look into greater detail at the intervallic and harmonic relations between notes in a chord. For instance, with the aid of the inventive color method and system, one could see that the dominant of the "D7(♭9)" chord in FIG. 15B, A/orange-yellow, is the relative minor of the seventh of the chord, C/red. Likewise, the seventh of the chord, C/red, is the relative minor of the flatted-ninth note of the chord, E♭/blue-purple. Likewise, the flatted-ninth note of the chord, E♭/blue-purple, is the relative minor of the major third of the chord, F♯/green. The major third of the chord, F♯/green, is the relative minor of the dominant of the chord, A/orange-yellow, ad infinitum (refer to FIG. 5C). Upon seeing this, one could simply mute the tonic or root of the chord, D/orange, and a new chord, the C diminished chord (a.k.a. F♯ diminished, A diminished, or E♭ diminished) would then be played. This, again, illustrates how the inventive color method and system makes transition from keys and chords understandable and relatively easy.

It is also important to reiterate that such chord diagrams could be used to illustrate any of the various chords and chord positions on a guitar as well as on various other instruments. Similar diagrams of the various chords can also illustrate chord positions for left-handed instruments, as well.

Charts listing the notes/colors included in the various chords are also available. By understanding the general formulas involved in the construction of the various chords, and, in turn, which specific notes/colors are included in the various chords, the student is able to easily discern how the chords relate, which chords are enharmonic equivalents, etc.

Figure 16:
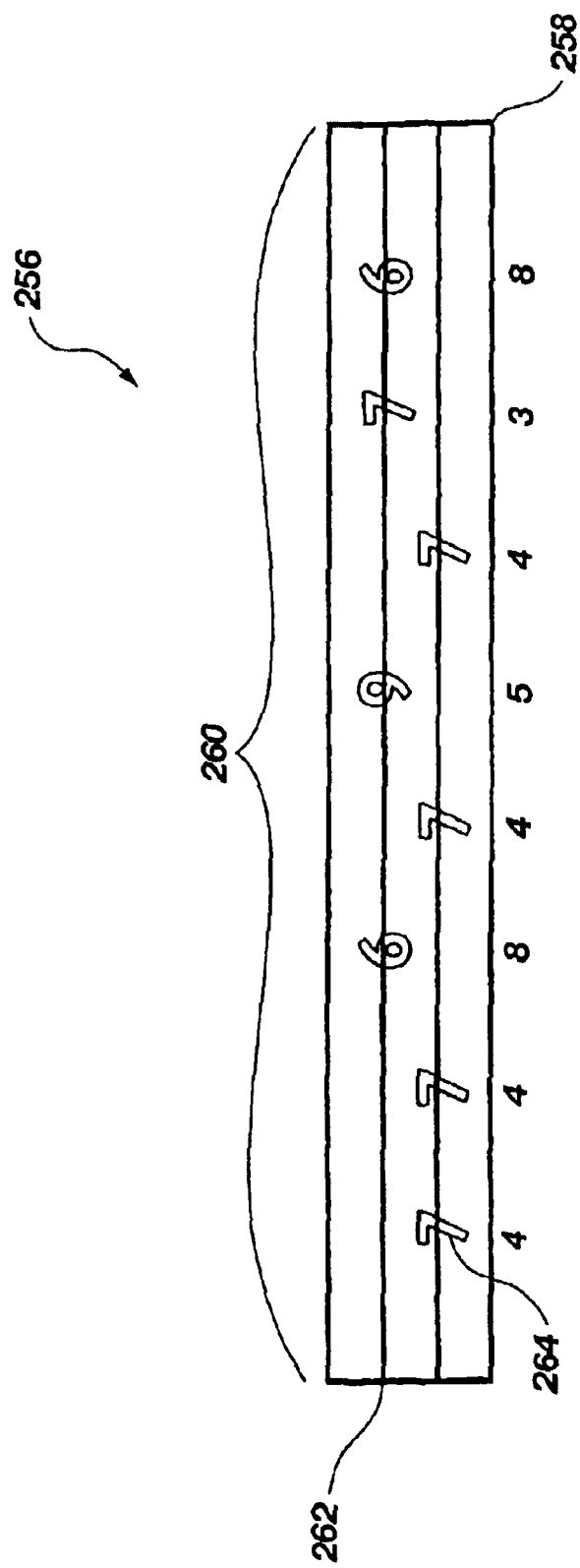
FIG. 16 depicts a bar of a bass line written in tablature with the inventive color-coding applied.

Referring to FIG. 16, there is a diagram 256 that illustrates how the inventive color method and system is applied to tablature—in this example, a bass line. Vertical lines 258 delineate a single bar of music 260. On horizontal lines 262 representing bass guitar strings (tuned as delineated in the description of FIG. 12B), colored numbers 264 have been placed, indicating the notes/finger positions to be played. In sequence, the notes of this bar are: E, E, G♯, E, B, E, A, G♯. (The color-designating numbers are found below their respective numbers in the bar.) By applying the colorcode of the present invention to tablature, one is able to see how the notes of the finger positions relate harmonically as well as intervallically. One is also able to see more easily how the numbers in the tablature designating finger positions relate to the actual finger positions on the instrument(s) played.

Many people prefer using tablature rather than reading, or learning to read, standard music notation. Although the latter is much more comprehensive and potentially informative, many consider it to be unappealing because it is seen as an overly-complex and far-too-time-consuming system to learn. This viewpoint is not entirely unfounded, in that standard music notation was developed centuries ago and includes some elements that might be described as "counterintuitive."

Figure 17A:
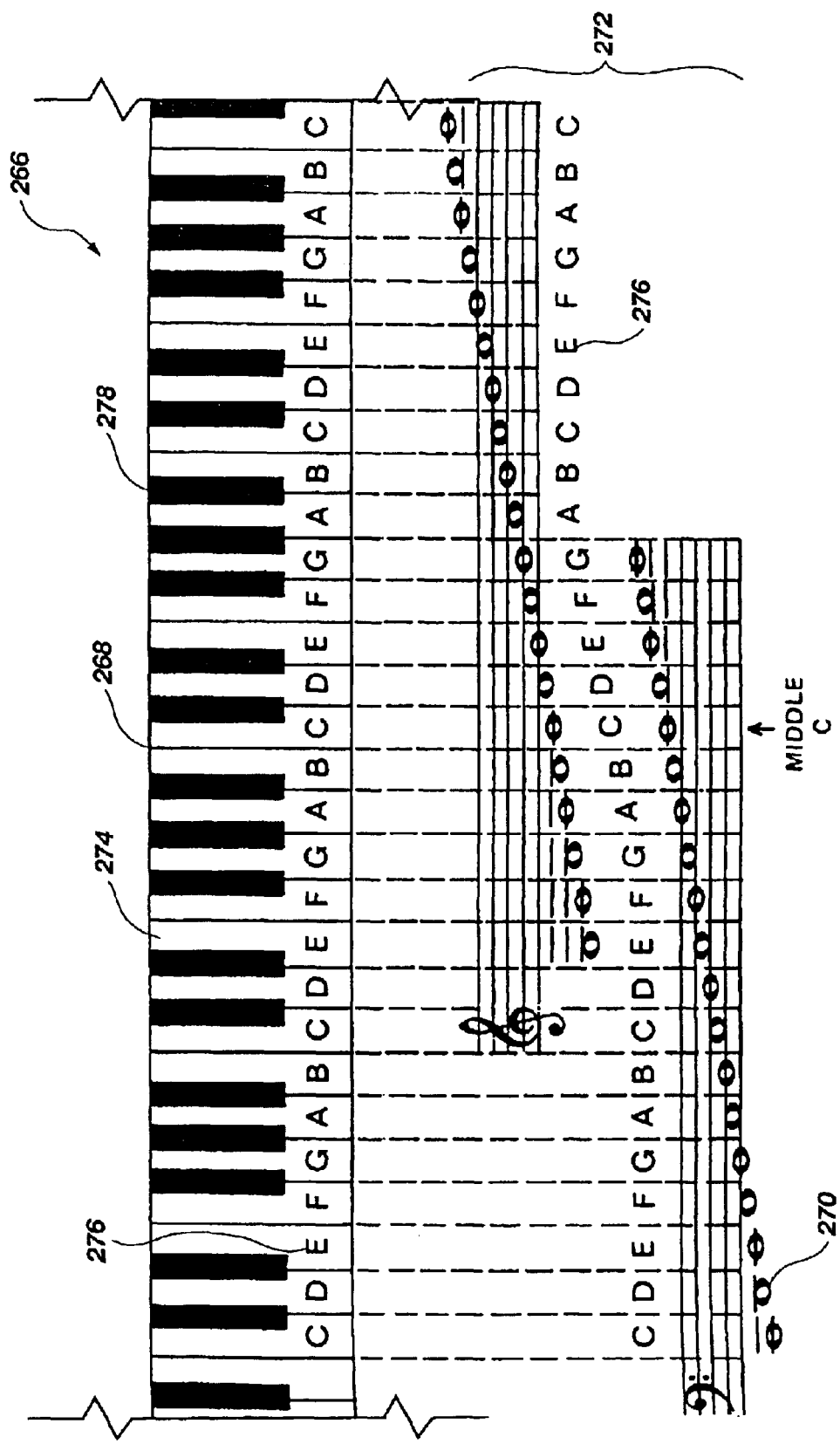
FIG. 17A depicts a keyboard with staves below it, outlining how the keys correspond with the various note positions on the staves in standard music notation, and is included as a frame of reference for the diagrams of FIG. 17B and FIG. 21, and for illustrating the counterintuitive nature of standard music notation.

Referring to FIG. 17A, there is a diagram 266 that depicts a section of a keyboard 268 and outlines how its keys correspond with the various note positions 270 on the staves 272 in the standard system of music notation. This diagram is included as a frame of reference for the forms of the inventive system of notation described below. It is also included to illustrate the counterintuitive nature of standard music notation. Only the white keys 274 and their corresponding "natural" notes 270 are labeled with their letter names 276. The black keys 278, therefore, can be seen as subordinate in consideration.

One can see that, although it is used to write/play music for/on various instruments, the way standard music notation is arranged relates to the way in which the traditional keyboard is arranged, or "laid out." Therefore, if one is to truly understandhow music notation works, he or she must come to understand why a keyboard is arranged or designed the way that it is.

Figure 21:
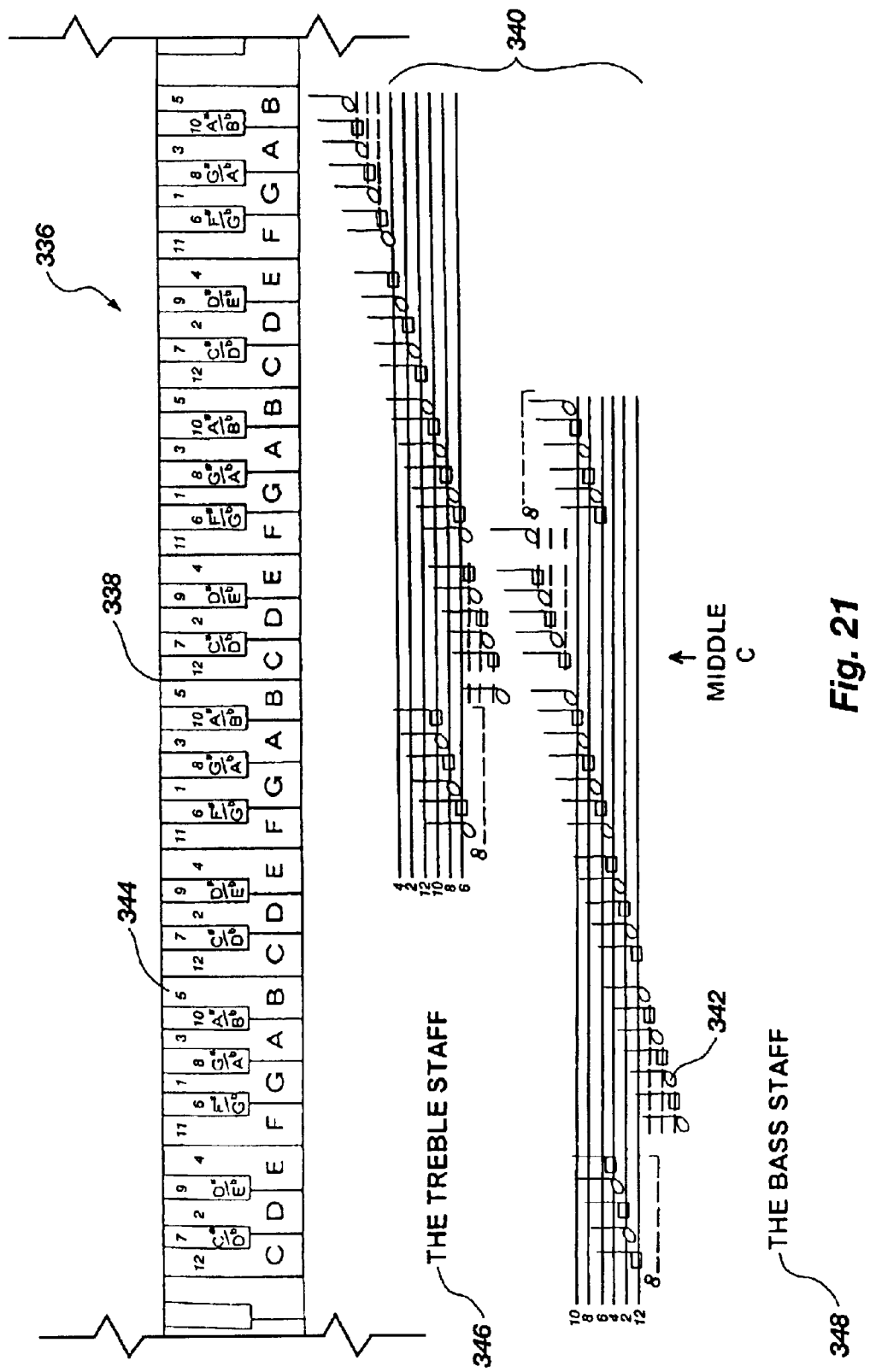
FIG. 21 is a diagram that outlines an alternate form of the inventive system of music notation which includes a keyboard, color-coded according to the inventive system, along with multi-colored staves to illustrate how the various note positions correspond to the instrument's keys.

By applying the color-coding of the inventive method, a new system of music notation (outlined in FIG. 17B) is provided that both illuminates and transcends the inherent flaws of standard music notation (also see FIG. 21). To explain the counterintuitive nature of standard music notation, some background information is provided.

Referring to the depiction of the traditional keyboard 268 in the diagram 266 of FIG. 17A, the familiar topography of the keys can be seen. In other words, one can see that the black keys 278 are grouped in threes and twos. Now, referring to the diagram 40 of FIG. 2B, this same "topography" of key shapes 38 can be seen in a circular form. Many people, understandably, have a tendency to form a mental connection between the black keys of a keyboard. Thinking of the black keys as being separate from, independent of, or of a different class than the white keys is misleading.

Recalling the concept addressed in the description of FIGS. 2A and 2B—that of the "evens" and "odds" sets of keys—one can imagine an entire set of evenly-spaced keys on a keyboard as being all raised black keys, while the other set of evenly-spaced keys is all flat and white. Now, referring to the diagram 48 of FIG. 3B, one can imagine all of the square note shapes, for example, as being black, while all of the circular note shapes are white. Using this example, square white C, D, and E "keys" of FIG. 3B would, therefore, be black so as to further illustrate that they are spaced at whole-tone intervals with the square black G♭, A♭, and B♭ "keys." Conversely, the circular black D♭ and E♭ "keys" of FIG. 3B would, therefore, be white, in order to illustrate that they are spaced at whole-tone intervals with the circular white F, G, A, and B "keys."

This imagined intervallic arrangement of black and white "keys" achieves the same effect as the squares-and-circles shaping of the various notes already illustrated in FIG. 3B. It may seem more intuitive to have the keyboard keys arranged in a way that enables one to identify spacing and intervals between notes so easily. However, if the black and white keys of a keyboard, as in FIG. 17A, were set up as the one presently imagined, it would be very difficult, if not impossible, to play. This is because, with every other key being raised and black (or flat and white), only two key shapes form, making it impossible to make a distinction between the various notes. One could make the distinction aurally, but not visually or by tactile perception.

By applying the full twelve-color code of the inventive method and system to the imagined chromatic-scale arrangement (as in FIG. 4B), one is able to distinguish between notes despite the fact that only two key shapes are considered. If the color code of the inventive method had existed when the topography of the traditional keyboard developed, then the familiar arrangement of key shapes (as seen in FIG. 17A) may not have become the standard.

Since, however, only the shades of black and white were used, a clever approach was adopted to make each key of the imagined keyboard distinguishable from the rest. One group of three black keys (the C's, D's, and E's) became white, while the two, previously white, keys (the D♭'s and E♭'s) between each said group of three black keys became black. In other words, D♭ and E♭ of the traditional keyboard "should be" white so as to illustrate that they are evenly spaced with F, G, A, and B, whereas, C, D, and E "should be" black so as to illustrate that they are evenly spaced with G♭, A♭, and B♭. This imagined rearrangement of key shades and shapes accounts for the fact that, on a traditional keyboard 268 (as seen in FIG. 17A), there is not a black key between B and C, nor is there one between E and F.

Therefore, by changing the "black" C, D, and E keys of the imagined keyboard to white and, in turn, changing the "white" D♭ and E♭ keys to black, people are able to distinguish each key on the traditional keyboard from the others much more easily. The significant tradeoff, however, is that it then becomes more difficult to see, or understand, the spacing between keys or notes (as illustrated in FIG. 3B and even more clearly in FIG. 4B) which is equally important. As mentioned, many people have thus formed a misleading mental connection between the black keys 278—consciously or unconsciously separating them from the white keys 274 in their minds.

Standard music notation perpetuates this misconception in the way that the staves 272 are arranged or "set up." What confuses many people is the fact that, instandard music notation, whole-tone intervals and semi-tone intervals are represented in the very same way. For example, on the keyboard 268, the white key, E (just above middle C), is adjacent to F (the white key immediately to its right). Looking at their corresponding notes on the treble staff (or the upper staff of the two represented), one can see that E falls on the bottom line of the staff. F, which is one semitone (or half step) above E, falls on the space directly above the bottom line of the staff.

Now, again looking at the keyboard 268 of FIG. 17A, one can see that the white note, A, is a whole step above the white note, G. On the treble staff, G, like E, is found on a staff line (the second line from the bottom). A, which is one whole tone (or whole step) above G, falls on the space directly above the staff line containing G.

Therefore, what this illuminates is that the same interval on the staves 272 in standard notation indicates two very different kinds of intervals on a musical instrument. In other words, the interval between a note on a staff line and the space above can represent either a halftone interval or a whole-tone interval. The way in which one memorizes what particular kind of interval is represented in a given situation is usually by rote. Mnemonic devices are also typically employed. For instance, many people know of phrases like "Fat Aging Cows Eat," or "Every Good Boy Does Fine," but few really understand the significance of the harmonic and intervallic relations between the musical-tones of the memorized notes within the realm of music theory.

Figure 17B:
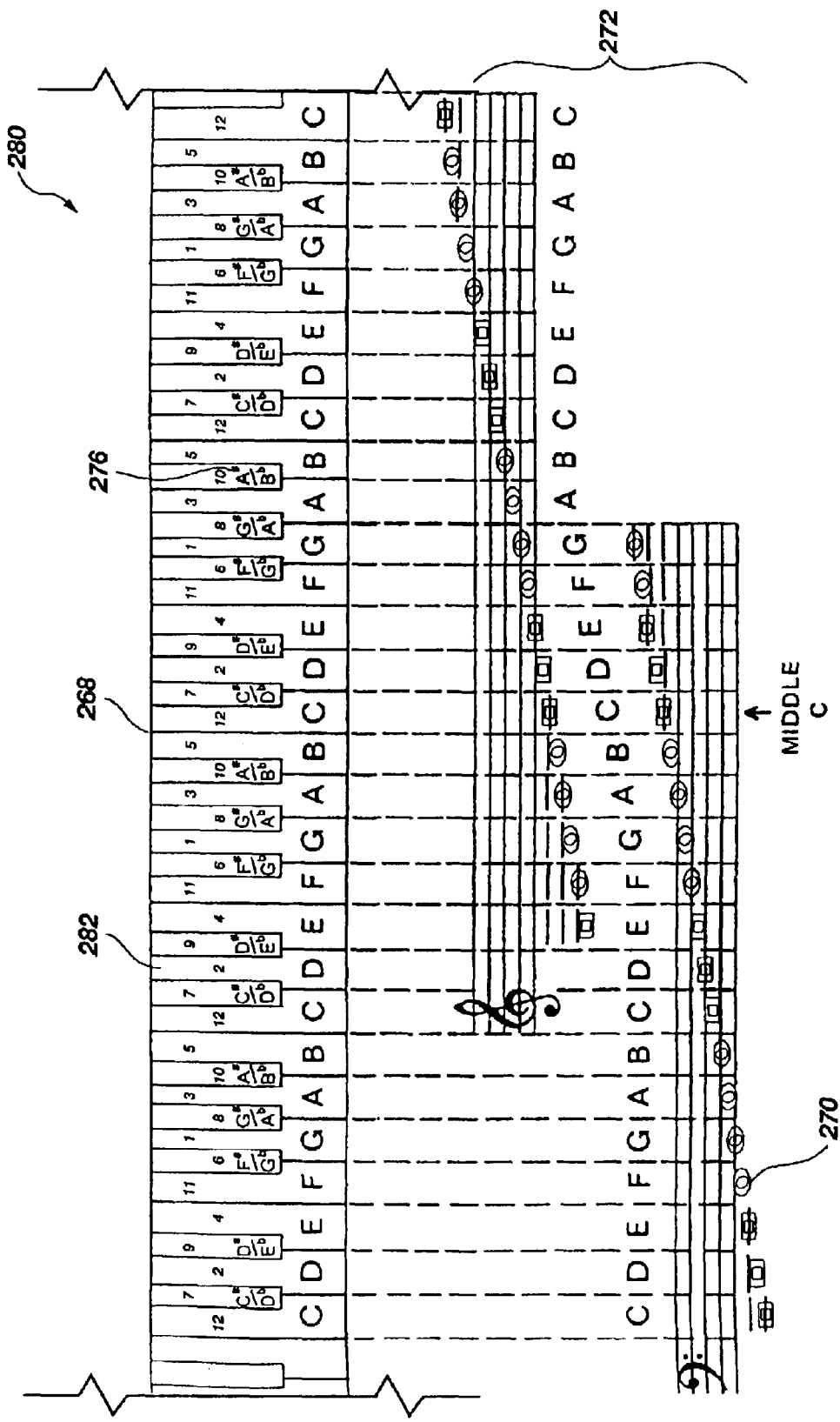
FIG. 17B depicts a keyboard color-coded according to the present invention and staves below it with color-coded notation, outlining an inventive system of music notation.

Referring to FIG. 17B, there is a diagram 280 that, like that of FIG. 17A, depicts a section of a keyboard 268 and outlines how the keys 282 correspond with the various note positions 270 on the staves 272 in this alternate, inventive form of music notation. (Though the staves represented here are the commonly used treble staff and bass staff, this inventive form of music notation applies to other staves, as well—such as the alto and tenor staves.) The inventive color code is applied to the keyboard 268 (as seen in FIG. 9) and to the notes 270 found on the staves 272 below. The color-designating numbers found on the keyboard keys designate the colors of each corresponding note positioned in the staves. Although each "black" key in this figure now receives more appropriate attention, in that each is labeled with its own letter name 276 and color, the "white," or "natural," keys are still the only notes that occupy positions 270 on the staves 272 below.

By incorporating the inventive color code, one is able to see that, although the physical interval between E and F is the same as that between G and A in the staves 272, each interval considered is harmonically very different. Referring to the previous example, the colors indicate that E (the primary color, yellow) is a half step below F (the tertiary color, purple-red), whereas G (the tertiary color, red-orange) is a whole step below A (orange-yellow, another tertiary color).

The shapes of the notes further illuminate these various intervals (see FIG. 18). The notes in the staves 272 representing E, the primary color, yellow, have an angular shape to mimic the square shape the note/color takes in previous diagrams (first seenin FIG. 4A). Conversely, the notes in the staves representing F, G, and A, the tertiary colors, purple-red, red-orange, and orange-yellow, respectively, have the usual rounded shapes to mimic the circular shape each of these notes/colors takes in previous diagrams (first seen in FIG. 4A).

To summarize, by applying the inventive color code to the notes in the staves, one is able see, literally and figuratively, how the notes relate harmonically and intervallically. In addition, the shapes of the notes further illuminate the intervals between notes. If any two notes are of the same shape (i.e., both angular or "square"—or both rounded or "circular"), they are spaced at a whole tone interval(s) on an instrument, whereas if any two notes are of different shapes (i.e., one is rounded and the other is angular), they are spaced at a semitone interval(s) on an instrument.

The application of the inventive color code also illuminates the fact that the notes on the staves in this diagram represent a repeating C/red-major scale. Because the notes that "naturally" occupy positions in the staves (all the "white" notes) are those in the key of C, the key of C has come to be regarded by many as the simplest, most user-friendly of all keys to play. This is true if, to play a piece of music, one relies on reading standard music notation, with its fairly complex system of key signatures and symbols.

This form of the inventive system of music notation is, of course, applicable when writing and/or playing a piece for/on any instrument, just as the standard form of music notation is applicable to all instruments.

Referring to FIG. 18, there is a legend 284 that outlines how the inventive color code translates to the established symbols and rhythmic notation used in standard music notation. The rest and note shapes are displayed in four columns.

The first column 286 on the left shows the rest shapes 288. Each rest listed from the top of the column to the bottom indicates an interval of time that is progressively shorter. The names 290 of each rest/note appear at the far right of the four columns. As in the standard system of music notation, these rest shapes 288 appear black in the inventive forms of music notation outlined in FIG. 17B and FIG. 21.

In the column 292 second from the left, the all-black note shapes 294 used in standard music notation are displayed. Again, as with the other columns of note shapes, each note 294 listed in the column indicates, from top to bottom, an interval of time that is progressively shorter.

In the next column 296 to the right, the various rhythmic notation shapes 298 of the tertiaries are listed. Like those of the standard form, these note shapes are rounded. "A" is used to represent all of the tertiary notes/colors—therefore, each of the note shapes 298 in this column 296 is colored orange-yellow, as indicated by the color-designating number found below each note in the column.

In the column 300 on the right, the various rhythmic notation shapes 302 of the primaries and secondaries are listed. There is a slight variation in the shapes of these notes 302 from the shapes of the tertiary notes 298. Each note shape 302 in this column 300 is angular, rather than being rounded. "C" is used to represent all of the primary and secondary notes/colors—therefore, each of the note shapes in this column is colored red, as indicated by the color-designating number found below each note in the column.

Other variations apply as well. For instance, as with the color-shape assignments addressed in the description of FIGS. 4A and 4B, the tertiary note shapes could as easily be angular in shape while the primaries and secondaries could be rounded. Also, the color-coded music notation can be written using uniform note shapes. In other words, all colored note shapes could be rounded, or all note shapes could be angular.

By incorporating the inventive color code to music notation, a new approach to indicating pitch has been developed. In standard music notation, only black is used in representing each particular note. The position of the note on the staves (along with an additional pitch-designating symbol if the note is to be "sharped," "flatted," or made "natural") indicates which note is to be played or sung, while the shape of the note dictates how long it should sound.

The inventive system of music notation is based on the standard system. However, by incorporating the color code, the pitch of each note in the inventive system is indicated by its position on the staves, its color and its shape. As a result, one who is reading a piece of music written using the inventive system of notation has distinct advantages. For instance, he or she is able to see, more immediately, the harmonic and intervallic relations between notes on the staves (as seen by their color/shape relations) and is able to more easily understand how the notes written on the staves correspond with the notes to be played on his or her instrument(s).

Another benefit of the inventive system of music notation is that, by using note shape and color to indicate pitch, signs commonly used in standard notation are eliminated, resulting in cleaner, or less-cluttered, music notation. Symbols such as the sharp sign, flat sign, natural sign, double sharp sign, natural sharp sign, double flatsign, and the natural flat sign are unnecessary.

Figure 19A:
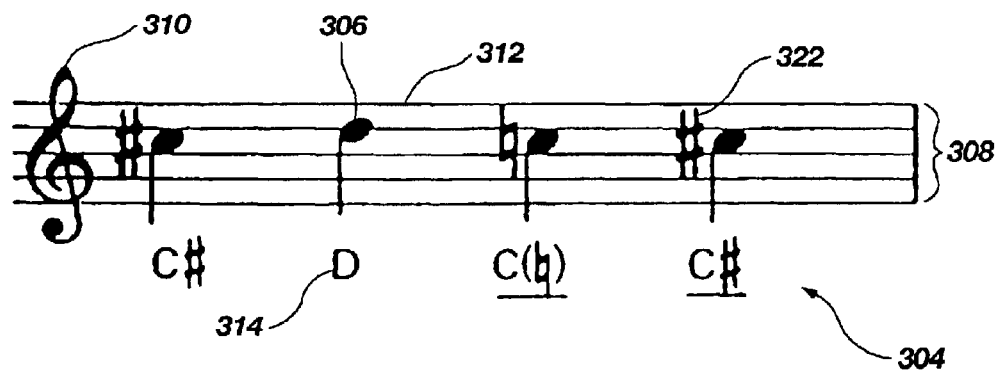
FIG. 19A is a depiction of a bar of music written in standard music notation that makes use of the "sharp" and "natural" symbols commonly used to designate pitch.
Figure 19B:
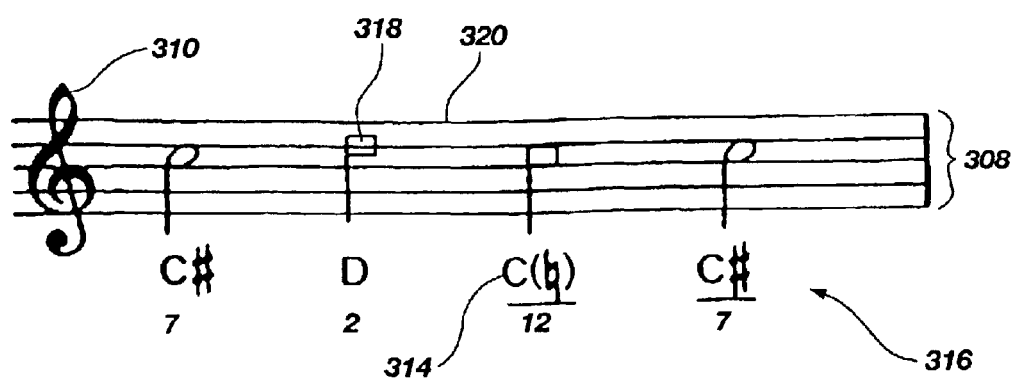
FIG. 19B depicts a bar of music that incorporates the color code of the inventive system, rather than sharp and natural symbols, to illuminate note relations and ♭ designate intervals and pitch.

Referring to FIGS. 19A and 19B, represented are two bars of music that convey similar information. The diagram 304 of FIG. 19A, written using standard music notation, indicates that the quarter notes 306 $C^t$, D, C, and $C^t$ are to be played in order. The notes are placed on the standard five staff lines 308. The treble clef 310 is in position at the left of the bar 312 and the letter names 314 of the notes 306 have been placed under their corresponding positions in the bar 312. This diagram 304 is included as a frame of reference for the diagram 316 of FIG. 19B and the diagram 350 of FIG. 22.

The diagram 316 of FIG. 19B, written using the inventive system of music notation outlined in FIG. 17B, indicates, again, that the quarter notes 318 $C^t$, D, C, and $C^t$ are to be played in order. The notes are placed on the standard five staff lines 308. The treble clef 310 is in position at the left of the bar 320 and the letter names 314 of the notes 318 have been placed under their corresponding positions in the bar 320. The notes 318 are colored as indicated by the color-designating numbers found beneath their respective letter names.

Because, in FIG. 19A, only black notes 306 are used—and because both the C note and $C^t$ note are shown in the same position on the staff 308—additional symbols 322 are required to identify which note is meant to be played. However, because, in FIG. 19B, the inventive note shapes and colors are used in addition to the note positions to distinguish pitch, the additional symbols 322 present in FIG. 19A are not needed and are removed. The result is a bar of music 320 that is less cluttered and more informative.

The shapes and colors of the notes 318 in the bar 320 clarify how each relates harmonically, what intervals are involved, and help in finding the notes' corresponding positions on the instrument(s) being played. The use of the inventive note shape/color code, likewise, eliminates the need for other pitch designating symbols such as flat signs, double flat signs, natural sharp signs, etc.

As mentioned previously, each note/color maintains particular relations with other notes. For example, whether the note in the chromatic scale between F and G is called "F♯" or "G♭," the inventive method and system clearly illustrates that it is the same pitch (designated by the color green). Likewise, the green note's dominant, green-blue, is shown to maintain the same harmonic relation with F♯/G♭, whether it is called "C♯" or "D♭."

What confuses many people who study standard music notation is that the very same pitch—F♯/G♭, for example—can be written in two, seemingly very different, ways. The note can be written in the "F" position along with a sharp sign (♯), or in the "G" position with a flat sign (♭), depending on the key of music in which the piece is to be performed.

The inventive system of music notation outlined in FIG. 17B approaches this issue in a much simpler way. Using the previous example, the note, F♯/G♭ (angular, green note shape), is written in either the "F" position or in the "G" position on the staves, depending on its intended use within the context of the song's key. However, in both instances, neither a sharp sign (♯) nor a flat sign (♭) is used, respectively. The note is colored green and is presented in an angular shape to indicate that it is the very same pitch and, therefore, maintains the same harmonic relations with the other notes/colors, despite its physical positioning in the staves (as dictated by the particular clef and key of music in which the piece is written.)

Figure 20A:
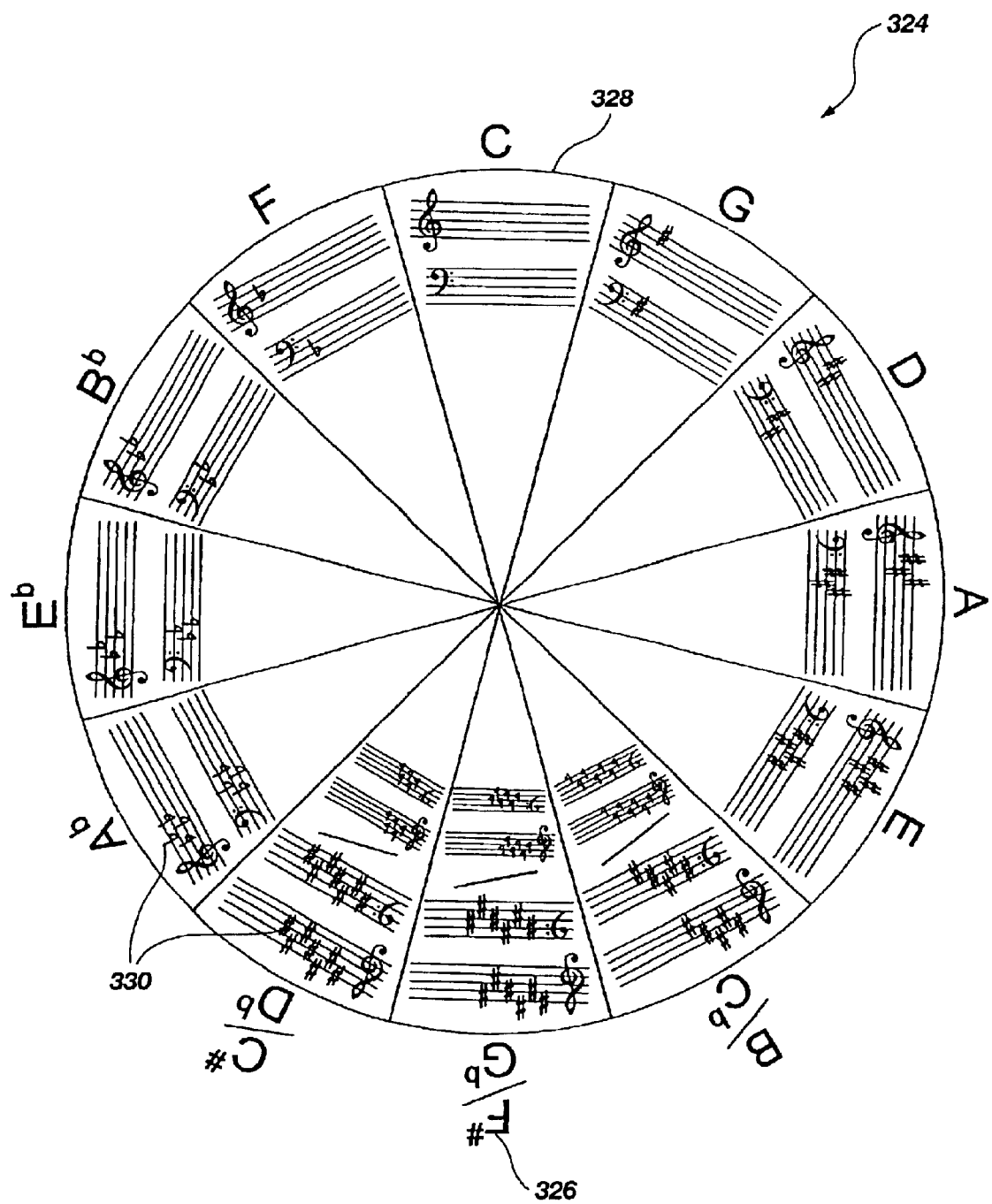
FIG. 20A depicts a diagram that includes the keys arranged in a circle-of-fifths format, and illustrates how all the key signatures relate in standard music notation, using sharp (♯) and flat (♭) symbols.
Figure 20B:
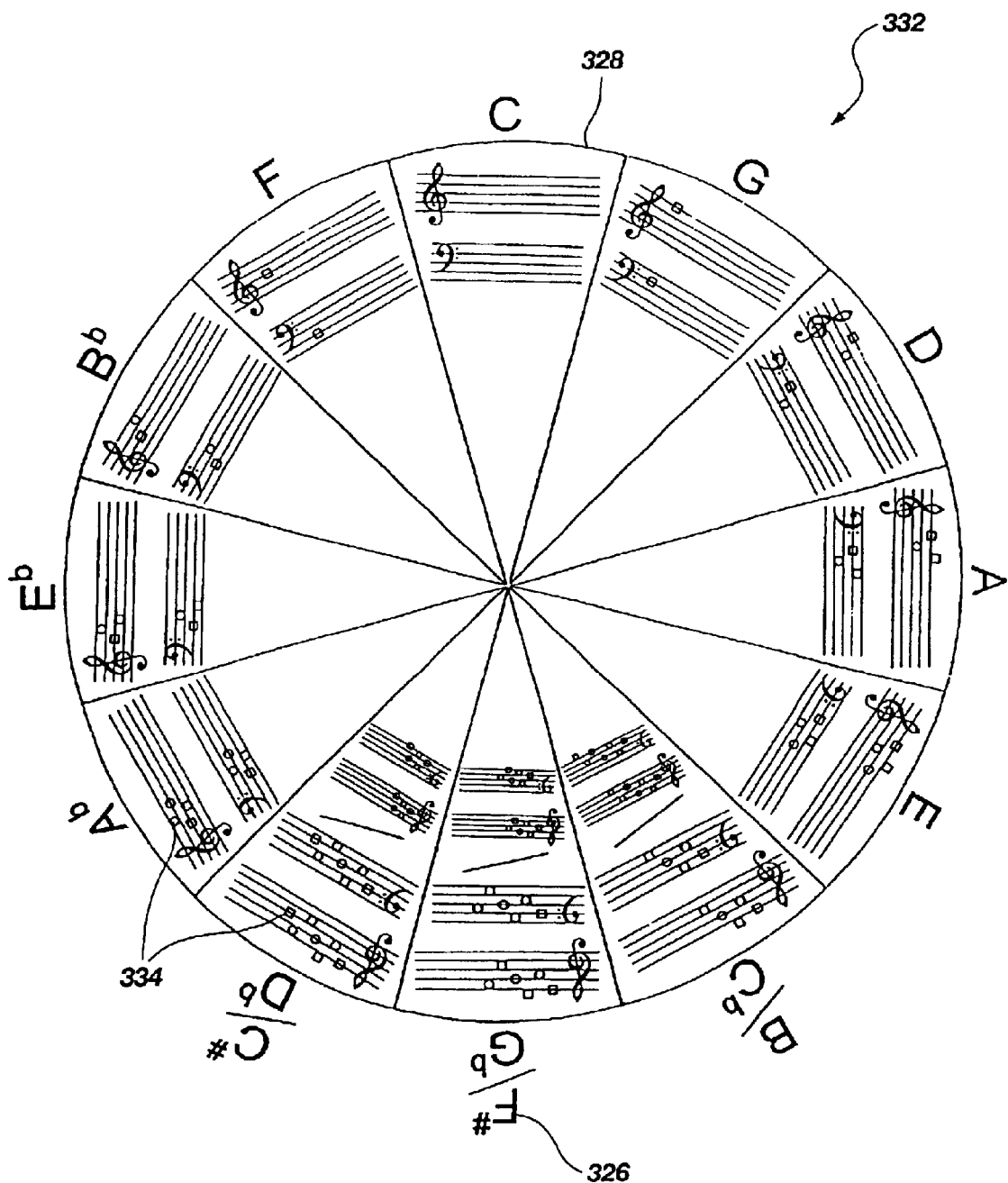
FIG. 20B employs the colored shapes of the inventive system of music notation to represent sharps and flats in the key signatures rather than the sharp and flat symbols found in standard music notation to illustrate how all the key signatures relate.
Figure 23:
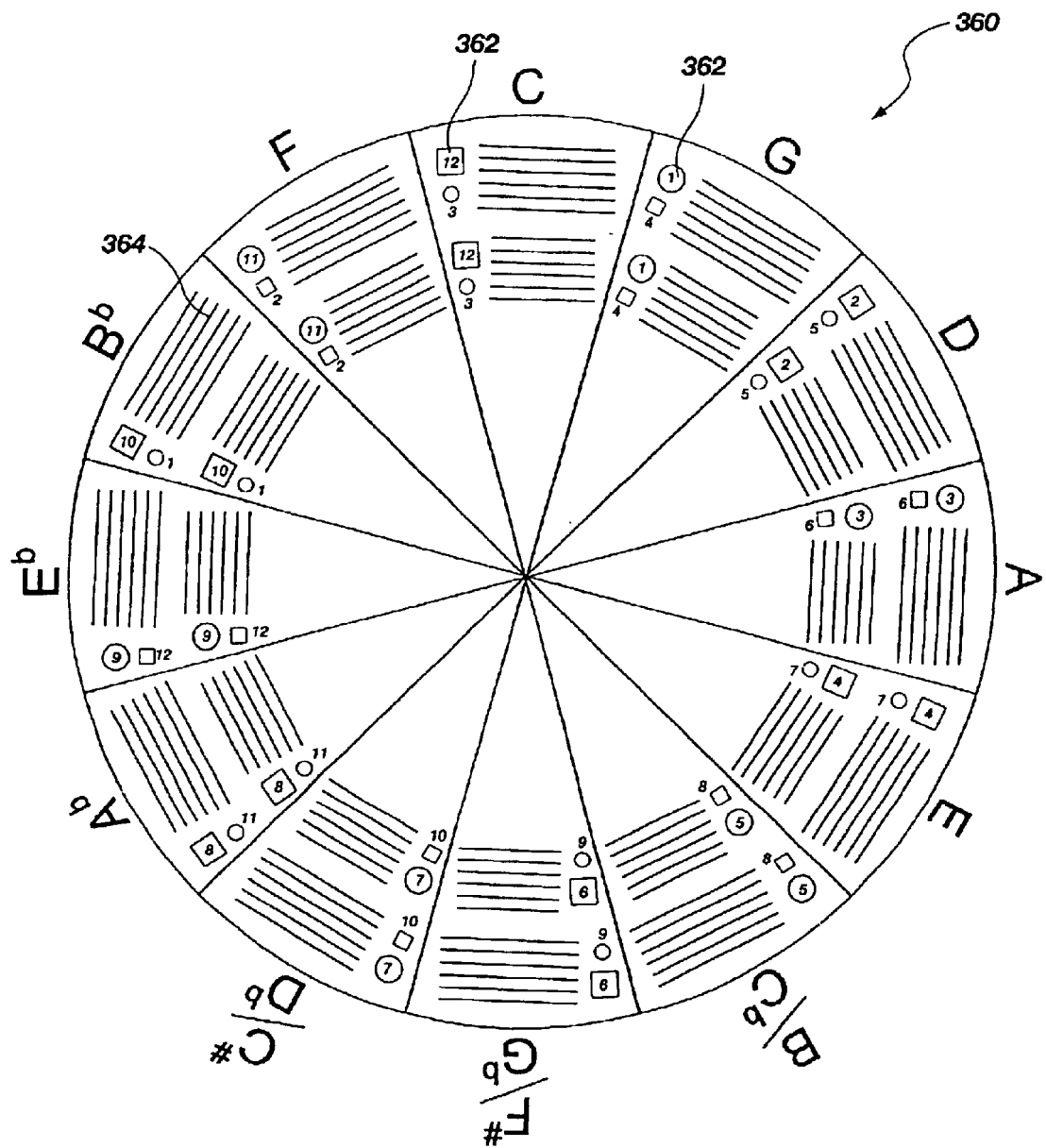
FIG. 23 shows a diagram illustrating how all key signatures relate, as presented using the alternative system of notation outlined in FIG. 21.

Referring to FIGS. 20A and 20B, diagrams are included to illustrate how the system of key signatures in standard music notation compares and contrasts with that of the form of the inventive notation system outlined in FIG. 17B (also see FIG. 23). The diagrams of both figures are arranged in a circle-of-fifths format to show how, starting in the key of G, the sharp keys progress in a clockwise direction, and how, starting at F, the flat keys progress in a counterclockwise direction. FIG. 20A is included as a frame of reference for FIG. 20B, as well as for FIG. 23.

In the diagram 324 of FIG. 20A, the letter names 326 of the notes are listed around the periphery of the circle 328. In the diagram 332 of FIG. 20B, the letter names 326 of the notes are also listed around the periphery of the circle, though other symbols, such as the colored shapes of the notes as seen in FIG. 4A could be used.

Referring to the diagram 324 of FIG. 20A, the sharp (♯) and flat (♭) symbols 330 of standard music notation are used in the various key signatures. In the key of C, there are no sharps or flats, so there are no sharp or flat symbols written in C's key signature. However, there is one sharp (F♯) in the key of G. The key of D has two sharps (F♯ and C♯). The key of A has three sharps (F♯, C♯, and G♯), etc. In the key of F, there is one flat (B♭). In the key of B♭, there are two flats (B♭ and E♭). In the key of E♭, there are three flats (B♭, E♭, and A♭), etc.

The same concepts are illustrated in the diagram 332 of FIG. 20B, though in a different and more illuminating way. The colors 334 of the corresponding "sharp" and "flat" notes have replaced the traditional symbols used in the various key signatures of standard notation. Again, one can see that, in the key of C, there are no sharps or flats. However, moving in a clockwise direction, there is one sharp in the key of G (F♯—or green). The key of D contains two sharps (F♯ and C♯—or green and green-blue, respectively). The key of A contains three sharps (F♯, C♯, and G♯—or green, green-blue, and blue, respectively), etc. Looking in a counterclockwise direction, the key of F has one flat (B♭—or purple). The key of B♭ contains two flats (B♭ and E♭—or purple and blue-purple, respectively). In the key of E♭, there are three flats (B♭, E♭, and A♭—or purple, blue-purple, and blue, respectively), etc.

To many people, the diagram 324 of FIG. 20A may appear overly complex because it contains many sharp and flat signs—archaic, medieval symbols unrelated to any actual musical instrument that do not properly convey harmonic, intervallic, or such mathematical and musical relationships.

The significance of the note relations in each particular key signature, as illustrated in FIG. 20A, is unnecessarily challenging to understand and may even go unnoticed. For instance, because the traditional sharp (♯) and flat (♭) symbols 330 are used, it can be difficult to see, or even notice, that each progressive sharp in a key signature is the dominant of the previous one. To explain, the first sharp listed is F♯, followed by its dominant (or fifth), C♯, followed by its dominant, G♯, followed by the progressive fifths D♯, A♯, E♯, etc. Conversely, the first flat listed is B♭, followed by its subdominant (or fourth), E♭, followed by its subdominant, A♭, followed by the progressive subdominants D♭, G♭, etc.

In the diagram 332 of FIG. 20B, however, the progressive note relations in the key signatures are clear. The first sharp listed is F♯ (green/square), followed by its dominant or fifth, C♯ (green-blue/circle), followed by its dominant, G♯ (blue/square), followed by D♯ (blue-purple/circle), A♯ (purple/square), etc. Conversely, the first flat listed is B♭ (purple/square), followed by its subdominant or fourth, E♭ (blue-purple/circle), followed by its subdominant, A♭ (blue/square), followed by D♭ (green-blue/circle), G♭ (green/square), etc.

This form of the inventive system of key signatures, therefore, is not only less cluttered, or more inviting in appearance, but it conveys information more clearly, as well. Furthermore, the attentive student may notice that sharp key signatures and flat key signatures list the very same notes, only in reverse order. The notes considered are the "black" (or "sharp" and/or "flat") keys of the keyboard. According to the established note-color assignments of the inventive method, the sharp key signatures begin with F♯ (green/square) and progressively list consecutive colors/note shapes from the color wheel/circle of fifths in a clockwise order. The flat key signatures begin with B♭ (purple/square) and progressively list consecutive colors/note shapes from the color wheel/circle of fifths in a counterclockwise order.

For instance, in the diagram 332 of FIG. 20B, the order of notes 334 in the key signature of B-major (which contains five sharps—green through purple), and the order of notes in the key signature of D♭-major (which contains five flats—purple through green) are simply the reverse, or mirror images, of one another.

Referring to FIG. 21, there is a diagram 336 that outlines an alternate form of the inventive system of music notation. A color-coded keyboard 338 is depicted, along with staves 340 that illustrate how the various notes 342 correspond to the instrument's keys 344. The color-designating numbers found on the keyboard keys accordingly designate the colors of each corresponding note positioned in the staves below.

Though the inventive system of notation outlined in FIG. 17B offers considerable benefits to a student, it is, nonetheless, based upon the standard form of music notation and, therefore, contains some elements that might be described as "counterintuitive." For instance, even though the use of the inventive colors/note shapes eliminates the need for various symbols (such as sharp, flat, and natural signs), key signatures indicating which specific "black" notes are to be played remain. Since the spacing between note shapes/colors in any given scale or key is consistent, and because the same rules always apply to each key, it is unnecessary to single out which notes are "black," or "sharp" or "flat." All that one needs to know is the key tonic of the song.

Also, because the inventive system of notation outlined in FIG. 17B uses five black lines with all of the commonly used clefs, the beginning of each staff must be marked with a particular clef to determine the pitch placement of the notes—whether it is the treble clef, the bass clef, the alto or tenor clef, etc.

Since the inventive color method and system illustrate that all "white" and "black" keys are equal and function in the same consistent ways, the form of the inventive notation system outlined in FIG. 21 provides each of the "sharp" or "flat" notes with its own line or space in the staves 340—resulting in six, rather than five, lines in each staff.

The clefs do not appear because one is able to immediately distinguish, in this illustration, the treble staff 346 from the bass staff 348. The treble staff lines progress from green to yellow (from bottom to top), while the bass staff lines progress from red to purple (from bottom to top). The color of each staff line is indicated by its color-designating number found at the far left of each line.

The result is that each "sharp" or "flat" note always falls in the same position on a particular staff. For instance, $F^{\sharp}/G^{\flat}$ (green/angular note) always falls on the green staff line—not in two places. In other words, it is neither written in the "F" position nor in the "G" position.

Also, because each note shape/color resides in its own position, the spacing between notes 342 on the staves 340 accurately represents the spacing between notes on an instrument. For example, the E note (yellow/angular note shape) is found on the yellow staff line, while the F note (purple-red/rounded note shape), which is a semitone above E, is located in the space immediately above the E/yellow line. The G note (red-orange/rounded note shape) is found between the green and blue lines, while the A note (orange-yellow/rounded note shape), which is one whole tone (or two semitones) above G, is located in the space two semitones above—between the blue and purple staff lines.

This uniform, or equal, spacing between notes 342 on the staves 340 differs from that of both the standard form of music notation and the form of the inventive system of notation outlined in FIGS. 17A and 17B, respectively. In the latter two systems, the relative positioning of notes on the staves can represent, or appear to represent, both semitone and whole tone intervals.

The form of the inventive system of music notation outlined in FIG. 21 is, of course, applicable when writing and/or playing a piece for/on any instrument, just as the standard form of music notation and the form of the inventive system outlined in FIG. 17B are applicable to all instruments.

Figure 22:
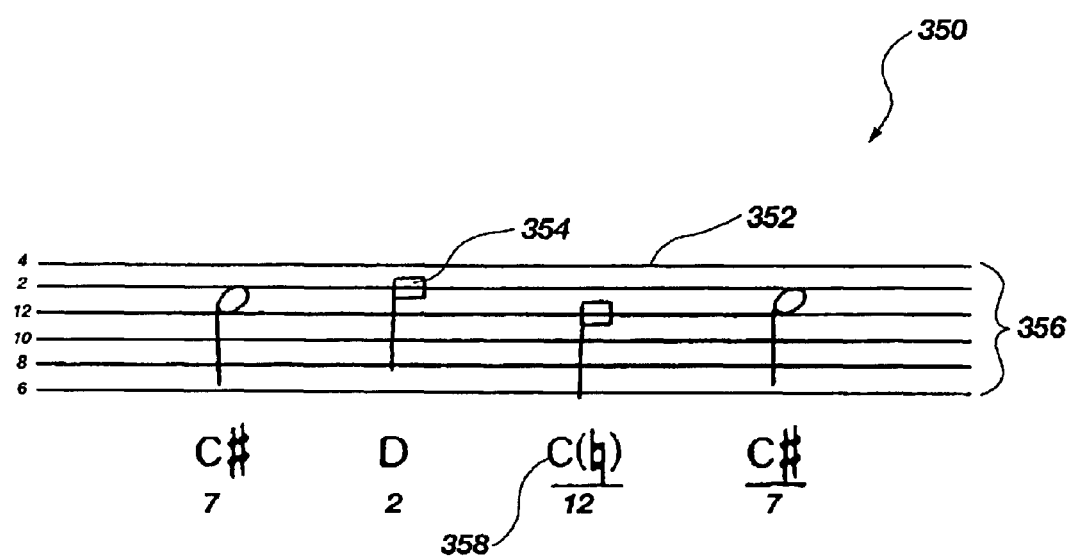
FIG. 22 depicts a bar of music written in the alternative form of music notation outlined in FIG. 21.

Referring to FIG. 22, there is a diagram 350 that represents a single bar of music 352 that conveys the information of the musical bars in FIGS. 19A and 19B, but in a more illuminating way. This bar 352 is written in the form of the inventive system outlined in FIG. 21, wherein each note 354 is found in its own position on the staff 356. The bar 352 indicates that the quarter notes 354 $C^{\sharp}$, D, C, and $C^{\sharp}$ are to be played in order. The notes are placed on the six, multi-colored treble staff lines (see FIG. 21). The color-designating numbers to the left of their respective staff lines indicate that it is the treble staff. The letter names 358 of the notes have been placed under their corresponding positions in the bar. The color-designating number for each note is found beneath each note's respective letter name.

Instead of finding $C^{\sharp}$ and C in the same position—made distinct either by sharp and natural signs, as in FIG. 19A, or simply by different colors/note shapes, as in FIG. 19B—the $C^{\sharp}$ and C notes in this bar are made distinct by their color, note shape, and by their relative positioning on the staff 356.

Referring to FIG. 23, a diagram 360 similar to those of FIGS. 20A and 20B illustrates how the key signatures 362 relate in the form of the inventive system of notation outlined in FIG. 21. The diagram 360 is arranged in the circle-of-fifths formation to illustrate how the keys progress in a clockwise direction and in a counterclockwise direction.

No clefs are present with the key signatures 362 because the orders of colors of the staff lines 364 indicate what staff is being considered, as previously mentioned (see the description of FIG. 21). The key signatures of the treble staff are represented in the outer ring. The key signatures of the bass staff are represented in the inner ring.

Because, in this inventive system of music notation, "black" notes are no longer singled out, there are no symbols found in the key signatures 362 indicating which notes are sharp or flat. The keys of C, D, E, $G^{\flat}/F^{\sharp}$, $A^{\flat}$, and $B^{\flat}$ are designated by their respective primary- or secondary-colored squares. Conversely, the keys of F, G, A, $B/C^{\flat}$, $C^{\sharp}/D^{\flat}$, and $E^{\flat}$ are designated by their respective tertiary-colored circles. Each key-representing color/shape is placed directly in front of each respective set of staff lines. The larger, or top, color/shape of each pair indicates the major key, while the smaller, or bottom, color/shape of each pair indicates the relative minor.

In the key of C/red, for example, a large red square denotes that it is the key of C/red. Underneath the large red square is a smaller orange-yellow circle indicating that A/orange-yellow is the relative minor in the key of C/red-major (also see FIG. 6C).

By simplifying the key signatures 362 in this manner, this alternate form of the inventive system of music notation (as outlined in FIG. 21) allows the student to focus on how all of the notes/colors relate in a given key. Rather than singling out which notes are "sharp" or "flat" (that is, which "black" notes are played), one is able to concentrate on how all of the notes relate harmonically, melodically, intervallically, etc. Since the rules or concepts dictating how the notes/colors in a given key interact are functional in the same way for all the keys, as the inventive method makes clear, it is important to focus on each key as a whole, and not just specific "sharp" or "flat" notes.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth in the claims.

I claim:

1. A method for aiding in understanding music theory, comprising the steps of:
   a) integrating a color spectrum and a musical chromatic scale by assigning successive colors of a color wheel to successive musical notes in a circle of fifths to create note-color assignments;
   b) rearranging the musical notes in the circle of fifths into the musical chromatic scale while maintaining the note-color assignments; and c) studying musical theory through the disclosed relationships of the note-color assignments for colored musical notes.

2. A method as in claim 1, wherein the colored musical notes are represented using distinct shapes selected from the group of distinct shapes consisting of squares, circles, rectangles, ovals, letters, keyboard keys, numbers, music notation, cubes, and spheres.

3. A method as in claim 1, wherein the note-color assignments that represent musical notes are arranged in the circle of fifths in one position, with successive colors of the color wheel, with a disk being rotatable 180-degrees wherein the sequence of all the musical notes assumes the sequence of the musical chromatic scale.

4. A method as in claim 1, further comprising the step of applying the note-color assignments for the colored musical notes to a musical instrument.

5. An apparatus for displaying relationships between musical notes by rearranging them from the order of the circle of fifths to the chromatic scale, and vice-versa, comprising:
   a) a background;
   b) a rotatable disk having an axle, and located parallel, concentric to the background, and rotatably attached to the background by the axle;
   c) a set of primary markers located at substantially evenly-spaced intervals in relation to the rotatable disk, the primary markers being attachable to the rotatable disk and representing musical notes having alternating primary and secondary colors; and
   d) a set of tertiary markers representing musical notes having tertiary colors attachable to the background and located at points in relation to the rotatable disk so as to respectively appear between each pair of primary markers;
   e) a plurality of faceplates that are positionable on the rotatable disk that bear notations illuminating relationships of primary and tertiary markers representing musical notes.

6. An apparatus as in claim 5, wherein the plurality of faceplates are removable.

7. An apparatus as in claim 5, wherein all of the primary and tertiary markers represent musical notes arranged in the circle of fifths in one position, and the primary and tertiary markers are of successive colors of the color wheel, and the rotatable disk is rotatable 180-degrees so that the sequence of all the note-representing primary and tertiary markers assumes the sequence of the musical chromatic scale.

8. An apparatus as in claim 5, wherein the colors representing musical notes may be rearranged to display a color wheel as applied to the circle-of-fifths arrangement of notes with faceplates bearing markings illuminating relationships of the colors representing musical notes.

9. An apparatus for displaying relationships of musical notes, comprising:
   a) a rotatable outer disk;
   b) a rotatable inner disk having an axle and located parallel, concentric, and rotatably attached to the outer disk by the axle;
   c) a set of removable colored shapes representing musical notes that are attachable to the surface of the inner disk;
   d) a removable overlay with a transparent center portion that can be positioned on the inner disk and that bears markings illuminating relationships of the colors representing musical notes;
   e) a faceplate with a transparent center portion that can be positioned on the outer disk, and over the inner disk and having markings illuminating relationships of the colors representing musical notes.

10. An apparatus as in claim 9, wherein the faceplate is removable.

11. An apparatus as in claim 9, wherein the rotatable disks and their respective faceplates may be aligned at various points so that the symbols each displays are aligned to illuminate relationships of the colors representing musical notes.

12. A visual aid that illustrates colorized notes and/or finger positioning for scales, chords, chord positions, chord inversions, note groupings, and note relations on a musical instrument, comprising:
   a) a surface displaying at least a portion of an array of colored shapes representing musical notes in a chromatic scale order, or in an arrangement as defined by the tuning of a particular instrument;
   b) at least one marking, located adjacent the surface displaying the colored shapes, illustrating a musical arrangement for colored shape groupings.

13. A visual aid as in claim 12, wherein the array of colored shapes representing musical notes are represented using distinct shapes selected from the group of distinct shapes consisting of squares, circles, rectangles, ovals, letters, keyboard keys, numbers, music notation, cubes, and spheres.

14. A visual aid as in claim 12, wherein the at least one marking is a set of markings.

15. A visual aid as in claim 12, wherein the at least one marking is displayed on the surface displaying the array of the colored notes.

16. A visual aid as in claim 12, wherein the at least one marking is displayed on an overlay that may be positioned in relation to the surface.

17. A visual aid as in claim 12, wherein the at least one marking is illustrating the colors/notes included in, and/or the finger positioning for selected chords and/or note groupings.

18. A visual aid as in claim 12, wherein the markings illustrating the colors representing musical tones included in note groupings are depicted as positioned over the surface displaying the array of the colors representing musical tones.

19. A visual aid as in claim 12, wherein the visual aid can be a diagram, chart, table, plan, graph or visual representations.

20. A visual aid that illustrates colorized notes which indicate finger positioning for scales, chords, chord positions, chord inversions, note groupings, and note relations on a musical instrument, comprising:
   a) a table displaying note groupings from an array of colored shapes representing musical notes in a chromatic scale order;
   b) a note grouping name designation located adjacent the table for each note grouping of the colored shapes, illustrating a musical arrangement for colored shape groupings;
   c) a colorized chromatic scale index to relate the note groupings to the chromatic scale of the musical instrument.

21. A visual aid as in claim 20, wherein the note grouping name designation is a chord name, scale name, or note relation.

* * * * *